United States Patent
Dube et al.

(10) Patent No.: US 9,682,879 B2
(45) Date of Patent: Jun. 20, 2017

(54) SYSTEM AND METHOD FOR TREATING WASTE WATER BY MEANS OF PASSIVE PHOSPHORUS CAPTURE

(71) Applicant: CENTRE DE RECHERCHE INDUSTRIELLE DU QUEBEC, Quebec (CA)

(72) Inventors: Rino Dube, Quebec (CA); Thomas Thibault, Quebec (CA); Gerardo Buelna, Quebec (CA); Sylvain Savard, L'Ancienne-Lorette (CA); Paul Lessard, Quebec (CA)

(73) Assignee: CENTRE DE RECHERCHE INDUSTRIELLE DU QUÉBEC, Quebec (CA)

( * ) Notice: Subject to any disclaimer, the term of this patent is extended or adjusted under 35 U.S.C. 154(b) by 38 days.

(21) Appl. No.: 14/438,370

(22) PCT Filed: Oct. 25, 2013

(86) PCT No.: PCT/CA2013/000907
§ 371 (c)(1),
(2) Date: Apr. 24, 2015

(87) PCT Pub. No.: WO2014/063232
PCT Pub. Date: May 1, 2014

(65) Prior Publication Data
US 2015/0353400 A1    Dec. 10, 2015

Related U.S. Application Data

(60) Provisional application No. 61/719,042, filed on Oct. 26, 2012.

(51) Int. Cl.
C02F 9/00 (2006.01)
C02F 1/28 (2006.01)
(Continued)

(52) U.S. Cl.
CPC ............. *C02F 9/00* (2013.01); *B01J 20/0229* (2013.01); *B01J 20/0248* (2013.01); *B01J 20/22* (2013.01);
(Continued)

(58) Field of Classification Search
CPC .. C02F 9/00; C02F 1/286; C02F 1/008; C02F 3/305; C02F 1/5236; C02F 1/722;
(Continued)

(56) References Cited

U.S. PATENT DOCUMENTS 4,048,028 A * 9/1977 Moeglich ............... C02F 1/288
205/144
5,206,206 A    4/1993 Buelna et al.
(Continued)

FOREIGN PATENT DOCUMENTS

| | | |
|---|---|---|
| CA | 2580739 A1 | 3/2006 |
| EP | 1720652 B1 | 10/2007 |
| FR | 2781478 B1 | 1/2000 |

OTHER PUBLICATIONS

Machine-Generated English Translation of FR 2781478, generated on Aug. 26, 2016.*
(Continued)

*Primary Examiner* — Fred Prince
(74) *Attorney, Agent, or Firm* — Robic LLP

(57) ABSTRACT

The invention relates to a system and a method for treating waste water using a passive phosphorus-capture filter lined with wood activated by the impregnation of a metal in the form of hydroxide, more specifically aluminum hydroxide or iron hydroxide. This system demonstrates phosphorus removal performances which are very closely linked to the release of iron and which support the observation that iron releases follow a cyclical trend. The method according to the invention also clearly demonstrates the cyclical nature of the
(Continued)

reduction of phosphorus, directly linked to the same cycle of iron release at the outlet. When the medium is aerobic, it can precipitate the released iron in the form of hydroxide and thereby limit the release of iron into the outflow water and consequently its residual phosphorus. This model thus allows the service life of the system to be extended, while simultaneously taking advantage of the precipitation/solubilization cycle of the iron observed in the medium under reducing conditions.

23 Claims, 29 Drawing Sheets

(51) Int. Cl.

| | |
|---|---|
| C02F 3/30 | (2006.01) |
| C02F 1/00 | (2006.01) |
| C02F 1/72 | (2006.01) |
| B01J 20/22 | (2006.01) |
| C02F 1/52 | (2006.01) |
| C02F 3/04 | (2006.01) |
| C02F 1/70 | (2006.01) |
| B01J 20/02 | (2006.01) |
| C02F 103/20 | (2006.01) |
| C02F 103/00 | (2006.01) |
| C02F 3/06 | (2006.01) |
| C02F 3/00 | (2006.01) |
| C02F 101/10 | (2006.01) |
| C02F 1/74 | (2006.01) |

(52) U.S. Cl.
CPC ............. *C02F 1/008* (2013.01); *C02F 1/286* (2013.01); *C02F 1/288* (2013.01); *C02F 1/5236* (2013.01); *C02F 1/705* (2013.01); *C02F 1/722* (2013.01); *C02F 3/04* (2013.01); *C02F 3/301* (2013.01); *C02F 3/302* (2013.01); *C02F 3/305* (2013.01); *B01J 2220/4825* (2013.01); *C02F 1/281* (2013.01); *C02F 1/283* (2013.01); *C02F 1/5245* (2013.01); *C02F 1/74* (2013.01); *C02F 3/06* (2013.01); *C02F 2003/001* (2013.01); *C02F 2101/105* (2013.01); *C02F 2103/002* (2013.01); *C02F 2103/005* (2013.01); *C02F 2103/20* (2013.01); *Y02W 10/15* (2015.05)

(58) Field of Classification Search
CPC ............ C02F 2103/20; C02F 2103/005; C02F 2103/002; C02F 1/281; C02F 1/288; C02F 3/04; C02F 3/06; C02F 3/301; C02F 3/302; C02F 2003/001; C02F 2101/105; C02F 1/5245; C02F 1/705; C02F 1/74; C02F 1/283; Y02W 10/15; B01J 20/22; B01J 20/0229; B01J 2220/4825; B01J 20/0248
USPC ....... 210/605, 614, 615, 616, 617, 630, 631, 210/903, 906, 150, 151
See application file for complete search history.

(56) References Cited

U.S. PATENT DOCUMENTS

| | | |
|---|---|---|
| 6,214,229 B1 | 4/2001 | Robertson |
| 7,311,842 B2 | 12/2007 | Kim |
| 7,374,683 B2 | 5/2008 | Buelna et al. |
| 7,887,706 B2 | 2/2011 | Buelna et al. |
| 7,967,984 B2 | 6/2011 | Midorikawa et al. |
| 8,147,695 B2 | 4/2012 | Banerjee et al. |

OTHER PUBLICATIONS

Ayoub et al., "Iron and Aluminum Hydroxy (Oxide) Coated Filter Media for Low-Concentration Phosphorus Removal", Water Environment Research, vol. 73, No. 4, (Jul.-Aug. 2001), pp. 478-485.
Bajpai et al., "Removal of Phosphate Anions from Aqueous Solutions Using Polypyrrole-Coated Sawdust as a Novel Sorbent", Journal of Applied Polymer Science, vol. 111, (2009), pp. 3081-3088.
Benyoucef et al., "Adsorption of phosphate ions onto low cost Aleppo pine adsorbent", Desalination 275, (2011), pp. 213-236.
Cucarella et al., "Phosphorus Sorption Capacity of Filter Materials Used for On-site Wastewater Treatment Determined in Batch Experiments—A Comparative Study", Journal of Environmental Quality, vol. 38, (Mar.-Apr. 2009), pp. 381-392.
Demarco et al., "Arsenic removal using a polymeric/inorganic hybrid sorbent", Water Research, vol. 37, (2003), pp. 164-176.
Dubus, "La rétention du phosphore dans les sols: principes d'étude, modélisation, mécanismes et compartiments du sol impliqués", Documents scientifiques et techniques, Numéro III3, (Nov. 1997).
Eberhardt et al., "Phosphate removal by refined aspen wood fiber treated with carboxymethyl cellulose and ferrous chloride", Bioresource Technology, vol. 97, (2006), pp. 2371-2376.
Eberhardt et al., Biosorbents prepared from wood particles treated with anionic polymer and iron salt: EVect of particle size on phosphate adsorption, Bioresource Technology, vol. 99, (2008), pp. 626-630.
Guo et al., "Removal of Arsenic by Bead Cellulose Loaded with Iron Oxyhydroxide from Groundwater", Environmental Science & Technology, vol. 39, No. 17, (2005), pp. 6808-6818.
Han, et al., "Removal of Phosphorus using chemically Modified Lignocellulosic Meaterials", 6 th Inter-Regional Conference on Environment—Water "Land and Water Use Planning and Management", Albacete, Spain, Sep. 3-5, 2003, pp. 1-10.
Hem, et al., "Study and Interpretation of the Chemical Characteristics of Natural Water", Third Edition, U.S. Geological Survey Water-Supply Paper 2254, (1985).
James et al., "Phosphorus Sorption by Peat and Sand Amended with Iron Oxides or Steel Wool", Water Environment Research, vol. 64, No. 5, (Jul.-Aug. 1992), pp. 699-705.
Westholm, "Substrates for phosphorus removal—Potential benefits for on-site wastewater treatment?", Water Research, vol. 40, (2006), pp. 23-36.
Kuo et al., "Sorption and desorption of chromate by wood shavings impregnated with iron or aluminum oxide", Bioresource Technology, vol. 99, (2008), pp. 5617-5625.
Robertson, "Treatment of Wastewater Phosphate by Reductive Dissolution of Iron", J. Environ. Qual., vol. 29, (Sep.-Oct. 2000), pp. 1678-1685.
Robertson et al., "Treatment of Wastewater Phosphate by Reductive Dissolution of Iron: Use of Ferric Oxyhydroxide Media", J. Environ. Qual., vol. 40, (2011), pp. 1955-1962.
Tanada et al., "Removal of phosphate by aluminum oxide hydroxide", Journal of Colloid and Interface Science, vol. 257, (2003), pp. 135-140.
Thirunavukkarasu et al., "Arsenic Removal from Drinking Water Using Iron Oxide-Coated Sand", Water, Air, and Soil Pollution, vol. 142, (2003), pp. 95-111.
Unnithan et al., "Ability of Iron(III)-Loaded Carboxylated Polyacrylamide-Grafted Sawdust to Remove Phosphate Ions from Aqueous Solution and Fertilizer Industry Wastewater: Adsorption Kinetics and Isotherm Studies", Journal of Applied Polymer Science, vol. 84, (2002), pp. 2541-2553.

(56) References Cited

OTHER PUBLICATIONS

Yan et al., "Adsorption of phosphate from aqueous solution by hydroxy-aluminum, hydroxy-iron and hydroxy-iron-aluminum pillared bentonites", Journal of Hazardous Materials, vol. 179, (2010), pp. 244-250.

Kim et al., "Enhanced Adsorption and Regeneration with Lignocellulose-Based Phosphorus Removal Media Using Molecular Coating Nanotechnology", Journal of Environmental Science and Health Part A, vol. 41, (2006), pp. 87-100.

* cited by examiner

SYSTEM AND METHOD FOR TREATING WASTE WATER BY MEANS OF PASSIVE PHOSPHORUS CAPTURE

This application claims priority under 35USC§119(e) of U.S. provisional patent application 61/719,042 filed on Oct. 26, 2012, the specification of which is hereby incorporated by reference. This application is a national phase entry of PCT patent application serial number PCT/CA2013/000907, filed on Oct. 25, 2013 (now pending) designating the United States of America.

FIELD OF THE INVENTION

The present invention relates to the field of wastewater treatment and particularly treatment systems and methods for removal of phosphorus from wastewater.

BACKGROUND

Intensification of land use, as well as the intensification of industrialization and farming on a global scale, have affected the natural cycle of various nutrients found in surface waters. While different pollutants are affecting the quality of water resources, phosphorus is one that is attracting more and more attention. This substance, which is present in deoxyribonucleic acid (DNA) and several intermediate metabolites, is essential to all forms of life. Phosphorus is very dynamic, capable of being transformed biologically and chemically through a series of processes which constitute the phosphorus cycle. Phosphorus can be found in particulate, organic or soluble form. The soluble form of phosphorus includes orthophosphates and polyphosphates. The orthophosphate form, often called phosphate, draws particular attention because it is the only form directly assimilated by bacteria, plants and algae. Polyphosphates, which are compounds having two or more phosphorus molecules, will decompose more or less rapidly into orthophosphate by hydrolysis. The term "total phosphorus" includes all forms of phosphorus in water and is used as the term of reference term in Rules & Regulations presently in effect. Phosphorus exists naturally and is exploited by man to satisfy industrial and agricultural needs. Phosphorus uses are numerous, but agriculture alone consumes about 97% of world production. The phosphorus found in surface water comes mainly from surface intake, mostly anthropogenic sources, mainly shared between urban, industrial and agricultural sectors. Since 1985-1990, phosphorus removal processes from wastewater treatment plants and the use of detergents less rich in phosphorus have helped reduce the proportion of urban and industrial phosphorus, in favor of phosphorus of agricultural origin. The discharge of wastewater of urban origin is the largest point source of surface water phosphorus. The phosphorus in wastewater of municipal origin comes essentially from human metabolic waste (urine, faeces), and various household detergents, among others-those used in dishwashers. Considering that the average quantity of waste water produced daily by individuals is around 320 L/d, the average concentration of total phosphorus in wastewater of municipal origin would be approximately 5 mg $P_{tot}$/L. If it is assumed that 2-3% of the organic solids are made up of phosphorus, then a typical waste water containing 20 mg/L of total suspended solids (TSS) contains about 0.5 mg/L of particulate phosphorus, and the balance, about 4.5 mg/L, is therefore composed of soluble phosphorus or orthophosphate and polyphosphate.

In the presence of nitrogen and carbon, an excessive amount of phosphorus can lead to eutrophication of a lake. This phenomenon is defined by nutrient enrichment associated with the natural aging of a body of water, leading to a series of harmful consequences to the extent that this enrichment is accelerated by human activities. Phosphorus is especially significant because it is usually the limiting factor for eutrophication in natural environments of fresh water, which means that the concentration of phosphorus will dictate the impact on the ecosystem, even if other elements are found in abundance. The consequences of eutrophication of a body of water are numerous. They are characterized among others by increase in the growth of plants and algae, increased bacterial biomass, the occurrence of undesirable species (cyanobacteria), a reduction in water transparency that deprives the column of light, a decrease in dissolved oxygen, an increase in pH, taste and odor problems affecting the production of drinking water, as well as multiple nuisances for water activities. It is known that eutrophication can even lead to a decline in freshwater biodiversity. Indeed, the oxygen deficits induced by high bacterial concentrations and toxins released by the masses of algae degradation can cause death in certain species of fish and make water unsafe for birds. It is also possible that undesirable species, better adapted to the new conditions, take the place of native species. Moreover, the aesthetic quality of the water bodies is reduced by the decomposition of the biomass formed by the algae, which involves a decrease in the depth of lakes through increased sedimentation, foam generation on the surface of the water, the proliferation of harmful insects, as well as the release of bad odors. It was highlighted that a surplus of phosphorus was the main cause of outbreaks of blue-green algae, resulting from the excessive proliferation of cyanobacteria, strongly coloring the water with green, turquoise or red tint. These microscopic entities, which possess both the characteristics of bacteria and algae, produce toxins which present a serious risk to the health of users of aquatic environments. Moreover, the surfaces of bodies of water, used for drinking water supply sources, can also be affected by the massive outbreak of blue-green algae, causing serious problems for affected drinking water production stations. Thus it is desirable to minimize phosphorus inputs from wastewater discharges, particularly through the use of phosphate removal equipment in municipal wastewater treatment stations flowing into a lake. There are several methods of phosphorus removal which are widely used worldwide. In all cases, these methods involve fixing the phosphate ions in or on solids which are then separated from the effluent, as reported by de-Bashan et al. in "Recent advances in removing phosphorus from wastewater and its future use as fertilizer (1997-2003)" Water Research 38 (19): 4222-4246 (2004). Depending on the process, these solids can take the form of a precipitate of an insoluble metal salt, substances having high chemical affinity for the phosphorus, a microbial biomass or a plant biomass.

Phosphorus is essential to all forms of life. Therefore, it is possible, under certain conditions, to carry out phosphate removal of wastewater by certain biological agents, either bacteria or plants. Since the 1970s, increasing knowledge of biological mechanisms led to the conception of various types of "activated sludge" processes for performing phosphorus removal up to concentrations as low as 0.1 mg/L in the effluent. This phosphate removal is performed by phosphate accumulating bacteria (Bio-P) that are able to accumulate up to 10% of their mass in phosphorus under certain conditions, compared with about 2% for the bacteria used in conventional activated sludge systems. Generally, as described by Tchobanoglous et al. in "Wastewater Engineering: Treatment and Reuse" Metcalf & Eddy, McGraw Hill Series in Civil and Environmental Engineering, 4th edition, McGraw-Hill, New-York (2003), the biological phosphorus removal mechanism is based on the passage of the Bio-P bacteria in an anaerobic reactor sequence, with no oxygen or nitrate, and anoxic or aerobic reactor, containing oxygen or nitrates, where the removal of nitrogen is generally made jointly to phosphorus removal. Most bio-P bacteria will be evacuated with sludge from a secondary settling tank, taking with them the phosphorus they have drawn from the wastewater, and sludge is recirculated to ensure a continuous supply of Bio-P bacteria in the system.

If biological phosphate removal of wastewater has greatly been studied in the biomass suspension systems, it has been much less in fixed environment systems. In this type of system, a biofilm composed of biomass grows on a fixed support. Biofilters on organic bed, such as those described in U.S. Pat. No. 5,206,206, U.S. Pat. No. 6,100,081 and U.S. Pat. No. 7,374,683, allow the implementation of this type of biological process. The process described in U.S. Pat. No. 5,206,206 uses a mixture of peat and an iron compound in order to capture more phosphorus. The processes described in U.S. Pat. No. 6,100,081 and U.S. Pat. No. 7,374,683 disclose blends of peat and wood chips, the latter acting as a structuring agent and diffuser for water and air, but do not have a specific capacity for purifying phosphorus. The difficulty to expose the fixed biomass to alternating anaerobic and aerobic environments, essential for Bio-P bacteria, constitutes the major problem for biological phosphorus removal in a fixed environment. The majority of wastewater treatment plants that practice phosphorus removal use processes that involve the injection of chemicals in order to precipitate phosphates, as reported by de-Bashan et al. supra, the precipitate being subsequently separated from the effluent by decantation or by filtration. The main features to consider for chemical phosphorus removal are: which chemicals are used, the required dosage, the injection site, the equipment required and the sludge produced. In most cases, trivalent metal salts are used. These products, commonly distributed in liquid form, are aluminum sulfate ($Al_2(SO_4)_3 \cdot 7H_2O$) (also known as alum), iron chloride ($FeCl_3$) and iron sulfate ($Fe_2(SO_4)_3 \cdot 9H_2O$). Quicklime ($CaO$ or $Ca(OH)_2$), formerly widely used because of its low cost, is now much less used because of the much higher sludge mass produced, as well as various issues related to operations and handling of the reagent. Iron chloride ($FeCl_3$) was used in the work carried out by Eberhardt et al. described in "Phosphate removal by refined aspen wood fiber treated with carboxymethyl cellulose and ferrous chloride." Bioresource Technology 97: 2371-2376. (2005). Other related works are described by Eberhardt et al. in "Biosorbents prepared from wood particles treated with anionic polymer and iron salt: Effect on particle size on phosphate adsorption" Bioresource Technology 99:5617-5625 (2008), by Han et al. in "Removal of phosphorus using chemically modified lignocellulosic materials" $6^{th}$ Inter-Regional Conference on Environment-Water—Land and Water Use Planning and Management—Albacete, Spain, Sep. 3-5, 2003 and by Kuo et al. in "Sorption and desorption of chromate by wood shavings impregnated with iron or aluminum oxide" Bioresource Technology 99(13): 5617-5625 (2008), by Robertson in "Treatment of Wastewater Phosphate by Reductive Dissolution of Iron" Journal of Environ. Qual. Vol. 29, September-October 2000 pp. 1678-1685, and by Robertson et al. in <<Treatment of Wastewater Phosphate by Reductive Dissolution of Iron>> Journal of Environ. Qual. Vol. 40 (2011) pp. 1955-1962.

In contexts where the flow rates to be treated are minor, the phosphorus removal techniques presented above are more or less applicable, particularly because of the significant costs related to the acquisition of equipment required and the complexity of operations involved.

To meet the needs of small installations with limited budget and manpower, several studies have focused on phosphate removal by passive capture filters. The general principle of the passive capture of accumulating a problematic substance within a filter consists of materials having a high chemical affinity for the contaminant, so that retention of the contaminant occurs by its phase change from liquid to solid. The filter media will be able to capture the pollutant until saturated, after which it must be replaced or regenerated. To limit substitutions, as noted by Cucarella et al. in <<Phosphorus Sorption Capacity of Filter Materials Used for On-site Wastewater Treatment Determined in Batch Experiments-A Comparative Study>> Journal of Environmental Quality 38(2): 381-392 (2009), it is important that the filter media has a strong capacity to support the pollutant, to consider the physical properties of the filter media, and in particular its specific surface determined by particle shape, size and porosity. The property inherent to pollutant management is generally designated as "sorption" and involves a combination of adsorption, ion exchange and precipitation. Phosphorus capture mechanisms by iron (Fe) and aluminum (Al) are quite similar, whereas the action of calcium (Ca) is different. Forms of Fe and Al having the greatest affinity for phosphorus are oxyhydroxides, also called sesquioxide metals, consisting of a compact arrangement of oxygen and/or hydroxyl (OH—) ions, which contain metal ions in their octahedral cavity, iron hydroxide ($Fe(OH)_3$) and aluminum oxide ($Al_2O_3$) being examples. Sesquioxides can be crystalline or amorphous structures. Therefore, without any particular organization, the latter can support many more orthophosphate ions than the crystalline forms. For nearly two decades, numerous studies have focused on materials with high concentrations of Fe, Al and Ca with phosphorus sorption capacity (PSC), which may constitute the packing of passive capture filters, as reported by Johansson Westholm <<Substrates for phosphorus removal-Potential benefits for on-site wastewater treatment?>> Water Research 40(1): 23-36 (2006) and by Cucarella et al., cited above, these materials including natural products, industrial byproducts and manufactured goods. Natural products, generally less expensive than industrial byproducts and manufactured goods, can be used directly or undergo minor treatments such as crushing or heating. Among the materials contained in this category are various sands and gravels, apatite, opoka, wollastonite, zeolites, peat, mollusk shells, bauxite, dolomite, alunite, limestone and polonite, as listed by Vohla et al. in "Filter materials for phosphorus removal from wastewater in treatment wetlands—A review" Ecological Engineering 37(1): 70-89 (2011).

SUMMARY OF THE INVENTION

The main aspect of the present invention relates to a system and a method for wastewater treatment involving a phosphorus passive capture filter packed with wood activated by impregnation with a metal in its hydroxide form.

According to a first aspect of the invention, there is provided a wastewater treatment system comprising a passive filter to capture phosphorus, said filter packed with activated wood impregnated with a metal in its hydroxide form.

According to another aspect of the present invention, there is proposed a waste water treatment system including a trickling biofilter on organic bed, followed by an immersed passive capture filter packed with wood activated by impregnation with a metal in its hydroxide form and supporting a denitrifying biomass to simultaneously perform denitrification for processing wastewater.

According to further aspect of the present invention, there is proposed a wastewater treatment method comprising the step of filtering through a phosphorus passive capture filter medium packed with wood activated by impregnation with a metal in its hydroxide form.

According to another aspect of the present invention, there is proposed a wastewater treatment method comprising a first step of filtration through a trickling biofilter on organic bed, followed by a second step of filtration through a phosphorus passive-capture filter medium packed with wood activated by impregnation of a metal in its hydroxide form and supporting a denitrifying biomass to simultaneously perform denitrification for processing wastewater.

DETAILED DESCRIPTION OF THE INVENTION

Certain embodiments of the invention will be described in detail in this document, in reference to the accompanying figures, such as described below:

Figure 4:
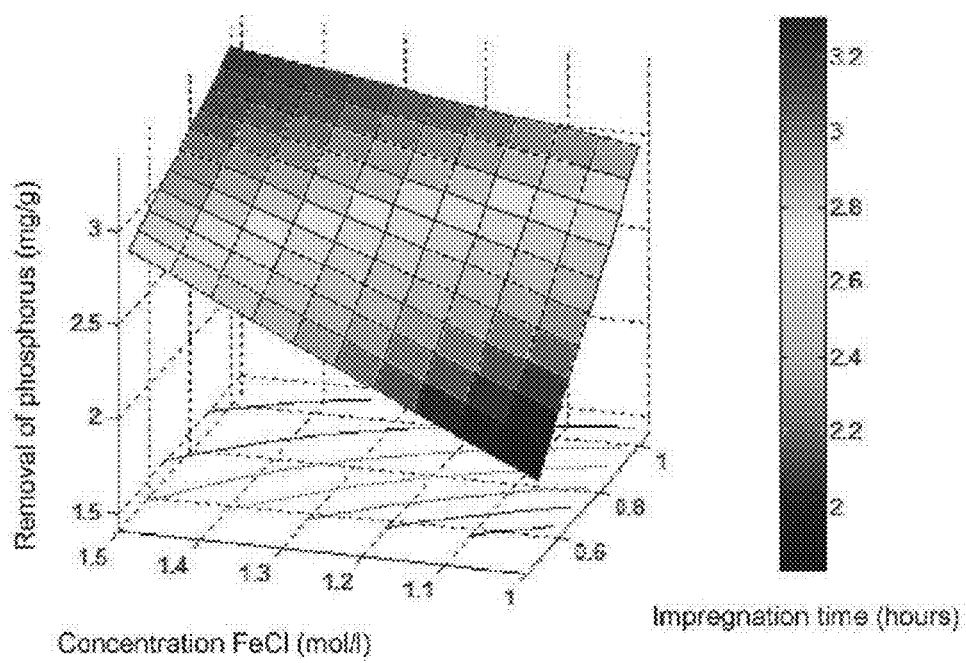
Figure 5:
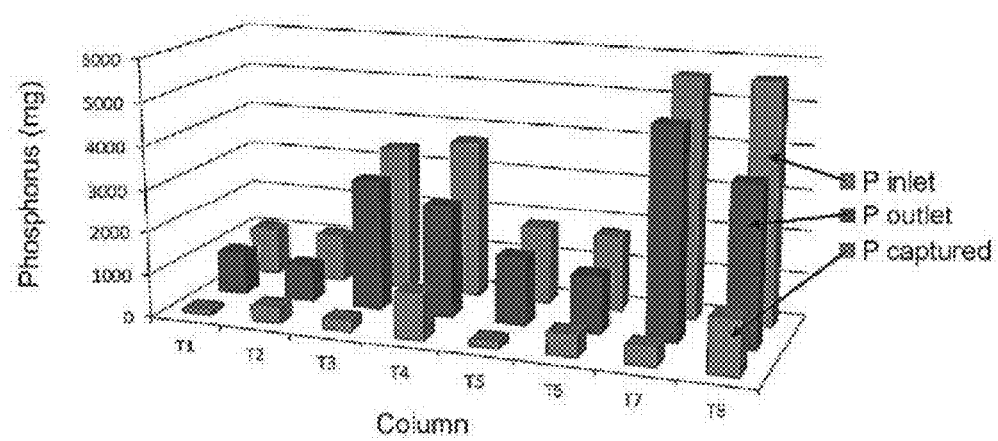
Figure 6:
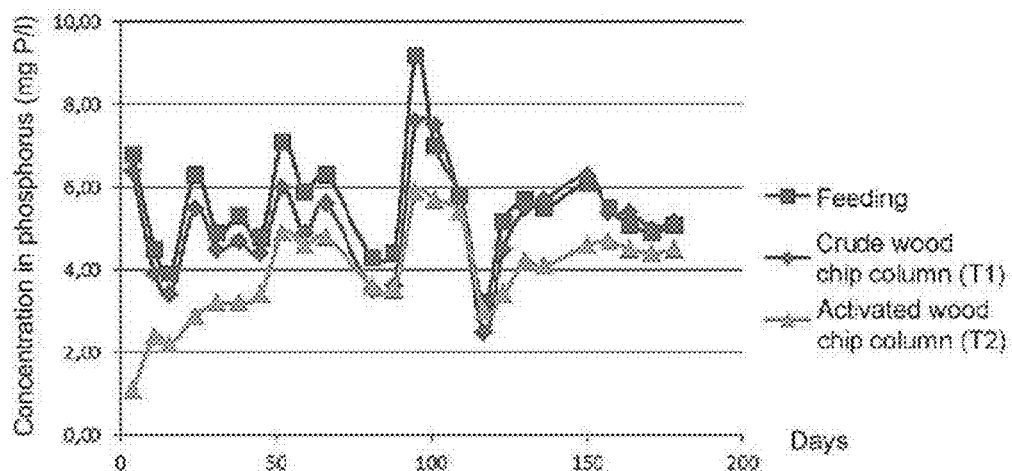
Figure 7:
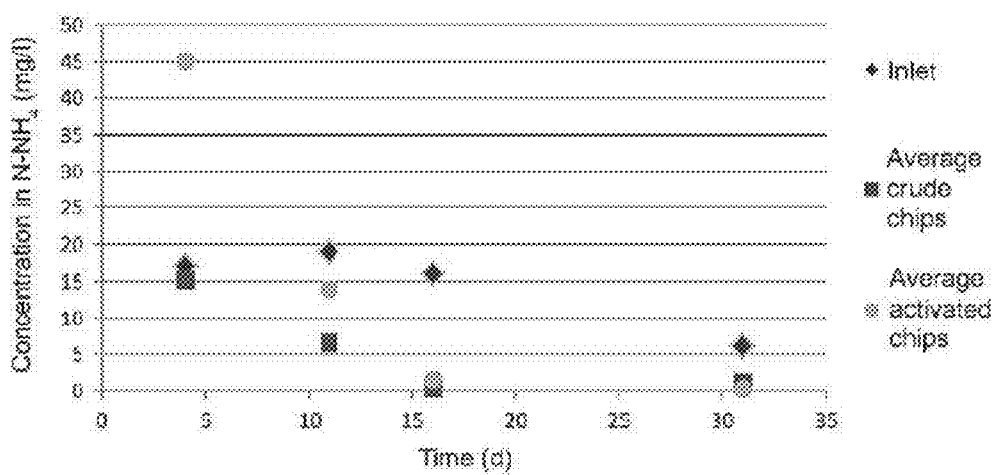
Figure 8:
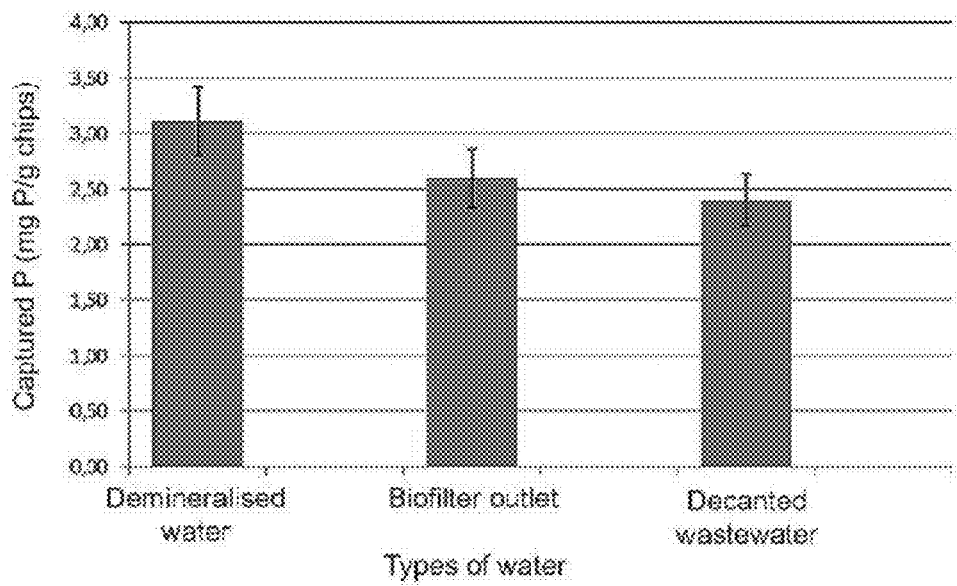
Figure 9:
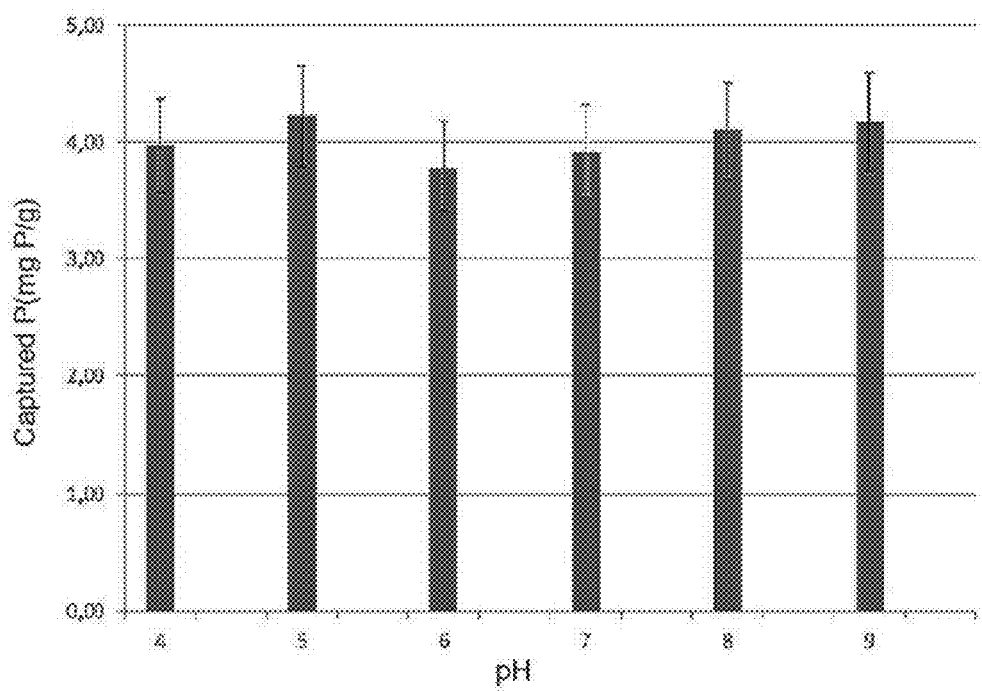
Figure 10:
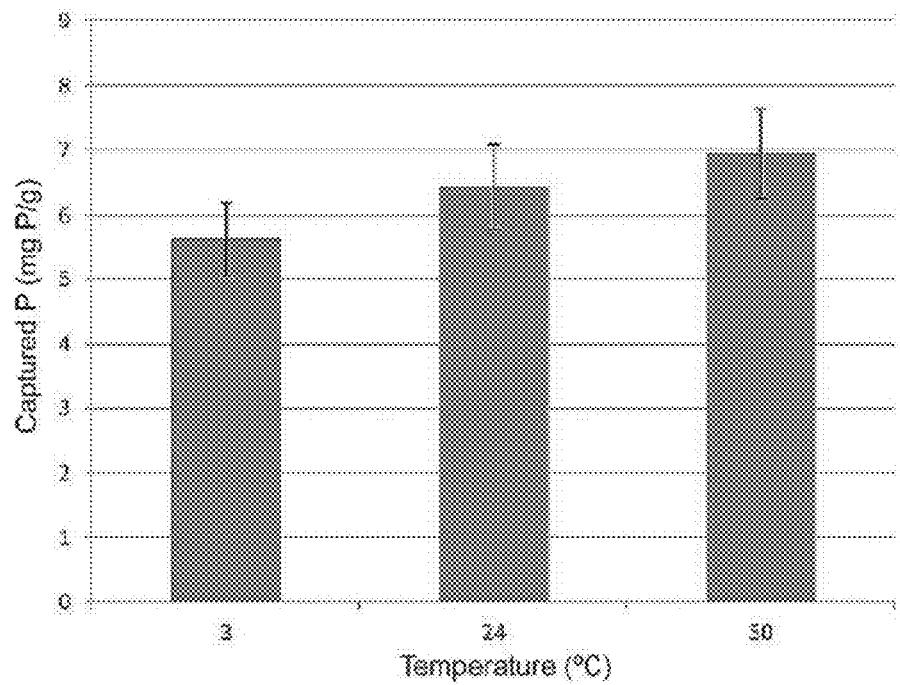
Figure 11:
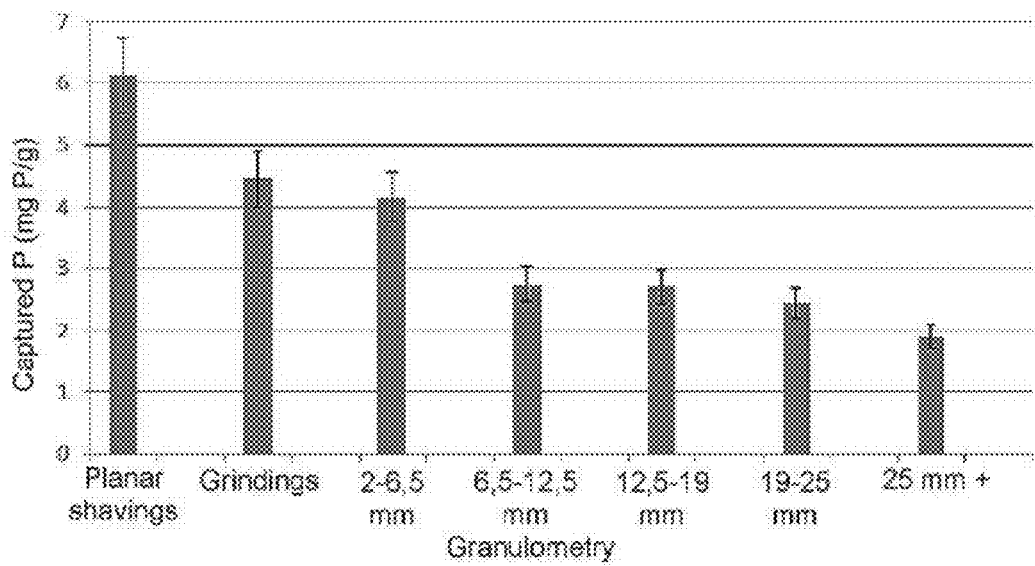
Figure 12:
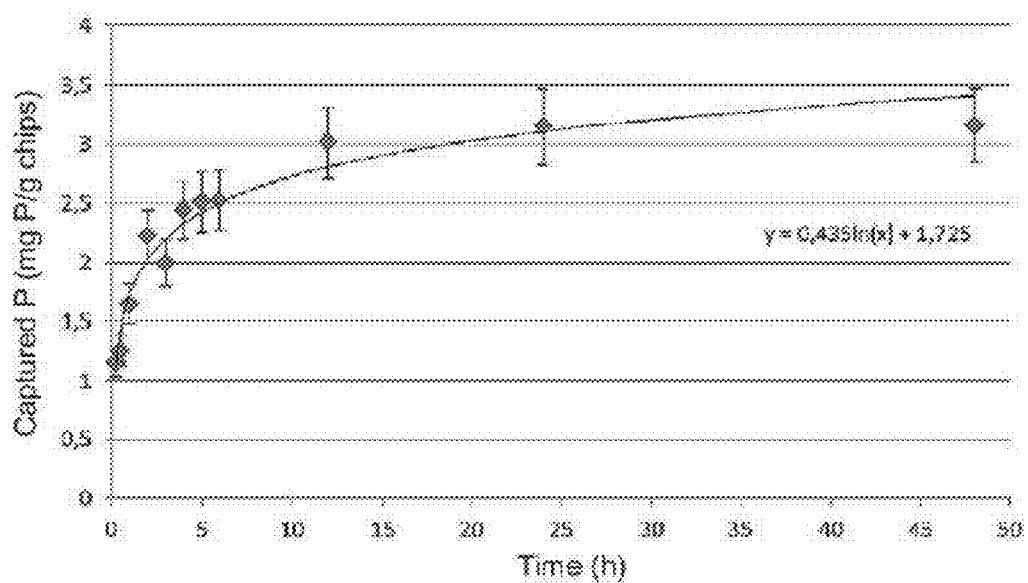
Figure 13:
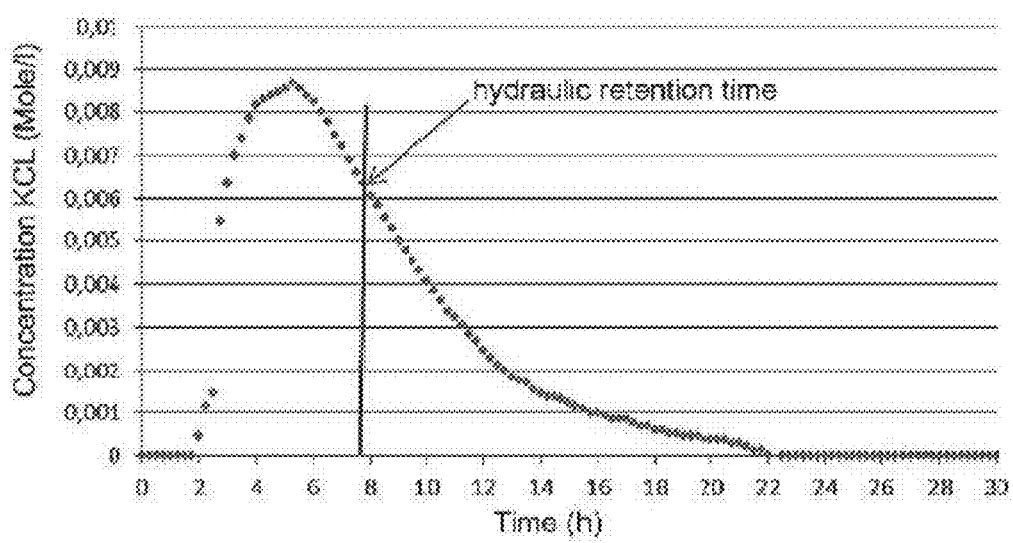
Figure 14:
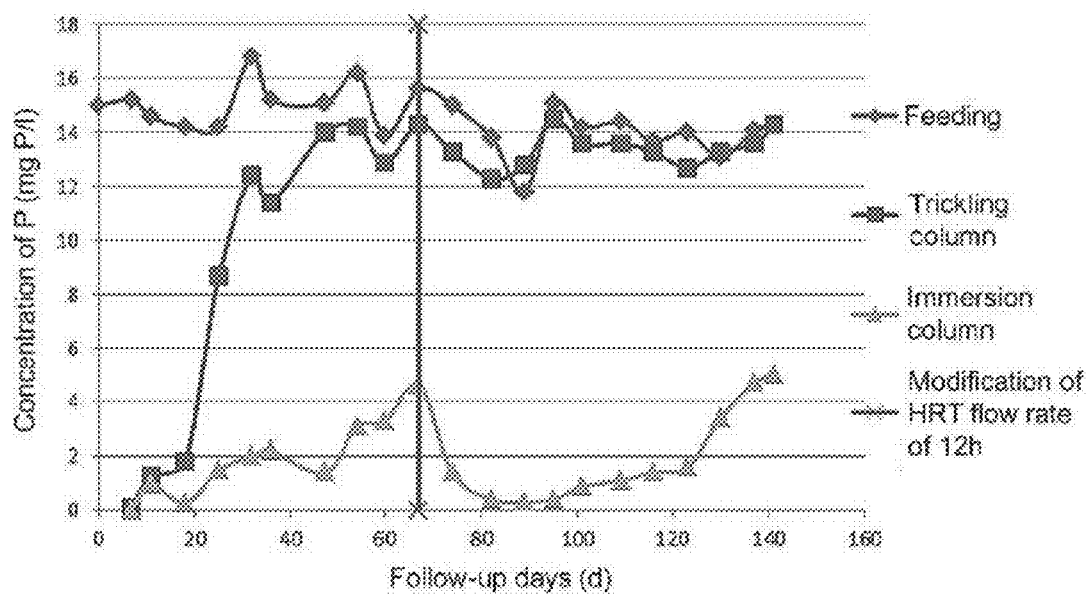
Figure 15:
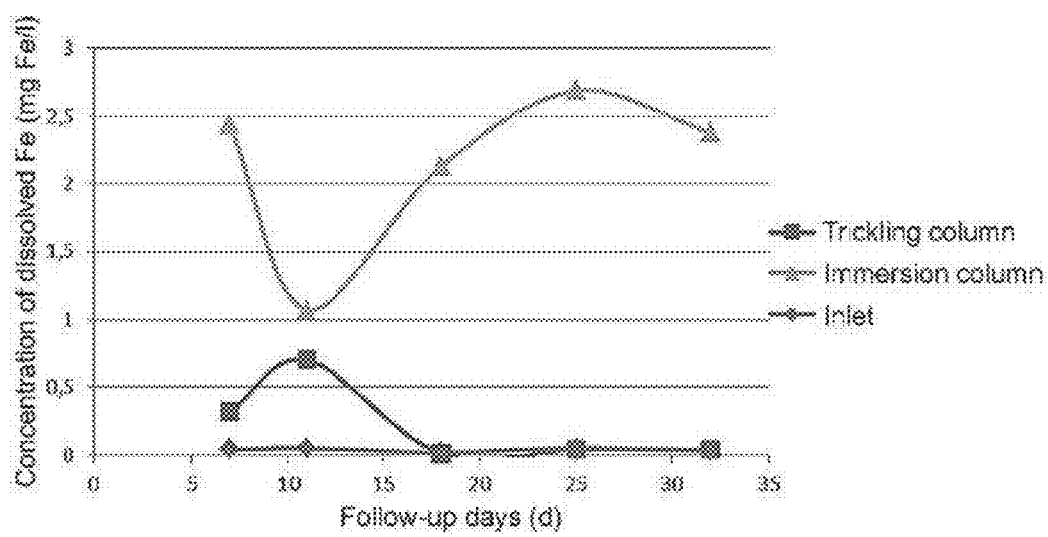
Figure 16:
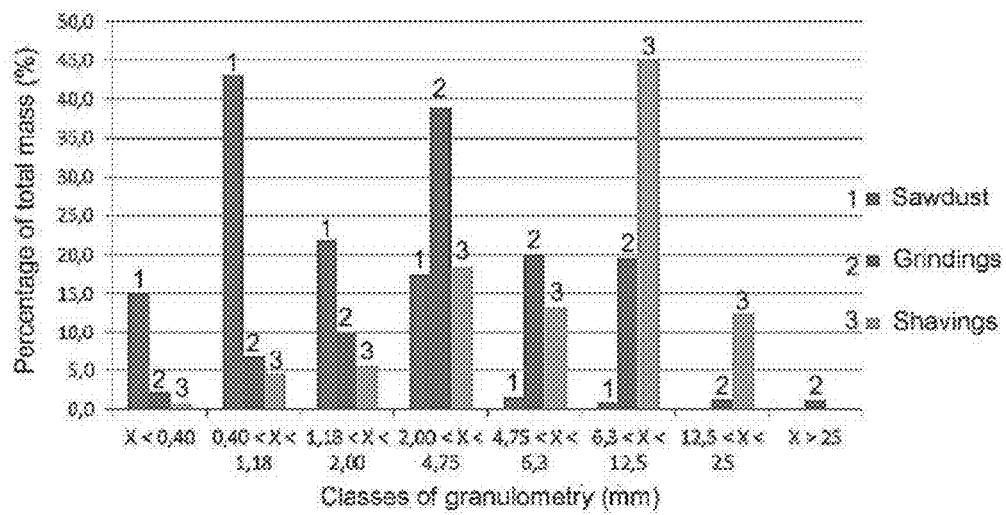
Figure 17:
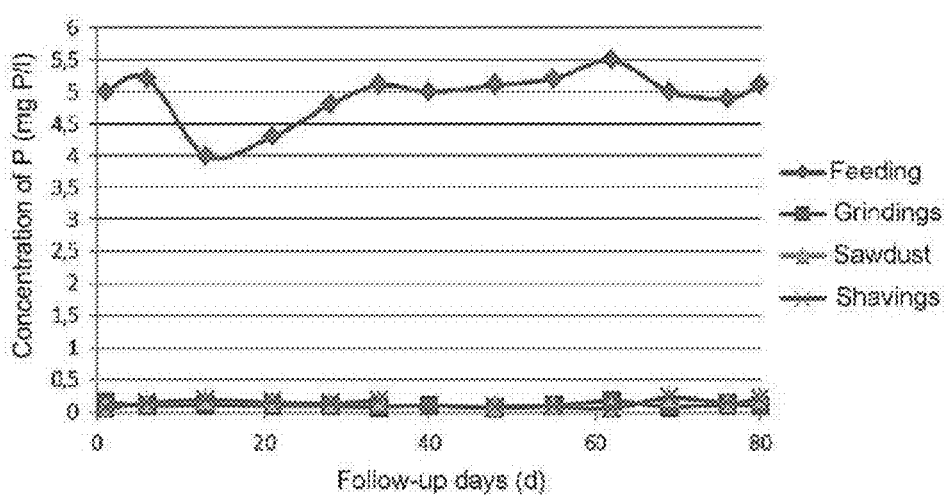
Figure 18:
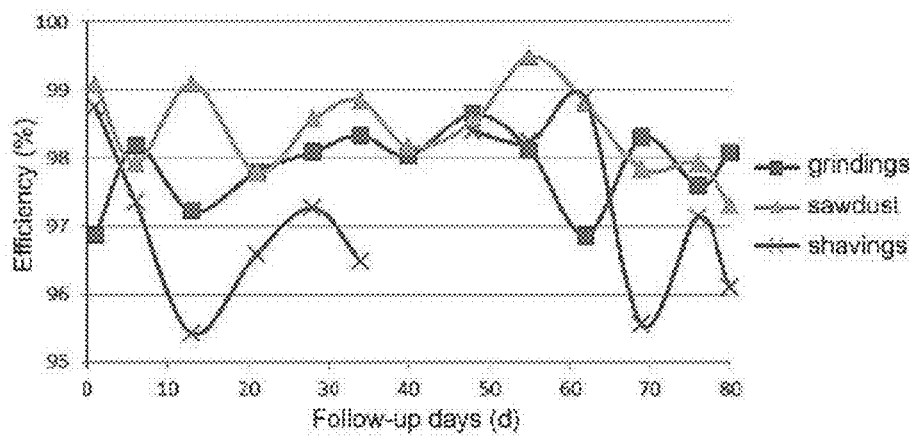
Figure 19:
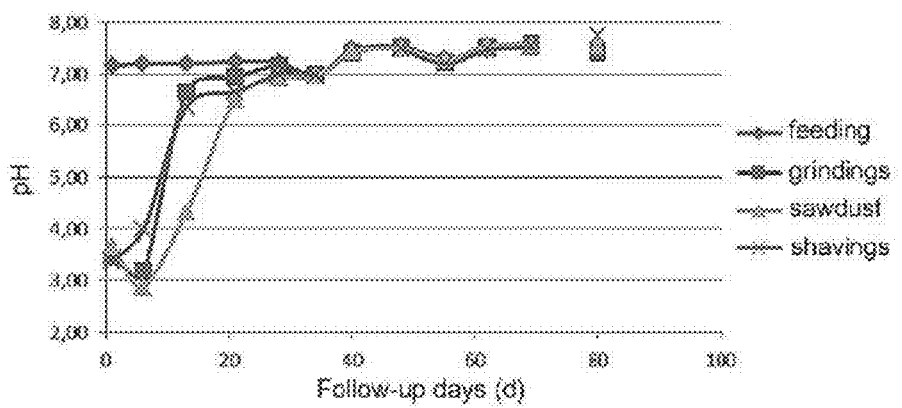
Figure 20:
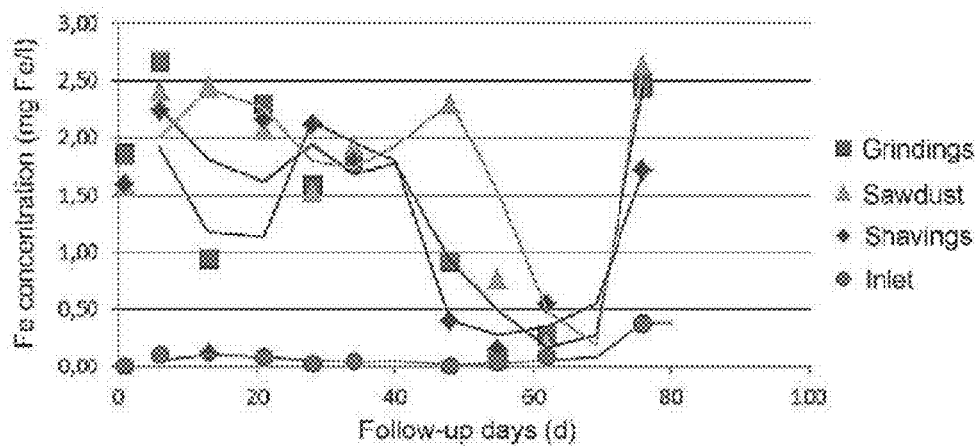
Figure 21:
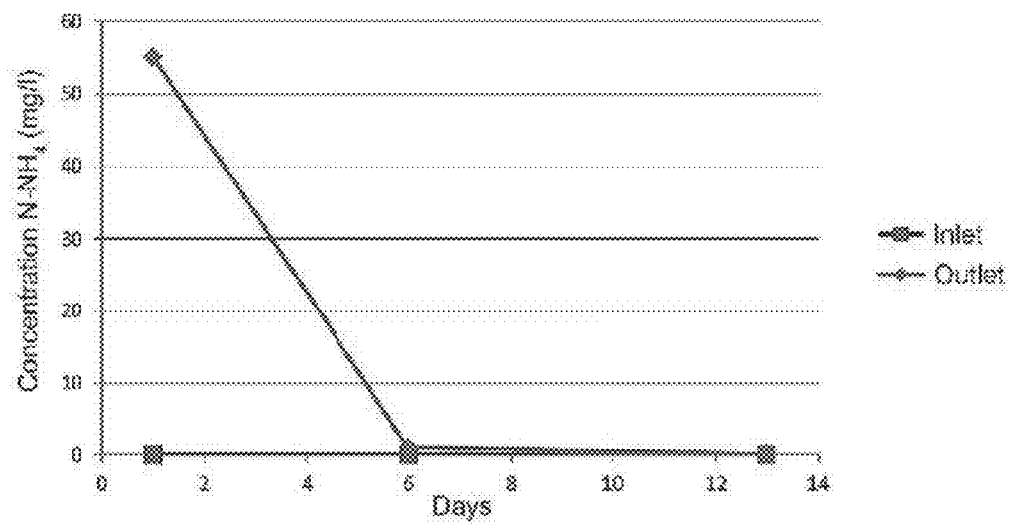
Figure 22:
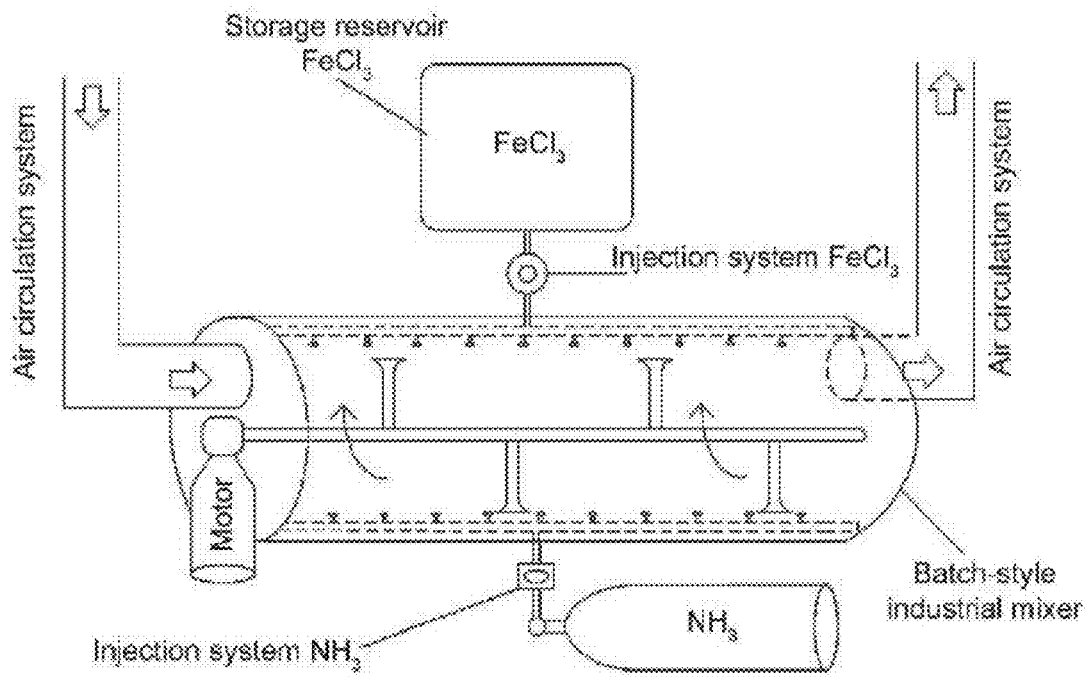
Figure 23:
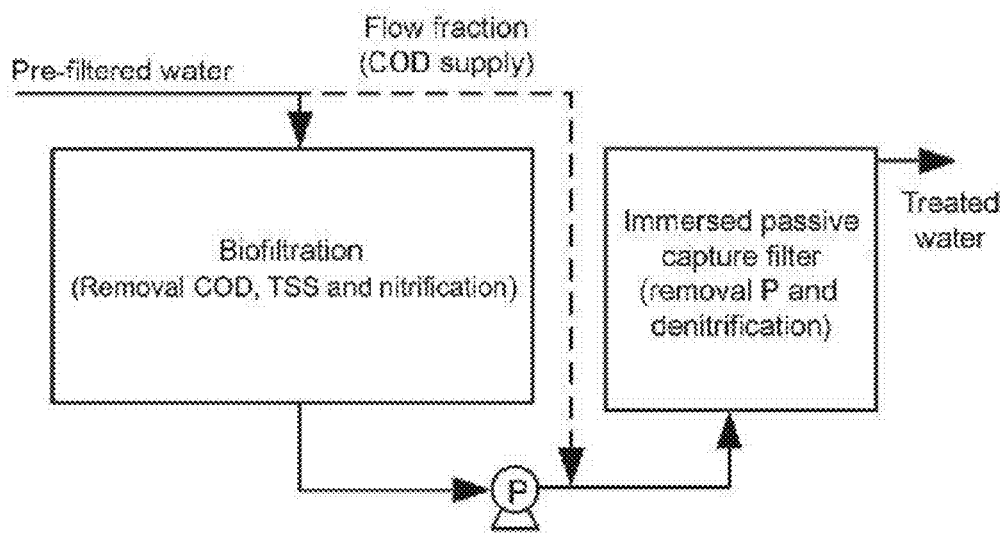
Figure 24:
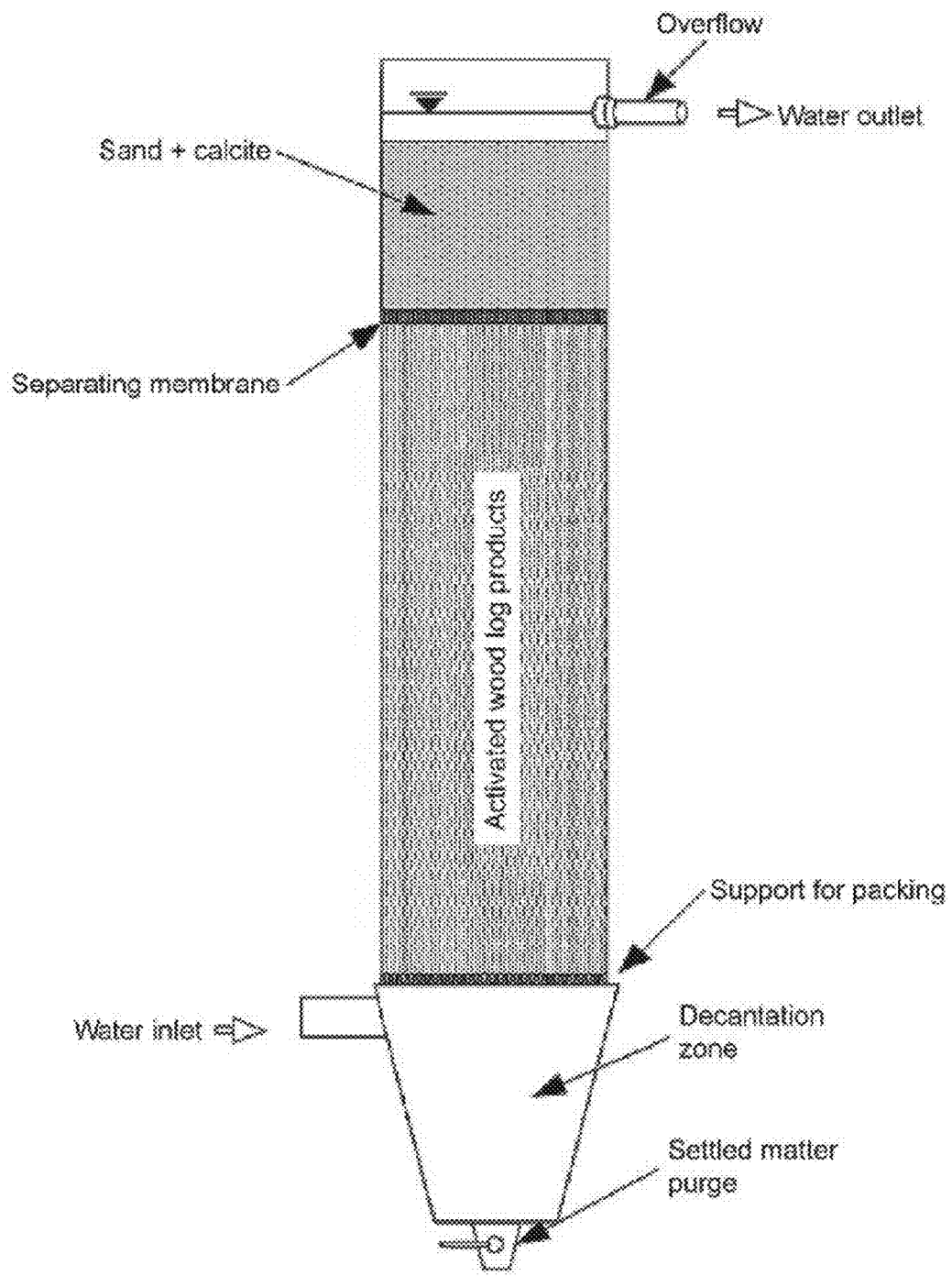
Figure 25:
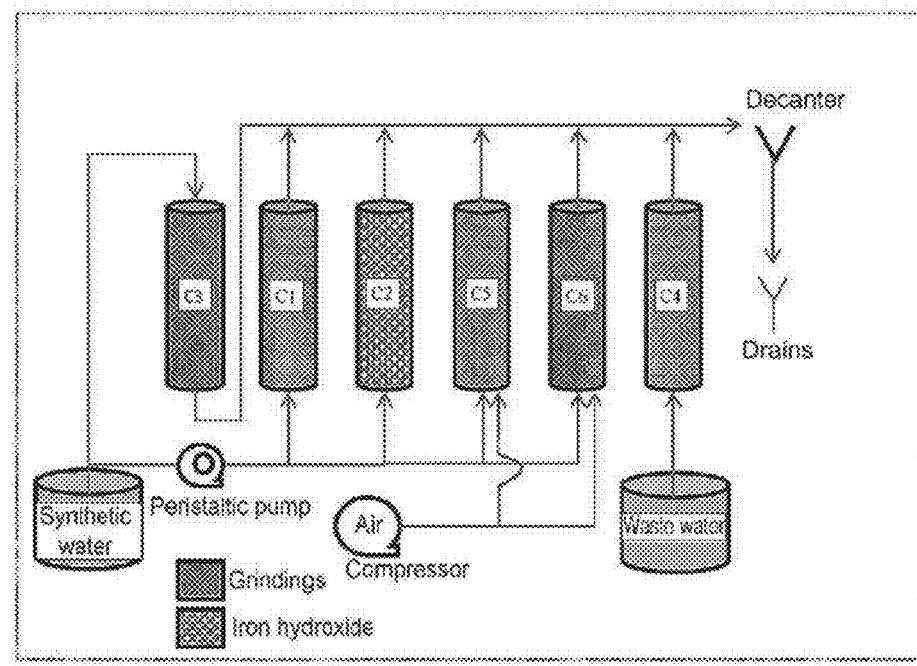
Figure 26:
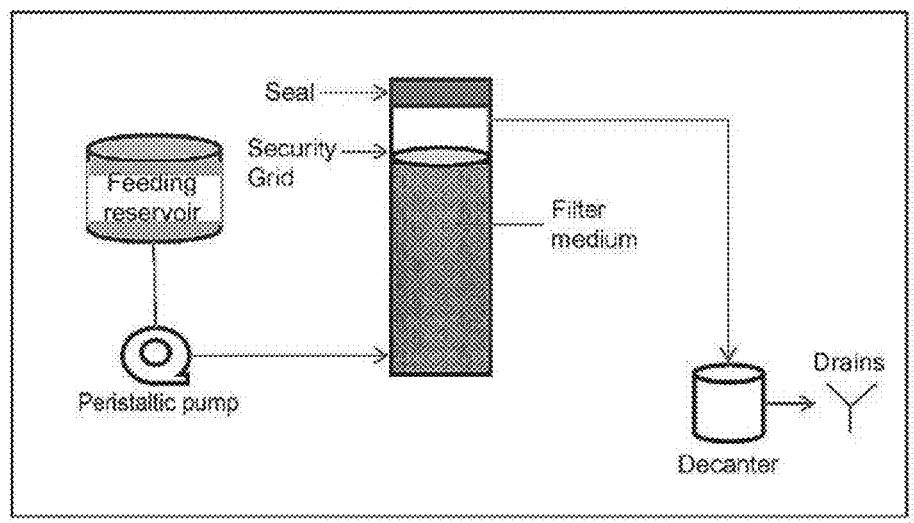
Figure 27:
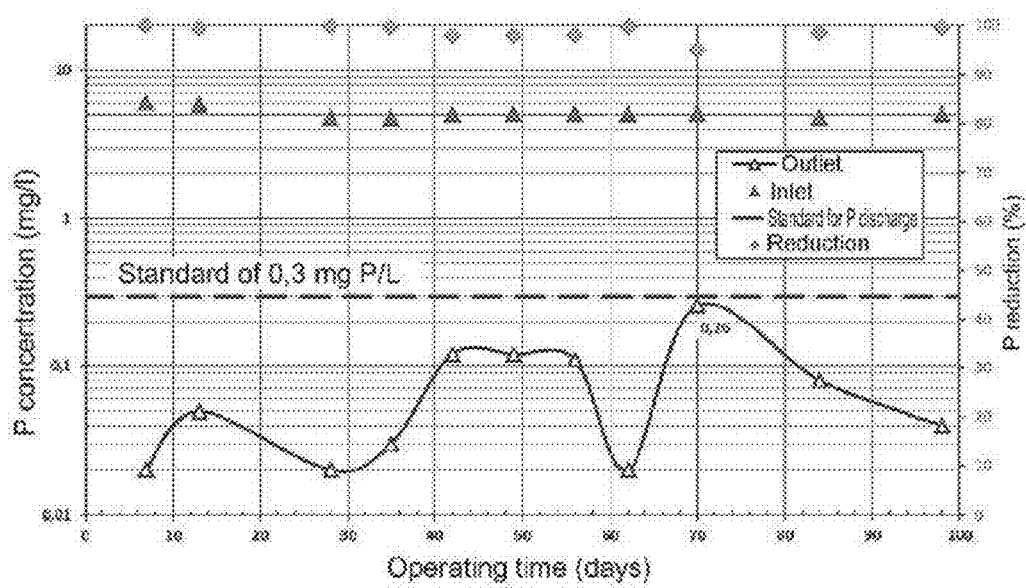
Figure 28:
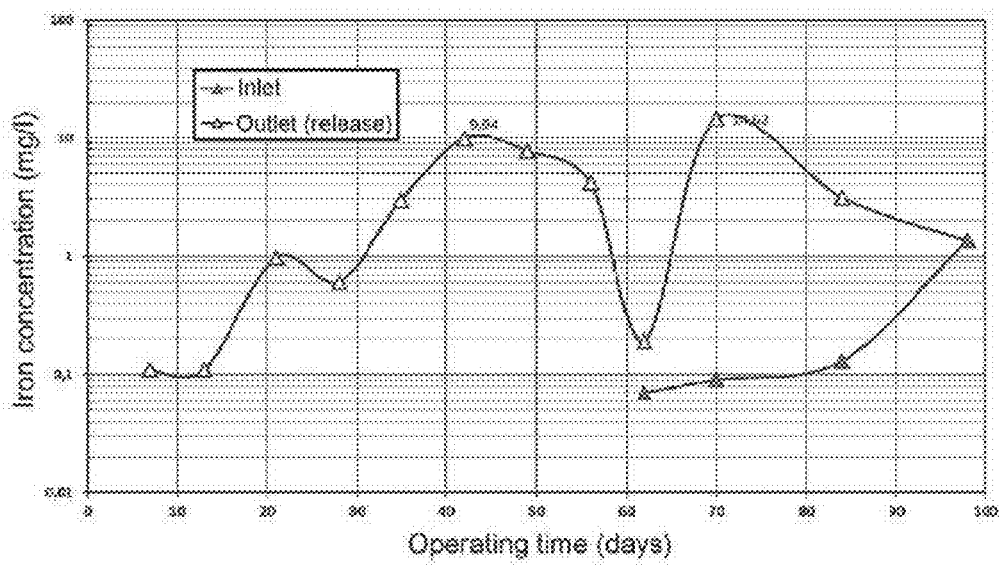
Figure 29:
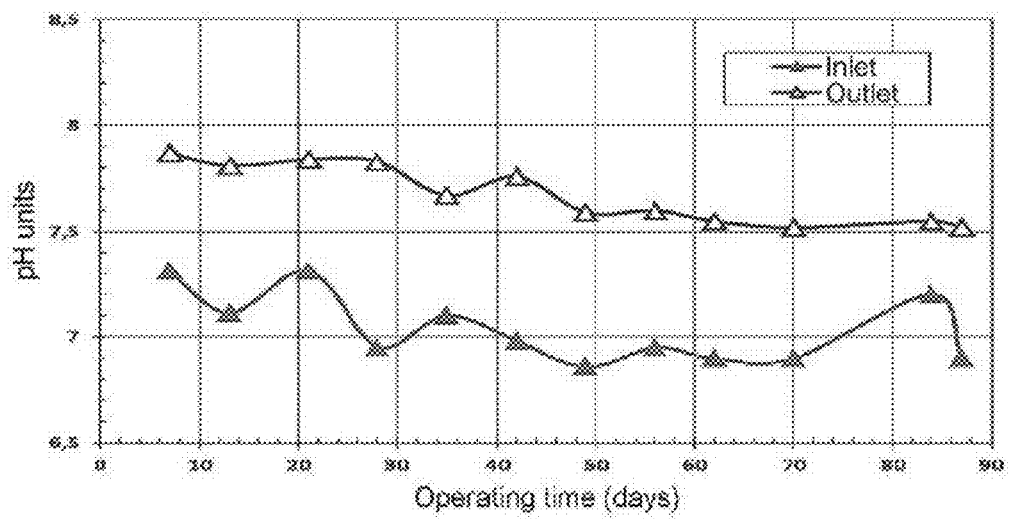
Figure 30:
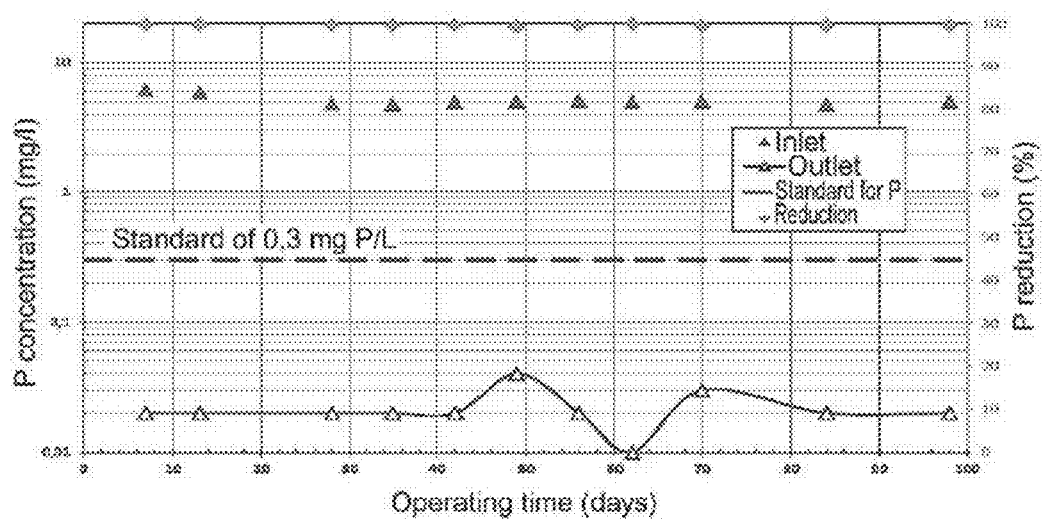
Figure 31:
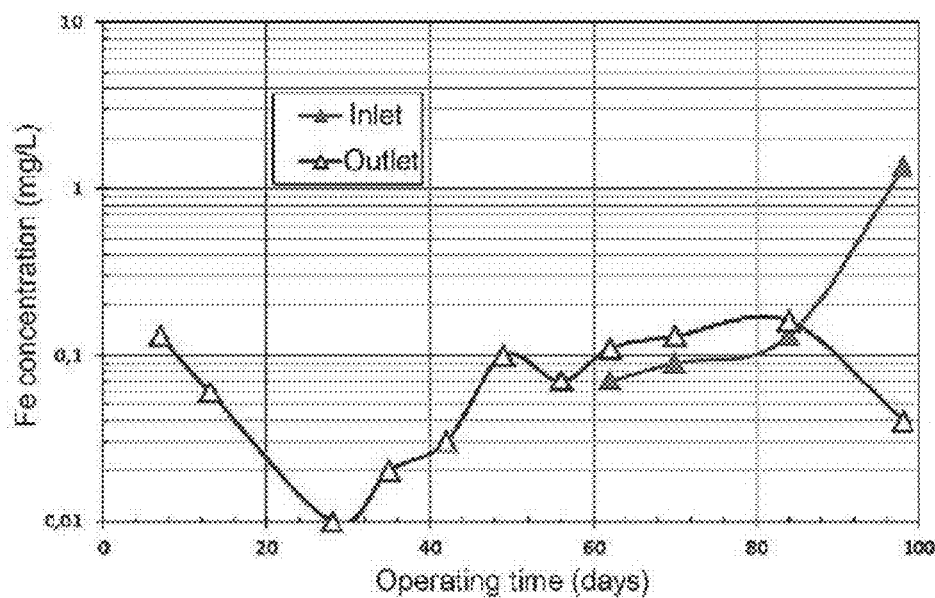
Figure 32:
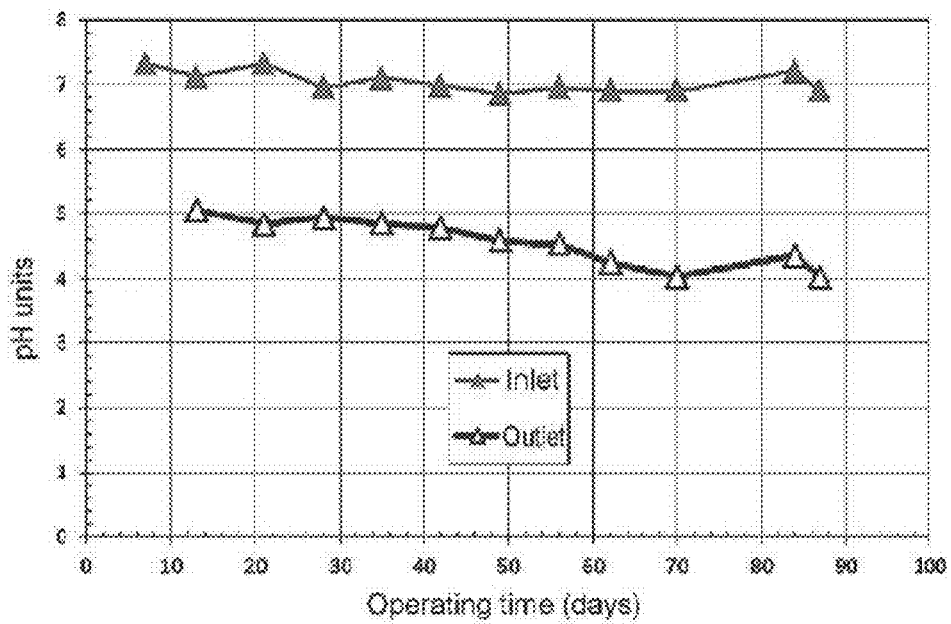
Figure 33:
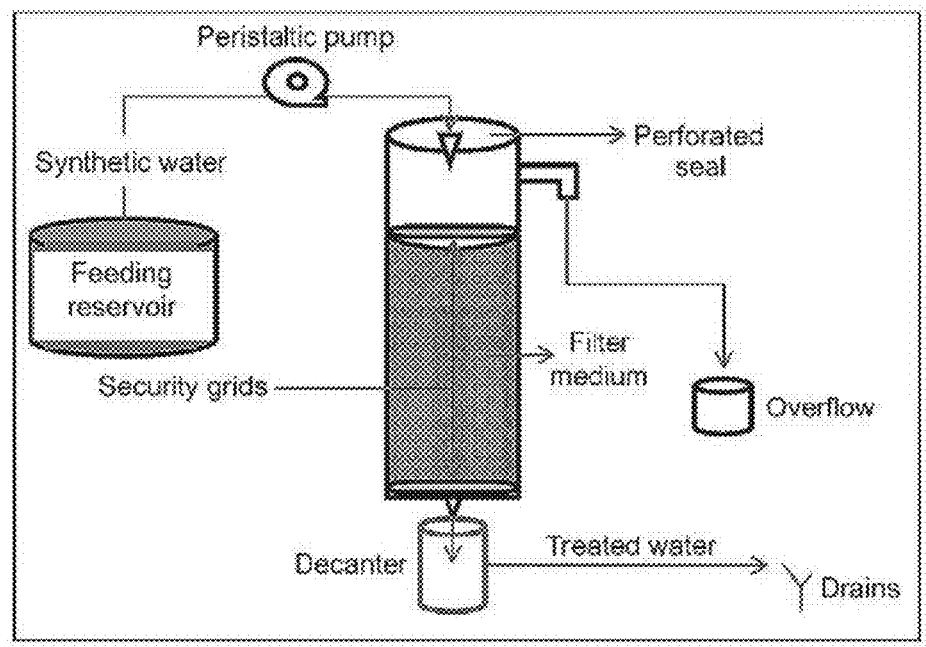
Figure 34:
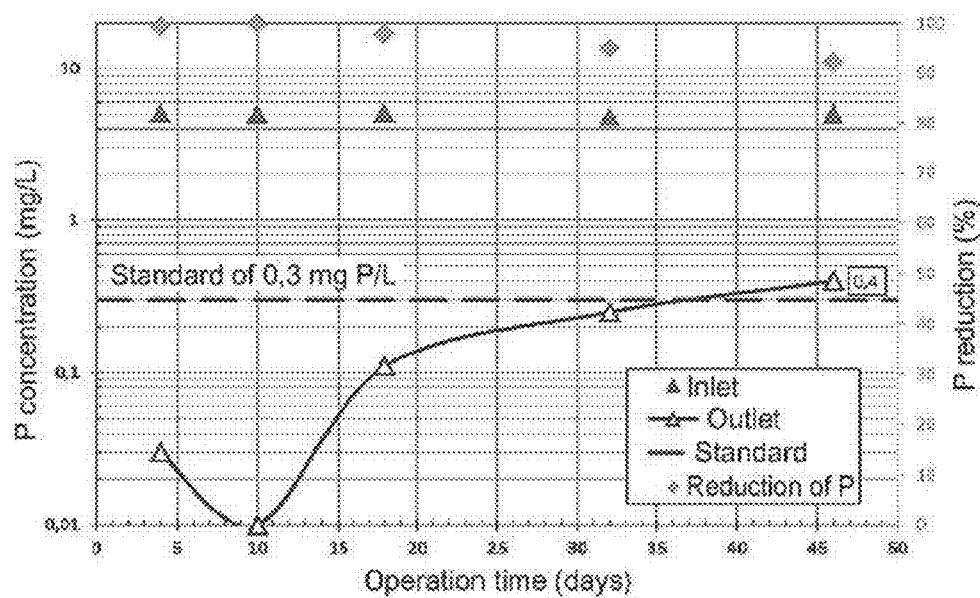
Figure 35:
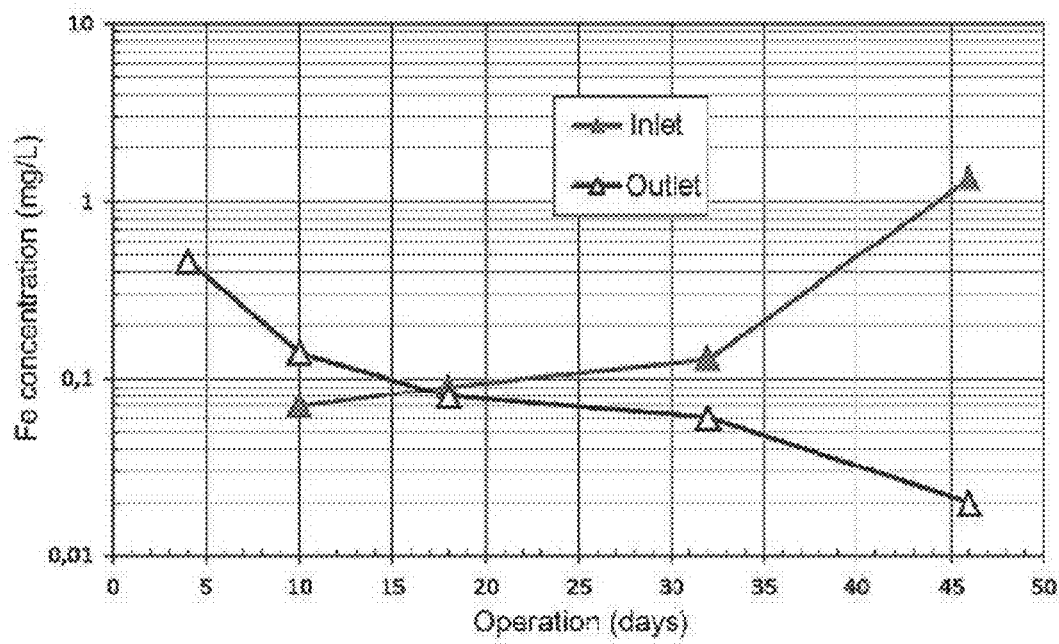
Figure 36:
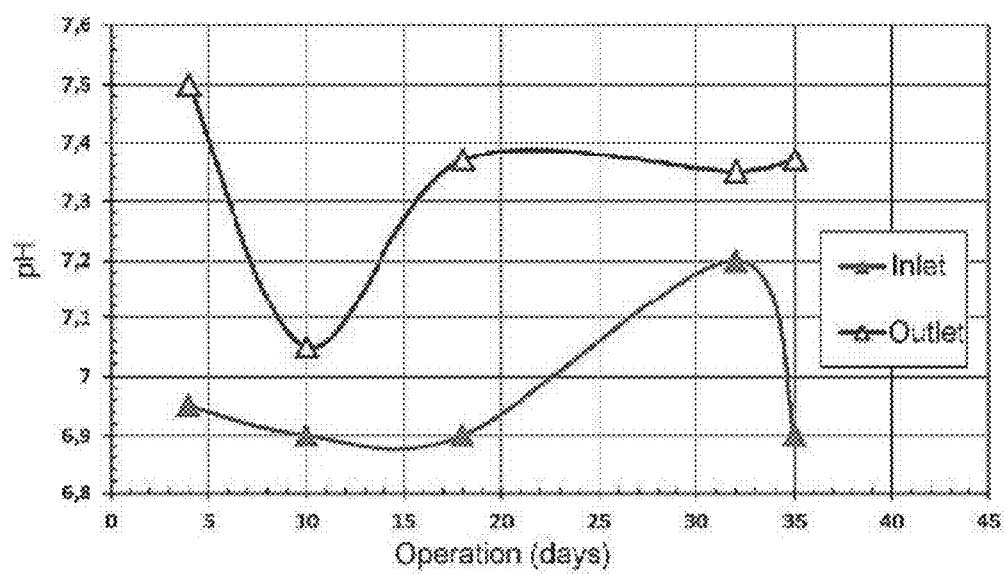
Figure 37:
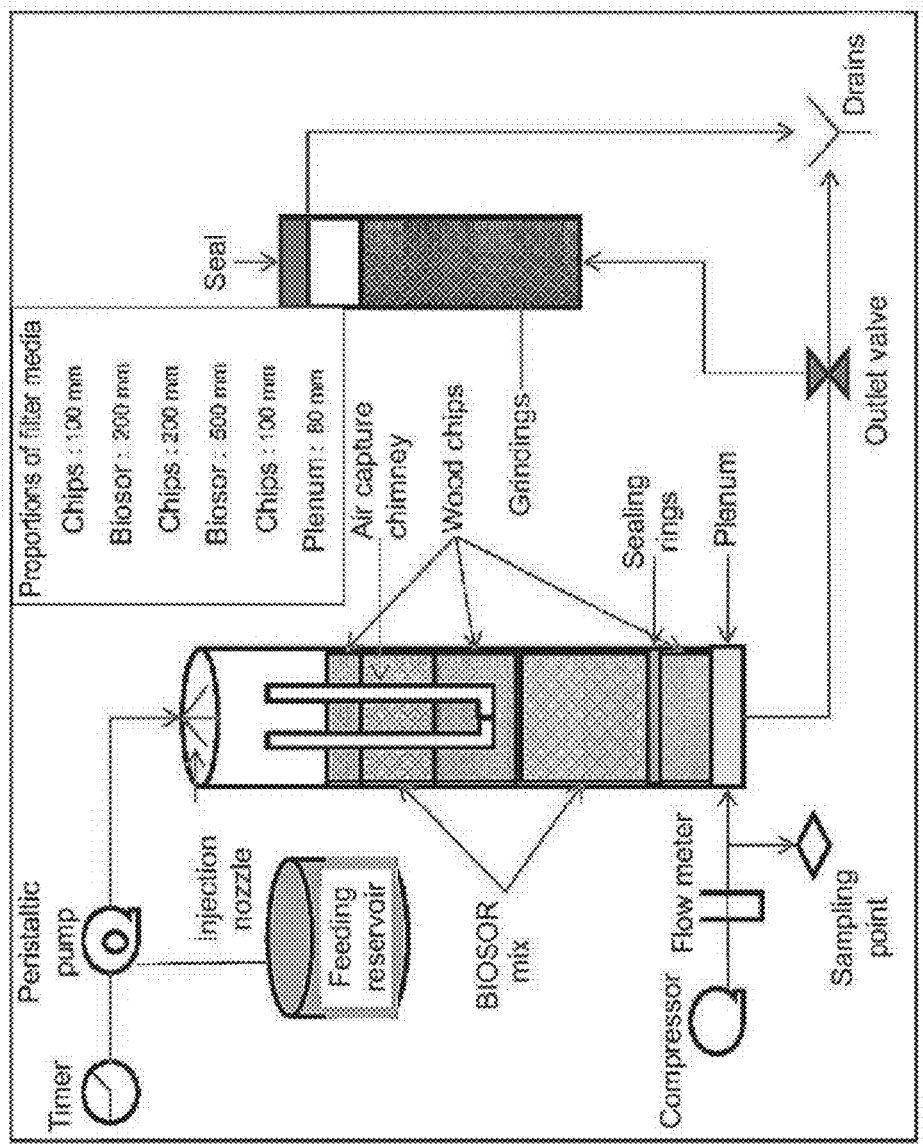
Figure 38:
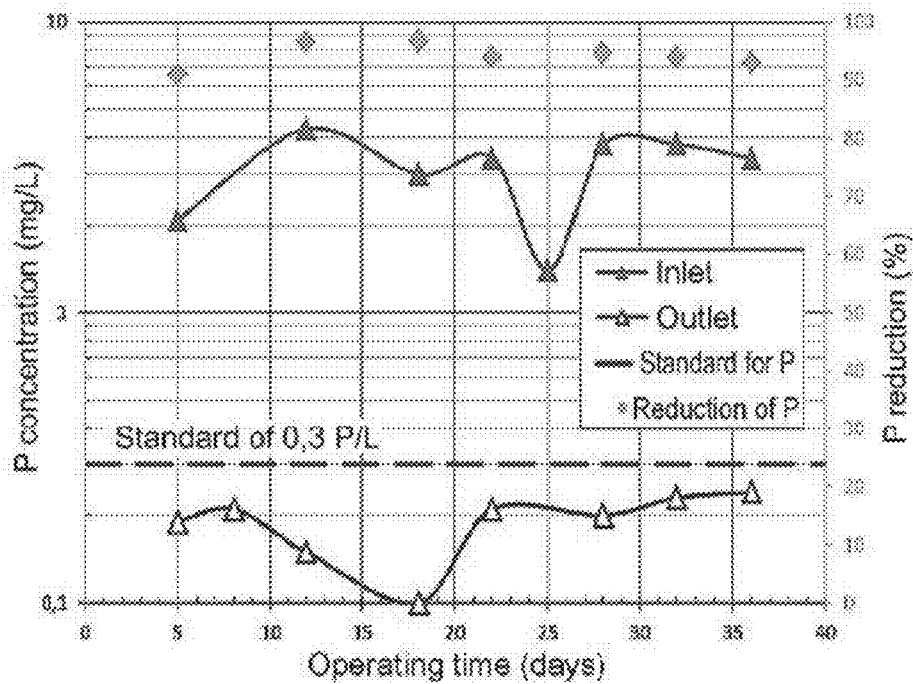
Figure 39:
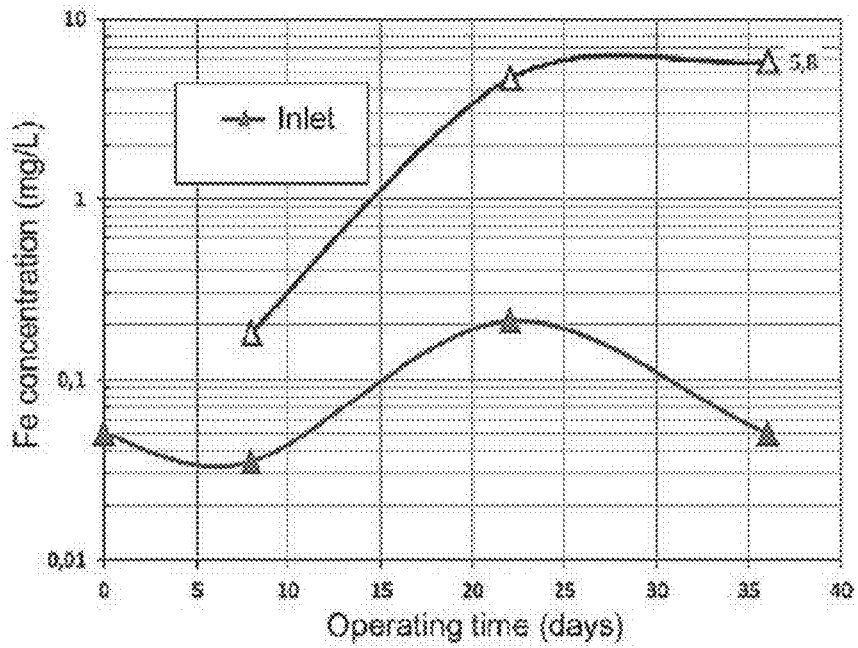
Figure 40:
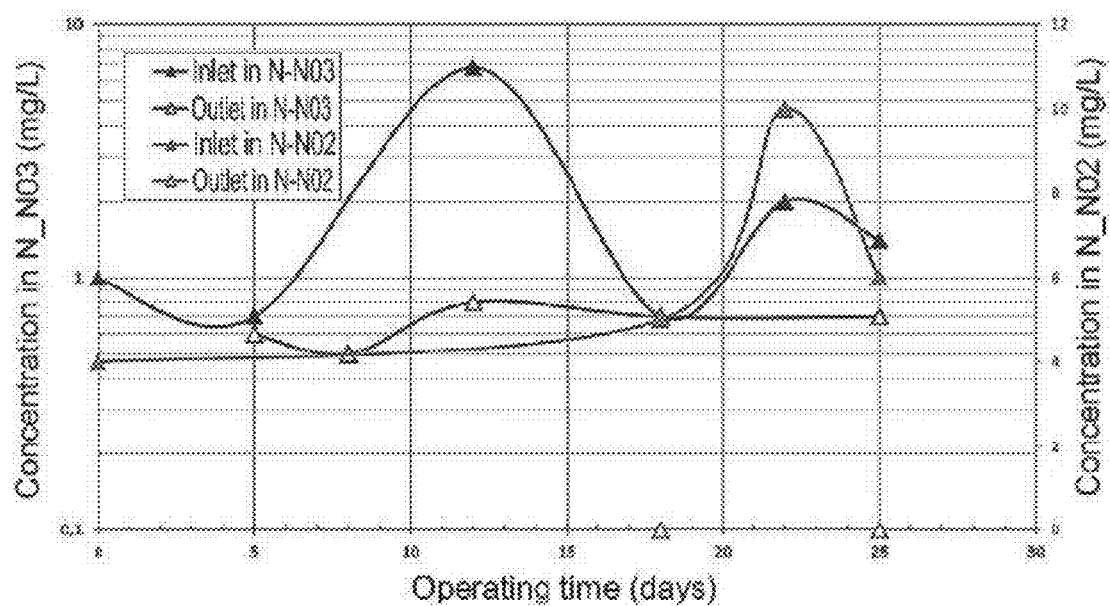
Figure 41:
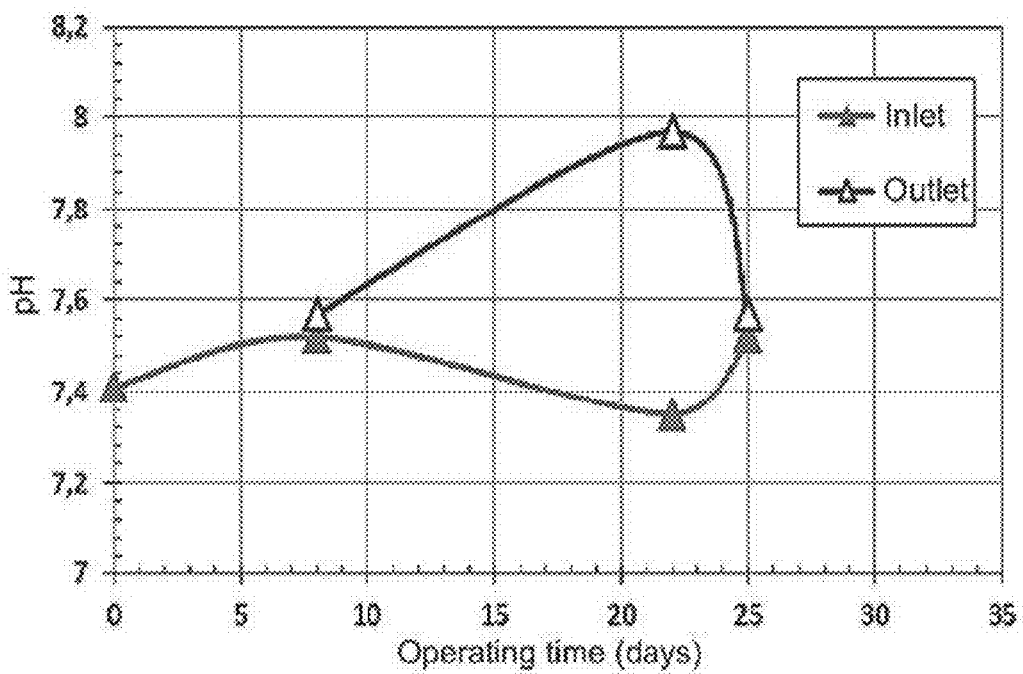
Figure 42:
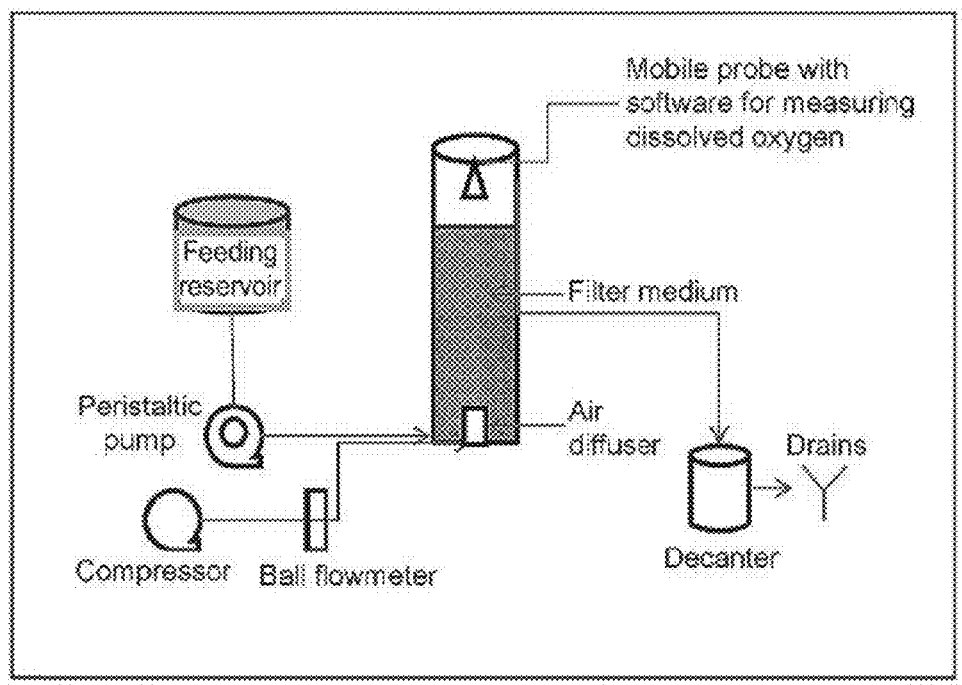
Figure 43:
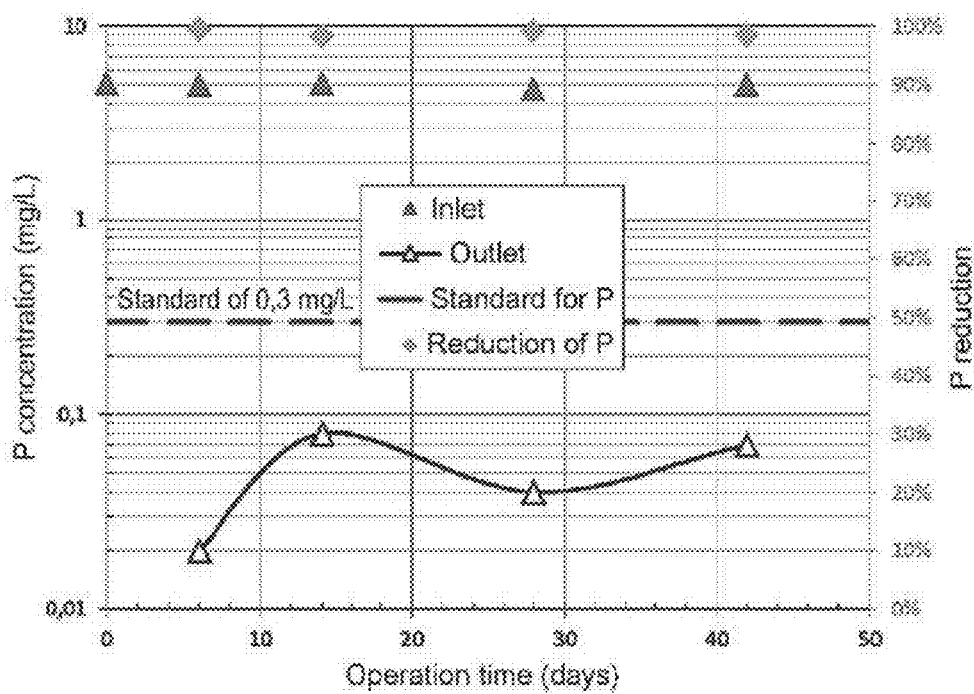
Figure 44:
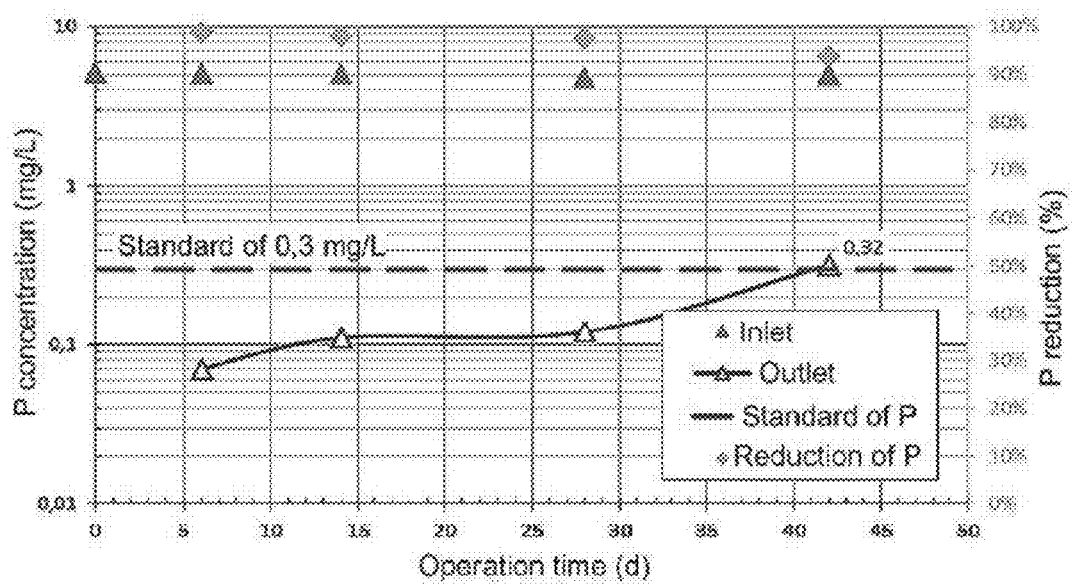
Figure 45:
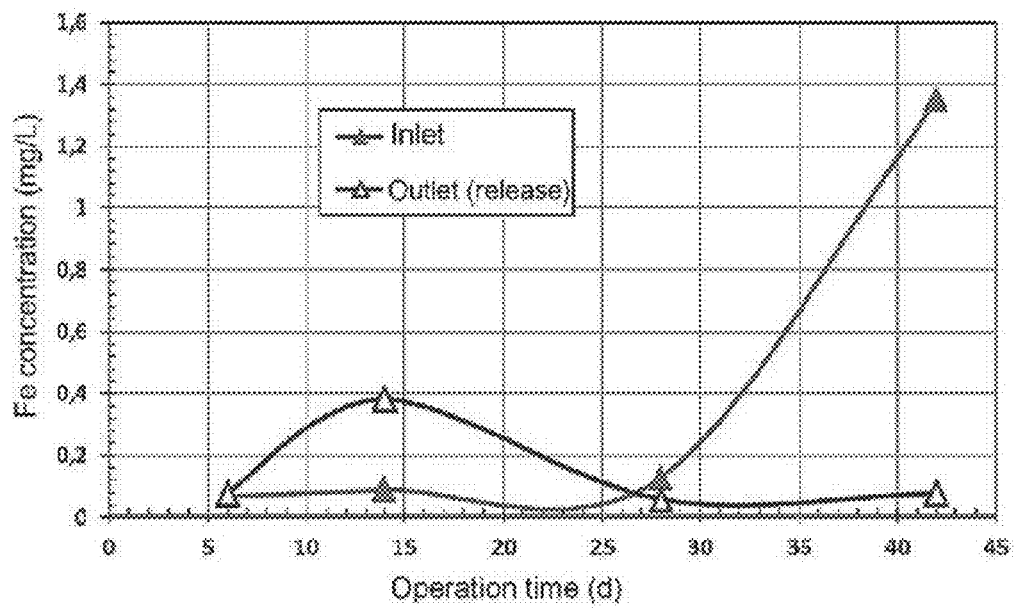
Figure 46:
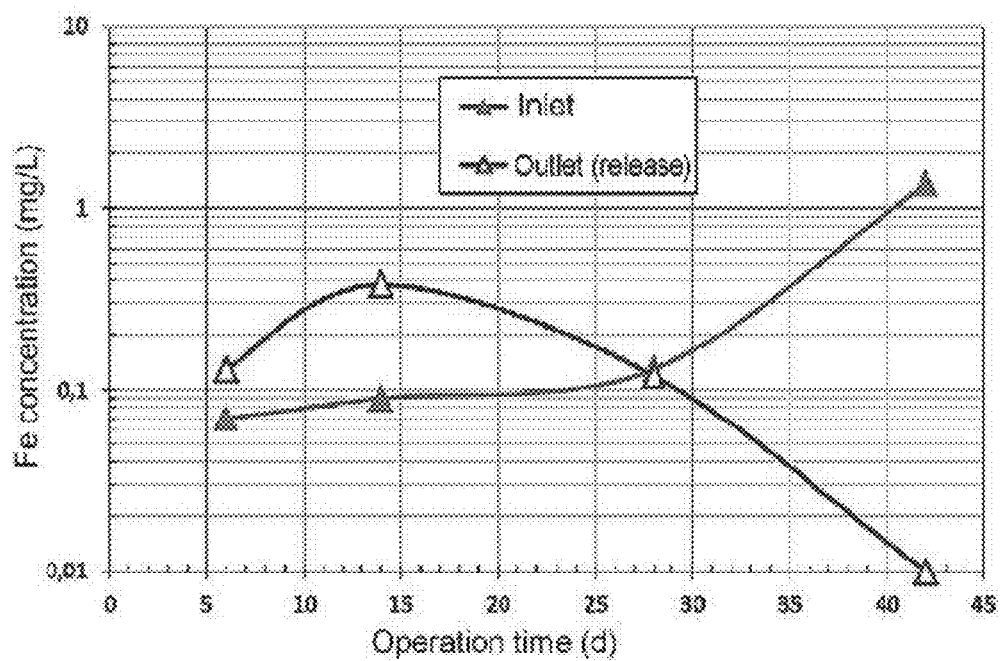

FIG. 4 presents a graph showing the influence of the impregnation time and the concentration of iron chloride for the prediction of phosphorus removal by activated wood chips;

FIG. 5 is a graph showing the phosphorus assessment for eight biofiltration columns monitored over a period of 66 days;

FIG. 6 is a graph showing changes in the concentration of phosphorus at the inlet and outlet of the biofilter over a period of 178 days;

FIG. 7 is a graph showing the impact of the wood chips activation on the average concentrations of ammoniacal nitrogen at the inlet and outlet of the biofilter;

FIG. 8 is a graph showing the amount of phosphorus supported per gram of activated wood chips based on various types of water used;

FIG. 9 is a graph showing the results of a test to check the influence of pH on phosphorus capture capabilities by the activated wood chips;

FIG. 10 is a graph showing the results of a test to check the influence of temperature on phosphorus capture capabilities by the activated wood chips;

FIG. 11 is a graph showing the results of a test to check the influence of the granulometry of the activated wood on its phosphorus sorption capacity;

FIG. 12 is a graph showing the results of a test conducted in order to determine the kinetics of phosphorus capture by the activated wood;

FIG. 13 is a graph showing the concentration of a tracer (KCl) as a function of time measured at a biofilter outlet, obtained during a test to determine hydraulic retention time;

FIG. 14 is a graph showing the phosphorus concentrations at inlet and outlet of trickling and immersed columns over a period of 141 days;

FIG. 15 is a graph showing the concentration of dissolved iron at the inlet and outlet of trickling and immersed columns;

FIG. 16 is a graph showing granulometry profile of different byproducts of activated wood;

FIG. 17 is a graph showing the phosphorus concentration at the inlet and outlet of the immersed columns using different activated wood byproducts over an 80 day monitoring;

FIG. 18 is a graph showing the performance of phosphorus removal of different activated wood byproducts over an 80 day period;

FIGS. 19 and 20 are graphs showing the results of pH monitoring and of the concentration of iron at the inlet and outlet of immersed columns, respectively;

FIG. 21 is a graph showing the concentration of ammoniacal nitrogen at the inlet and outlet of the column containing activated grindings;

FIG. 22 schematically shows a system capable of being used for the production of activated wood;

FIG. 23 schematically shows an embodiment of the system where the phosphorus passive capture immersed filter is positioned downstream of an organic bed trickling biofilter;

FIG. 24 schematically illustrates another embodiment of the system where the activated wood packing of the immersed filter is followed by an additional packing capable to capture the released iron and suspended particles (TSS);

FIG. 25 shows the assembly diagram of the different phosphorus removal columns;

FIG. 26 shows a simplified diagram of column C1;

FIG. 27 shows the reduction of phosphorus for column C1;

FIG. 28 shows the evolution of iron released from column C1;

FIG. 29 shows the change in pH for column C1;

FIG. 30 shows the reduction of phosphorus for column C2;

FIG. 31 shows the evolution of iron released from column C2;

FIG. 32 shows the change in pH for column C2;

FIG. 33 shows a simplified diagram of the set-up of the trickling column (C3);

FIG. 34 shows the reduction of phosphorus for column C3;

FIG. 35 shows the evolution of iron released from column C3;

FIG. 36 shows the change in pH for column C3;

FIG. 37 shows a schematic diagram of column C4;

FIG. 38 shows the reduction of phosphorus for column C4;

FIG. 39 shows the evolution of iron released from column C4;

FIG. 40 shows the tracking of nitrites/nitrates for column C4;

FIG. 41 shows the change in pH for column C4;

FIG. 42 shows an example of an assembly diagram of an aerated column (C5 or C6);

FIG. 43 shows the reduction of phosphorus in column C5;

FIG. 44 shows the reduction of phosphorus in column C6;

FIG. 45 shows the evolution of iron released from column C5;

FIG. 46 shows the evolution of iron released from column C6

Figure 47:
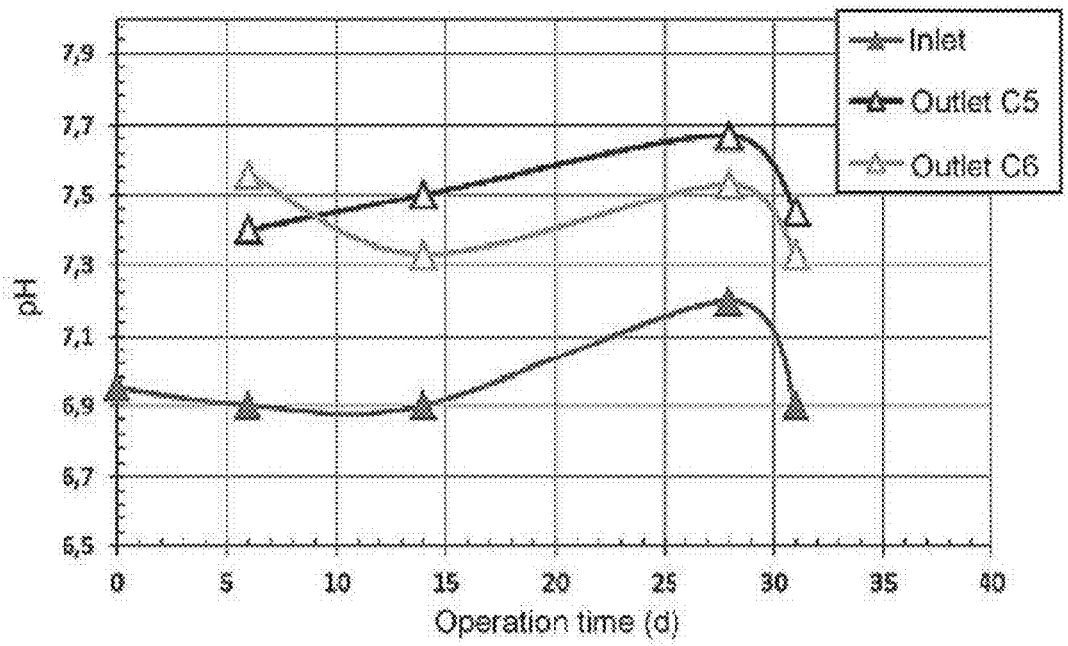
Figure 48:
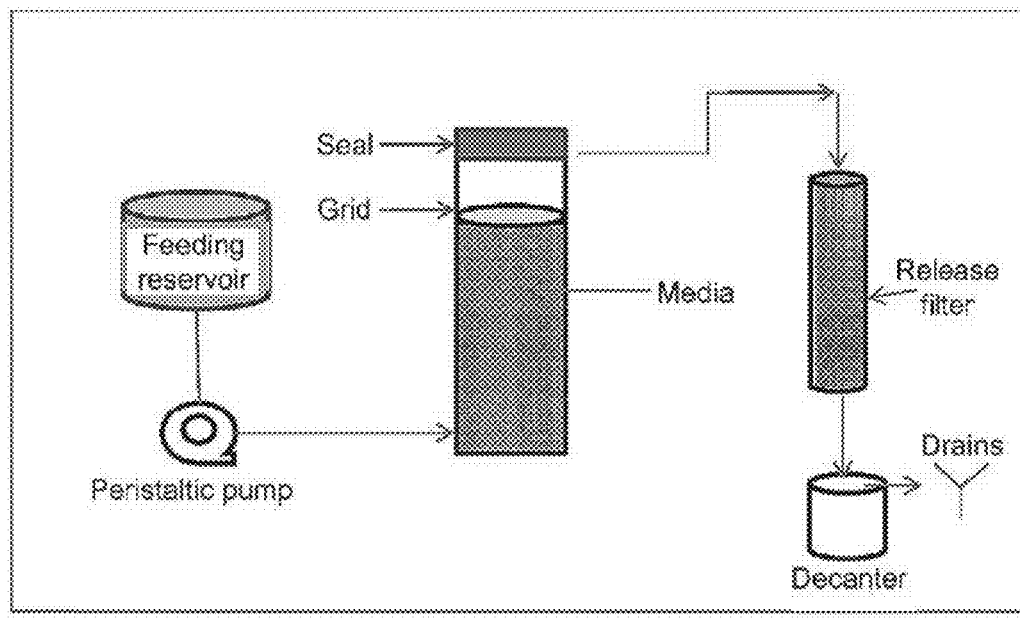
Figure 49:
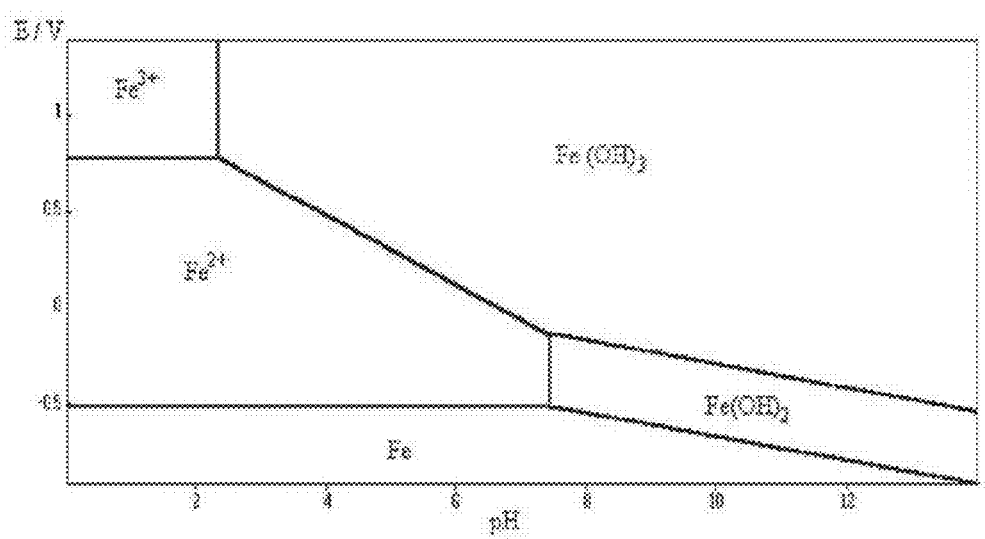
Figure 50:
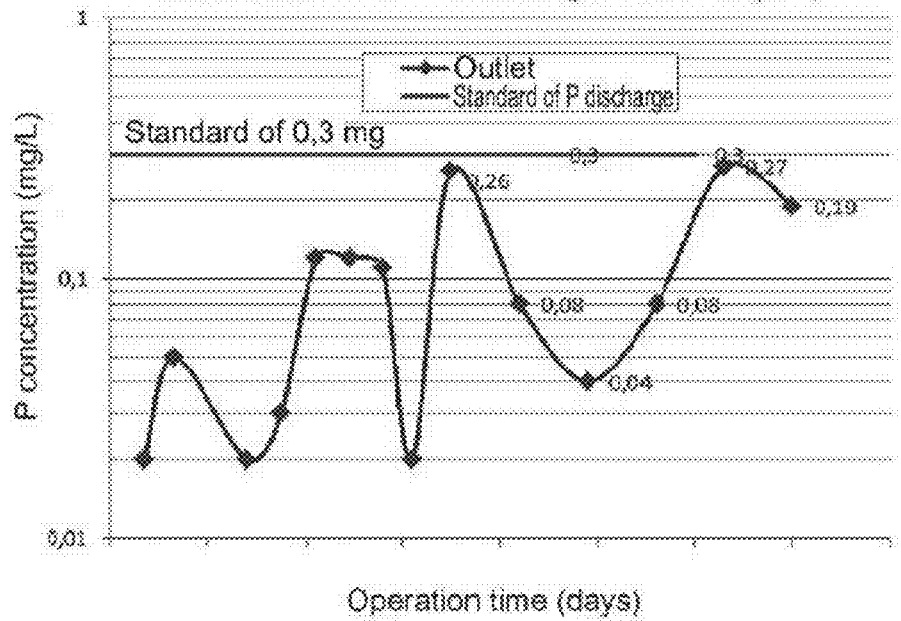
Figure 51:
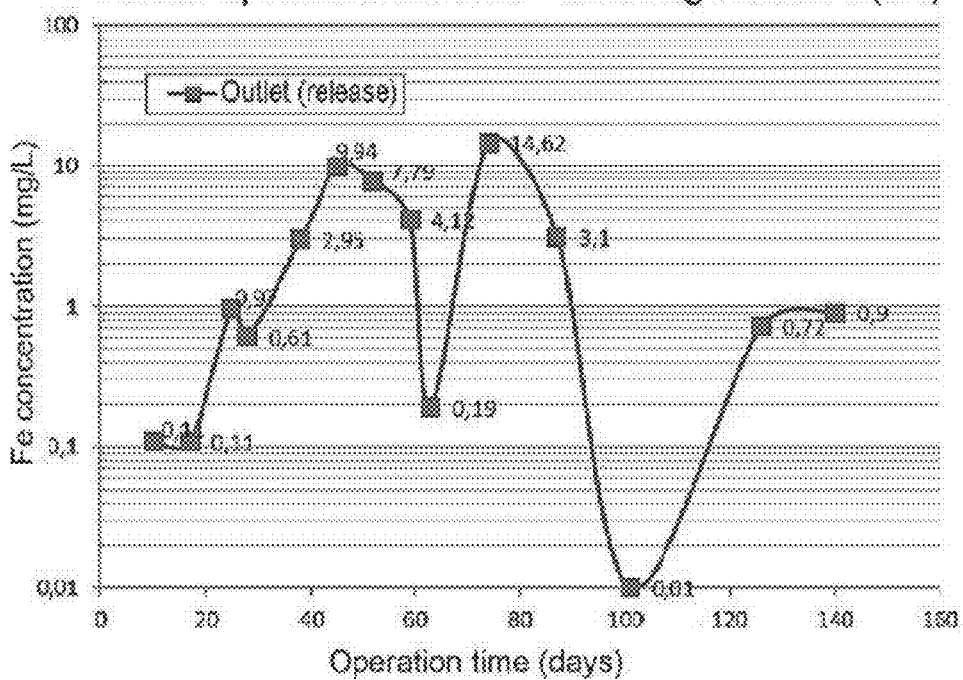
Figure 52:
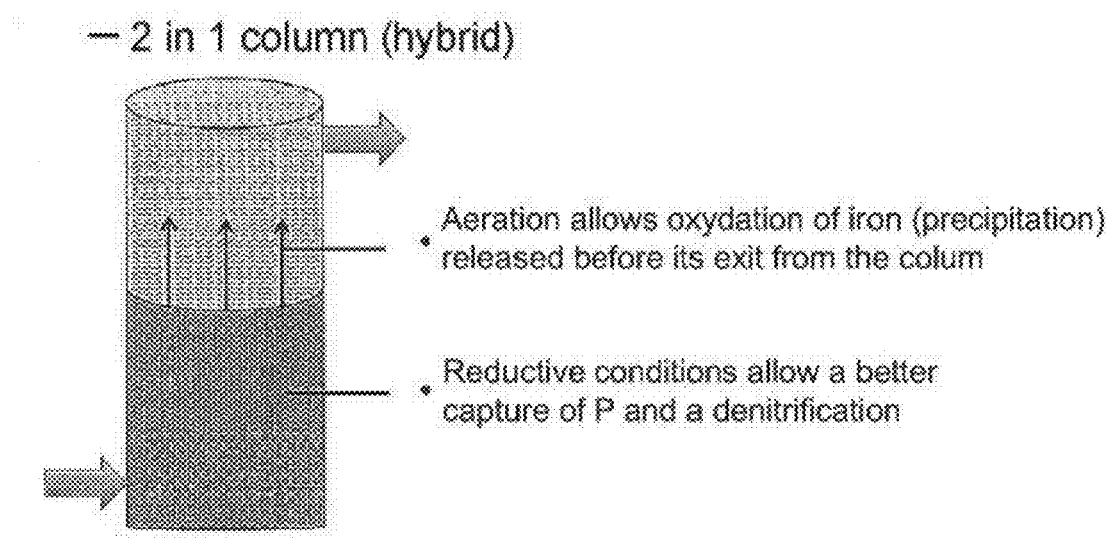

FIG. 47 shows the change in pH for columns C5 and C6;

FIG. 48 illustrates the assembly of a release-control system;

FIG. 49 shows the equilibrium diagram of iron according to Sarrazin (1991);

FIG. 50 shows phosphorus removal for grindings column (C1*);

FIG. 51 shows the monitoring of iron at the outlet of grindings column (C1*); and FIG. 52 illustrates an alternative assembly (hybrid) of the iron release control system.

DESCRIPTION OF PARTICULAR EMBODIMENTS OF THE INVENTION

System

According to a particular embodiment of the system of the invention, the filter is an immersed filter.

According to a particular embodiment of the system of the invention, the metal may be iron or aluminum, more particularly iron.

According to another embodiment, the activated-wood packing can be followed by further packing able to capture suspended particles and/or complexes containing dissolved iron, said further packing containing an alkaline agent to promote precipitation, in hydroxide form, of at least a portion of released metal, this precipitated metal-hydroxide being available for phosphorus capture.

According to a particular embodiment, the wastewater treatment system can include a device to allow alternating between reducing conditions and oxidizing conditions to maximize the use of the metal-hydroxide, more particularly so as to control the release of metal and/or phosphorus, said device producing a cycle comprising one or more steps with aeration and one or more steps without aeration. Thus, a momentary cessation of aeration would promote reduction of at least a portion of the precipitated ferric iron ($Fe^{3+}$) to ferrous iron ($Fe^{2+}$) causing its dissolution, said $Fe^{2+}$ being again available for the capture of phosphorus.

More particularly, the wastewater processing system according to the invention may thus include a device allowing for oxidizing conditions such as one or more means of aeration, particularly with a flow control.

Alternatively, the system may include the activated-wood packing followed by an additional packing fed by a device allowing for oxidizing conditions to promote precipitation of at least a portion of the released metal in hydroxide form, said precipitated metal-hydroxide being available for phosphorus capture, where particularly the device is an aeration means.

According to another aspect, the system of the invention comprises an immersed filter followed by a trickling filter to promote the precipitation as hydroxide, of at least a portion of the released metal, said precipitated metal-hydroxide being available for phosphorus capture. Particularly, the trickling filter can be fed by an aeration device.

Alternatively, the invention relates to a wastewater treatment system, including a) a unit for nitrification of said wastewater; and b) followed by an immersed filter, as defined, supporting a denitrifying biomass to simultaneously perform denitrification for processing wastewater. Particularly, the nitrification unit includes a trickling biofilter on organic bed supporting a nitrifying biomass to carry out nitrification. More particularly, according to this aspect, the unit a) and the filter b) may be integrated, for example, in a single column, or separated in distinct columns.

Method

According to a particular embodiment of the method of the invention, the filter is an immersed filter.

According to a particular embodiment of the method of the invention, the metal may be iron or aluminum, more particularly iron.

According to another embodiment, the activated-wood packing step can be followed by further packing step able to capture suspended particles and including an alkaline agent to promote precipitation of at least a portion of released metal in hydroxide form, this precipitated metal-hydroxide being available for phosphorus capture. As per another embodiment, the system using an immersed filter includes an aeration device of which the flow is controlled so as to limit the release of metal and/or phosphorus.

According to a particular embodiment, the method for wastewater treatment may comprise alternating steps between reducing and oxidizing conditions to maximize the use of the metal-hydroxide, more particularly such as to control the release of metal and/or phosphorus, said alternating steps producing a cycle of aeration and non-aeration. Thus, a momentary cessation of aeration would promote reduction of at least a portion of the precipitated ferric iron ($Fe^{3+}$) to ferrous iron ($Fe^{2+}$) causing its dissolution, said $Fe^{2+}$ being again available for the capture of phosphorus.

More particularly, the method of wastewater treatment according to the invention may thus include oxidizing conditions such as control of aeration, particularly with the help of a flow control.

Alternatively, the method may comprise the addition of oxidizing conditions to promote precipitation of at least a portion of the released metal in the form of hydroxide, wherein said metal-hydroxide precipitate is available for phosphorus capture, particularly wherein the device is an aeration means.

According to another aspect, the method may comprise a filtration under immersion followed by trickling filtration to promote precipitation of at least a portion of said released metal in hydroxide form, said precipitated metal-hydroxide being available for phosphorus capture. Particularly, the trickling filtration may be carried out with air intake.

Alternatively, the invention concerns a wastewater treatment method, including a) a wastewater nitrification step; and b) followed by a filtration step under immersion, as defined herein, supporting a denitrifying biomass to simultaneously perform denitrification for wastewater treatment. Particularly, the nitrification step is carried out on an organic bed trickling biofilter supporting a nitrifying biomass. More particularly, according to this aspect, the step a) and the step b) may be carried out in an integrated manner, for example, in a single column, or separated in distinct columns.

The following examples are solely for illustrative purposes, rather than to limit the invention to these specific embodiments.

EXAMPLES

Example 1

It is suggested to activate the surface of wood byproducts such as chips, sawdust, shavings, grindings and wood residues obtained from a transformation of ligneous matter, to improve their capacity to retain phosphorus for the purpose of incorporation in a filter designed for wastewater treatment. These byproducts are generally abundantly available and their activation for phosphorus capture is a good way to add-value to them. Table 1 presents the general characteristics of <<Paper Quality>> classified wood chips that can be used.

TABLE 1

| Granulometry | |
|---|---|
| Sieve (passing) | 30 mm |
| Sieve (retained) | 8 mm |
| Fine Particles(<5 mm) | Less than 1% |
| Species | |
| Fir | <25% |
| Spruce or jack pine | >75% |
| Density | About 400 kg/m3 |

An efficient process to achieve such activation includes three steps, namely a pretreatment, an iron impregnation and transformation to of iron. It should be noted that a similar process involving impregnation with aluminum and the transformation to aluminum hydroxide may be carried out for the purpose of activating the deemed wood byproducts.

For pretreatment purposes, the chips were first sieved in order to eliminate chips larger than 25.4 mm. This was to limit the size effect on phosphorus removal capacities. A parameter tested in preliminary trials consisted of impregnating the chips with carboxymethyl-cellulose (CMC), a non-toxic polymer used as a thickener in agri-food business. The purpose of this addition is to increase potential sites for iron capture by a mechanism of chelation. A 4% (weight) concentrated solution was prepared from 98% pure CMC (Hercules brand) and drinking water. During the preliminary trials, this addition seemed to generate a slight increase in the efficiency of iron capture.

To impregnate iron on the surface of the pretreated chips, a concentrated solution of 1 mole/L iron chloride ($FeCl_3$) was first used. This product was chosen since it is relatively inexpensive and abundantly available on the market. The solution was produced from 98% pure solid iron chloride, from Acros Organics-Fisher Scientific (Pittsburgh, Pa.), and drinking water. While it is possible to immerse the chips in a solution of $FeCl_3$ during a period varying from five (5) to twelve (12) hours, complete immersion of the chips requires a large quantity of $FeCl_3$, typically five times more $FeCl_3$ than chips (on mass basis). To use less $FeCl_3$, a vertical rotary platform, at the periphery of which are fixed 4 liter containers, was used to evenly impregnate the $FeCl_3$ on the chips. A ratio $FeCl_3$:chip of 1:1 (mass) was used for the preliminary trials. Iron chloride is a chemical product generally used for wastewater treatment or for production of drinking water. When this solid is dissolved in water, it forms a moderately acidic solution. Once it is hydrolysed, the iron will take different forms according to the pH and the redox potential. The redox potential helps qualify an aqueous solution and classify it as more of an oxidizing solution (presence of oxygen) or rather reductive solution (lack of oxygen). An environment that is acidic and weakly reductive will facilitate the dissolution of iron, whereas an environment that is alkaline and strongly oxidizing will promote its precipitation. Once on the chips, the iron is in an ionic hydrated form $[Fe(H_2O)_x]^{3+}$. The most efficient form for phosphorus adsorption is iron hydroxide ($Fe(OH)_3$). Three trials were conducted to obtain an efficient post-treatment. Firstly, it was tried to simply air-dry the $FeCl_3$-soaked chips. Secondly, it was tried to immerse the half-dried $FeCl_3$-soaked chips in water for 24 hours to neutralize them, then air-dry. Finally, it was tried to put the freshly-soaked chips in contact with gaseous ammonia to neutralize them, considering that ammonia is a highly alkaline gas. Table 2 presents the chips' phosphorus capture capacity according to each post-treatment.

TABLE 2

| Post-treatment | Air-dried | Neutralized with water | Neutralized with $NH_3$ |
|---|---|---|---|
| phosphorus capture capacity (mg P/g chip) | 0.40 | 0.20 | 3.5 |

Preliminary trials showed that the use of ammonia ($NH_3$) is very efficient in making the iron effective for phosphorus capture. The chemical reaction involved between the iron and the ammonia is presumed to be as follows:

$$FeCl_3 \xrightarrow{Hydration} Fe^{3+} + 3Cl^- \quad (1)$$

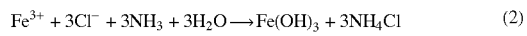

$$Fe^{3+} + 3Cl^- + 3NH_3 + 3H_2O \longrightarrow Fe(OH)_3 + 3NH_4Cl \quad (2)$$

Figure 1:
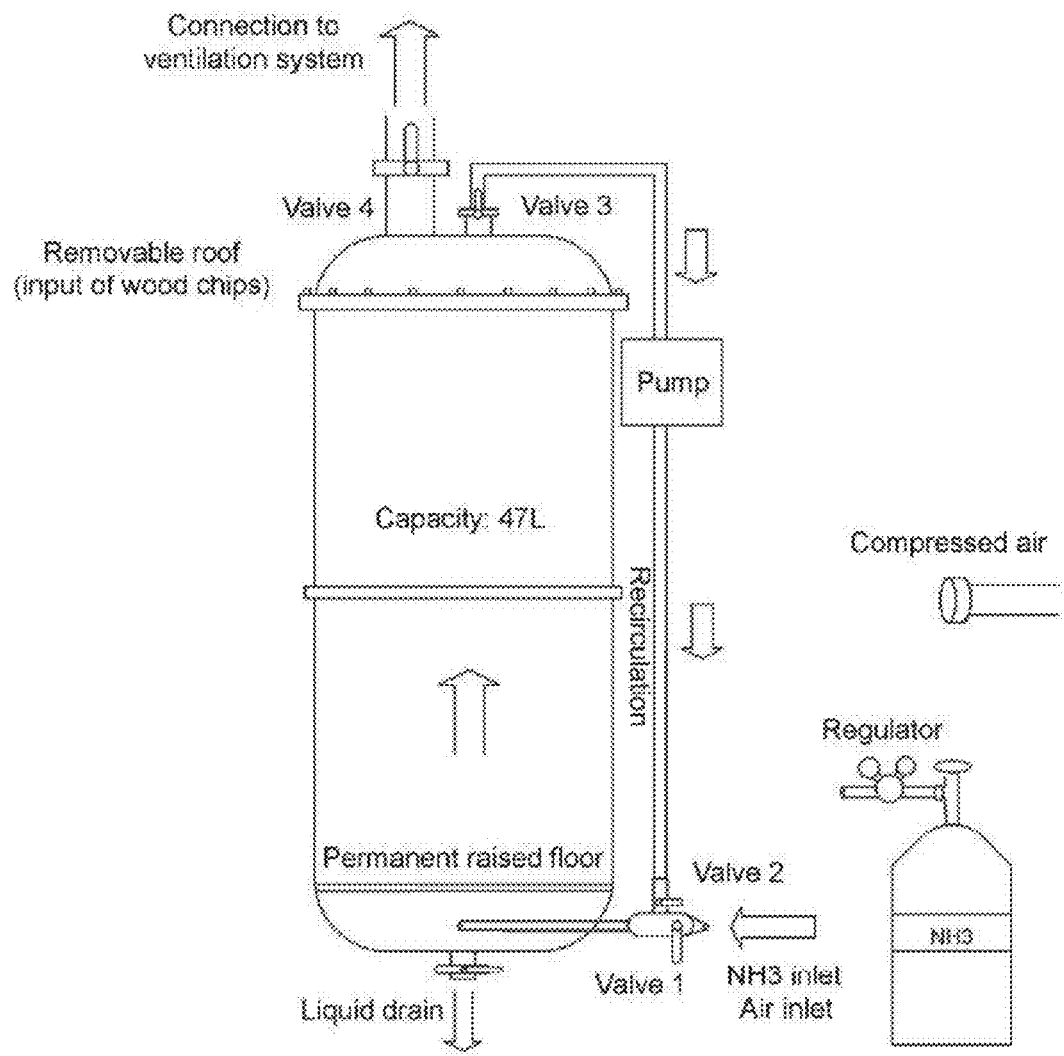
FIG. 1 is a diagram showing a device for neutralizing wood chips that have been pretreated with iron chloride.

This reaction results in $NH_4Cl$ as a byproduct, which forms a whitish dust deposit. In order for this operation to be successful, a sufficient quantity of ammonia and good gas diffusion within the matrix of $FeCl_3$-soaked chips must be ensured. During the preliminary trials, the soaked chips were put into contact with the ammonia in a 2 liter desiccator in which was placed a recipient of ammonium hydroxide ($NH_4OH$) (that is water-saturated ammonia which is highly volatile). Since the volumetric capacity of such a configuration was limited, a neutralization device was created in order to have a larger volumetric capacity as well as optimal use of the ammonia, said device is schematically presented in FIG. 1. The device includes a reactor, of a capacity of 47 L in this particular example, in which the gaseous ammonia circulates in a closed circuit, which allows it to be used at its full potential and avoids its waste while being safe. The gaseous ammonia used during the trials was anhydrous ammonia provided by Air Liquide Canada (Montreal, Canada). Once the cycle is completed, the device is connected to a compressed air supply allowing the reactor to be ventilated and the ammonia to escape from an appropriate ventilation system. The chips, dried during the ventilation, are ready for use at the end of the cycle. Since the use of $NH_3$ represents a potential risk for human health, close attention must be given to the safety of the device, and different leak tests were conducted for this purpose with a portable ammonia detector. The neutralization process was carried out as follows:

1. $FeCl_3$-soaked chips were put in cheesecloth to form a bundle;
2. The bundle was disposed flat on the surface of the raised floor of the device, trying to cover it as much as possible in order to avoid the gas to take any preferential path;
3. Hermetically close the removable ceiling of the device;
4. Connect the inlet duct of ammonia to the device;
5. Make sure that valves 1 and 4 are open and that valves 2 and 3 are closed;
6. Open the regulator of the gaseous ammonia tank in order to insert it into the reactor;
7. Wait to detect a change in color of the bundle; the color should go from yellow to reddish-brown, the reaction occurring generally in a few seconds (10-30 seconds), with a release of heat (exothermic reaction) and potentially of smoke;
8. Once the reaction is detected, close valve 4 to imprison the gaseous ammonia;
9. Close the regulator of the tank and seal the inlet duct of ammonia with the help of a Mohr pinchcock;
10. Close valve 1, open valves 2 and 3;
11. Start the pump to activate the recirculation system;
12. After about fifteen minutes, close the pump as well as valves 2 and 3;
13. Connect the compressed air duct to the device;
14. Open valves 1 and 4 and open the compressed air in order to evacuate the ammonia;
15. After fifteen minutes, check if there is still ammonia left in the reactor by using the portable detector. If the outlet concentration is safe, cut the compressed air supply, and for a better drying process, supply in air for about one to two hours according to the quantity of chips;
16. Retrieve the bundle holding the activated chips.

The preliminary trials described above have established an efficient activation process of the wood chips for phosphorus capture. Nevertheless, many parameters of the process were arbitrarily chosen, such as the concentration and the amount of iron chloride to use or the period of contact required for optimal impregnation. Before using the activated chips in the columns, the optimisation of the activation process is necessary in order to test the filter media at its full potential. The objective of the trials (described as follows) consists in determining the optimal combination of parameters for the activation process.

An experimental plan was elaborated to gain better knowledge of the parameters of the activation process that have an influence on the phosphorus capture of the activated chips. The effect of different parameters of the activation process was determined based on the quantity of phosphorus captured by activated chips (mg P/g chips). The four parameters to test were the addition or not of CMC, the concentration of $FeCl_3$, the soaking time and the quantity of $FeCl_3$ solution. The experimental plan for the optimisation of the activation parameters as elaborated, in a $2^3$ factorial design with central points, is presented in Table 3 showing the range of parameters that were tested.

TABLE 3

| # Trial | 1: Concentration FeCl | | 2: Soaking time | | 3: Ratio FeCl:chips | |
|---|---|---|---|---|---|---|
| | 1 mol/l (−) | 1.5 mol/l (+) | 30 min (−) | 60 min (+) | 0.6:1 (−) | 1:1 (+) |
| 1 | X | | X | | X | |
| 2 | X | | X | | | X |
| 3 | X | | | X | X | |
| 4 | X | | | X | | X |
| 5 | | X | X | | X | |
| 6 | | X | X | | | X |
| 7 | | X | | X | X | |
| 8 | | X | | X | | X |
| 9 | 1.25 mol/l | | 45 min | | 0.8:1 | |
| 10 | 1.25 mol/l | | 45 min | | 0.8:1 | |

Wood chips (of paper quality) were activated according to the different parameters of the activation process presented in Table 3. The activation process that was used is described later in detail. In order to ensure that the residual humidity wouldn't skew the results, the chips were dried in the oven at 105° C. for 12 hours before being weighed and treated. Furthermore, in order to reduce the impact of the variation of the chips' grain size, the chips were sieved to remove the particles bigger than 25.4 mm (1 inch) in diameter and those smaller than 6.3 mm (¼ inch). Once they were treated, the activated chips were dried at 105° C. for 12 hours before they were tested.

The effect of the parameters of the activation process was determined by the amount of phosphorus that the activated chips had captured in a trial batch. About five (5) grams of activated chips was shaken for 48 hours in an agitation chamber in 100 ml of $H_3PO_4$ solution [phosphorus]=200 mg/L. The amount of phosphorus that the chips had captured corresponds to the initial quantity of phosphorus in the solution minus the quantity of residual phosphorus in the solution at the end of the test. Every trial was duplicated in order to reduce the extent of errors. The concentration in total residual phosphorus of the solutions was determined by method MA-4054, which is accepted by the Quebec ministry of environment.

From the results obtained in the suggested experiment, the MATLAB™ software was used first and foremost to create an empirical model, then to determine its validity. Here are the steps that were conducted for the purpose of analyzing the results:

1. The parameters of a linear model were calculated using the least squares method. This model links the amount of captured phosphorus in each gram of chips (Y) to the treatment that was brought to them (X). This model has the following initial form:

$$Y=\beta_0+\beta_1 X_1+\beta_2 X_2+\beta_3 X_3+\beta_4 X_4+\beta_{12} X_{12}+\beta_{13} X_{13}+\beta_{23} X_{23}+\epsilon \quad (3)$$

This model takes into account the effect of the four parameters as well as the interaction between parameters 12, 13 and 23;

2. The individual confidence interval of each parameter was determined by a <<STEP-WISE>> regression. On this basis, it was possible to confirm which parameters were substantial. The insignificant parameters were withdrawn from the model. The level of confidence use is the same as for the analysis of variance;

3. The model with the retained parameters was submitted to an analysis of variance (ANOVA) with repeated experiment in order to determine whether it was substantial and adequate. In order to ensure as much freedom as possible, central point trials were used;

4. The central point trials were then used to validate the model. Furthermore, it was possible to verify the presence of quadratic trends in the parameters, in order to adjust the model accordingly;

5. Finally, a modeling of a response surface was conducted to better verify the effect of the various parameters.

Example 2

Once the optimal activation process was determined, a series of trials was conducted to verify whether the activated chips used in the context of biofiltration were able to reduce the concentration in phosphorus found in a wastewater of municipal origin in compliance with applicable standards. More precisely, a primary objective of these trials was to verify the abilities of a biofilter consisting of activated chips for phosphorus capture and comparing them with a conventional biofilter media. A second objective was to compare the performance of a biofilter with activated chips and that of standard chips according to the removal of COD, ammoniacal nitrogen and the concentration of iron at outlet. Finally, a third objective consisted in verifying the effect of the concentration in phosphorus of the feed water and of the hydraulic load on the abilities to capture phosphorus. To meet the aforementioned objectives, an experimental plan for the column trials of the activated chips in the context of biofiltration, in a 23 factorial design to evaluate the effect of three parameters and as presented in table 4, was conducted.

TABLE 4

| Columns | 1: Type of chips | | 2: Concentration P | | 3: Hydraulic load | |
|---|---|---|---|---|---|---|
| | crude (−) | activated (+) | 5 mg/l (−) | 15 mg/l (+) | 350 l/m²*j (−) | 500 l/m²*j (+) |
| T1 | X | | X | | X | |
| T2 | | X | X | | X | |
| T3 | X | | | X | X | |
| T4 | | X | | X | X | |
| T5 | X | | X | | | X |
| T6 | | X | X | | | X |
| T7 | X | | | X | | X |
| T8 | | X | | X | | X |

Figure 2:
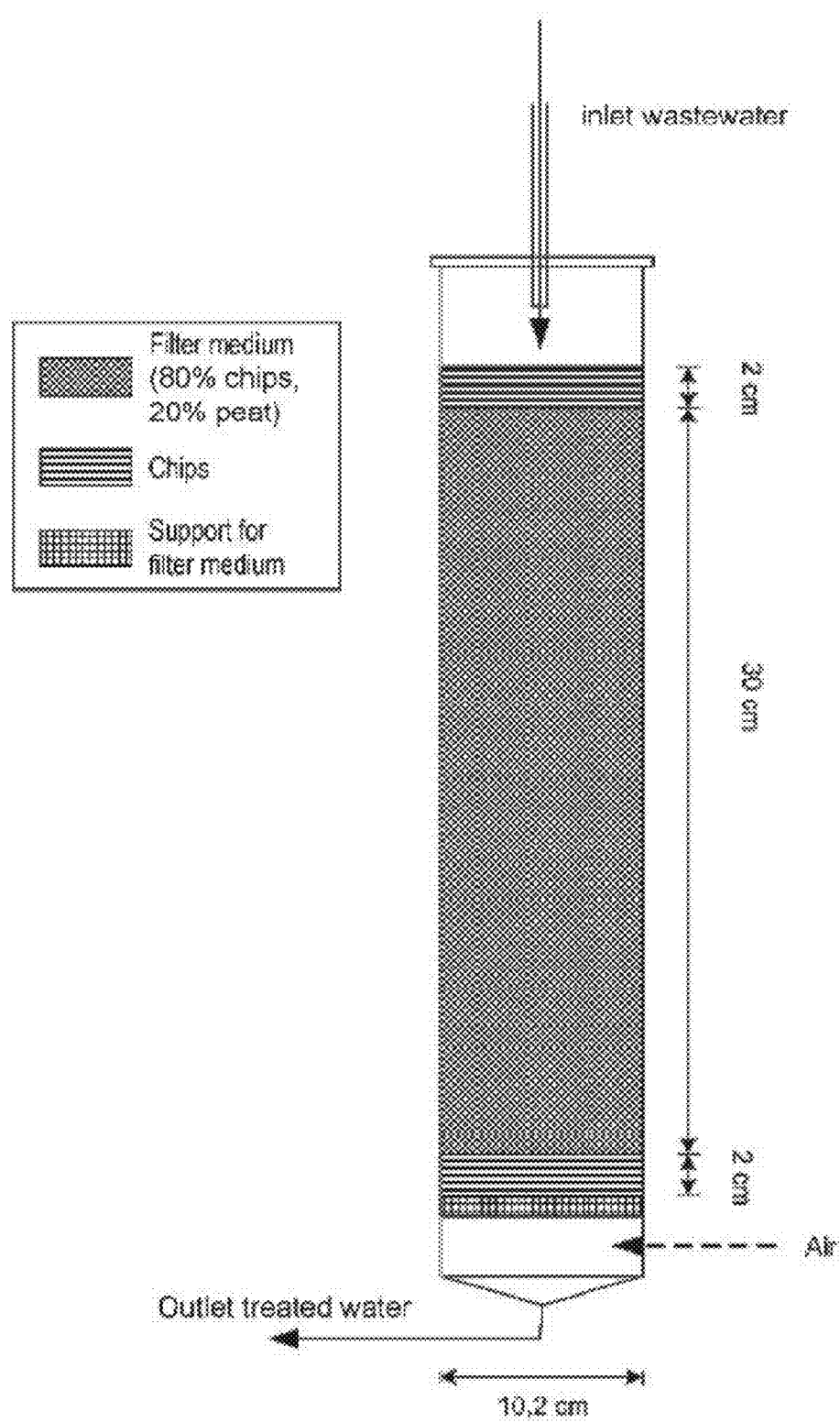
FIG. 2 is a diagram showing a design for an activated chip column in the context of biofiltration.

Eight (8) activated-chips columns for biofiltration were monitored, the design of which are illustrated in FIG. 2 and whose dimensions and properties are presented in table 5:

TABLE 5

| Column dimension and properties | |
| --- | --- |
| Nominal diameter | 0.102 m |
| Nominal surface | 0.008 m$^2$ |
| Height | 0.300 m |
| Volume | 0.002 m$^3$ |
| | 2.43 l |
| Chip fraction | 0.800 vol/vol$_{tot}$ |
| Peat fraction | 0.200 vol/vol$_{tot}$ |
| Chip size | 6.3 < diameter <25.5 mm |
| Air supply | 5.0 m$^3$/m$^2$*h |

In the example shown in FIG. 2, each biofiltration column's frame consists of translucent PVC and supports a lid that is perforated in its center allowing the inlet of the biofilter's supply line. The packing (filtering medium) is retained on a frame placed at the base of the column and under which an air space is provided, called plenum, allowing injection of air. An air supply is provided to the base of each column, and is adjusted with the help of a ball-rotameter equipped with a valve, to a flow rate of about 5 m$^3$/m$^2$*h in the conducted trials.

Columns 2, 4, 6 and 8 consisted of activated chips whereas columns 1, 3, 5 and 7 consisted of crude chips (i.e. non-activated). Peat moss (Saguenay, Canada) was sieved to 6.3 mm in order to remove coarse particles. A layer of about two cm of chips was placed at the top of the packing to better distribute the wastewater upon inlet. Another layer of about two cm was placed directly on the packing support to ensure homogeneous distribution of the upward air stream and to reduce the risk of clogging due to the descending migration of the peat. The biofilters were fed by settled municipal wastewater supplied by the purification plant in Beauport (Quebec, Canada), collected into two barrels of 200 liters every two weeks. The concentration of phosphorus in the water was adjusted with phosphoric acid (H$_3$PO$_4$). The concentration of phosphorus in this water was measured in duplicates upon receipt, the water of the first barrel being adjusted to 5 mg/l and the other to 15 mg/l. Columns 1, 2, 5 and 6 were fed by a supply reservoir of water adjusted at 5 mg/l concentration of phosphorus whereas columns 3, 4, 7 and 8 were fed by a supply reservoir of water adjusted at 15 mg/l concentration of phosphorus. Polypropylene buckets of 120 liters were used as supply reservoirs, and were refrigerated in order to maintain the temperature of the wastewater between 4 and 10° C. Feeding of the columns was ensured by a series of four peristaltic double-headed pumps of the brand Masterflex, as provided by Cole-Parmer Canada Inc. (Montreal, Quebec), using clear PVC tubings and neoprene tubings at pump's head, with a diameter of 3.18 mm.

For the purposes of the trials, columns 1, 2, 3 and 4 were fed at a flow rate of about 350 l/m$^2$*d, whereas columns 5, 6, 7 and 8 were fed at a flow rate of about 500 l/m$^2$*d.

The analytical monitoring of the inlet and outlet water from the biofiltration columns was conducted according to the parameters specified in table 6.

TABLE 6

| Parameters analysed | Units | Monitoring frequency | Method |
| --- | --- | --- | --- |
| [P] inlet and outlet | mg/l | Every week | Hl 93706 (Hannah) |
| Supply flow rate | ml/min | | Graduated cylinder and stopwatch |

TABLE 6-continued

| Parameters analysed | Units | Monitoring frequency | Method |
| --- | --- | --- | --- |
| pH inlet and outlet | pH | | XL20 (Fisher Scientific) |
| [Fe] inlet and outlet | mg/l | Every two weeks | 8008 (Hach) |
| [DCO] inlet and outlet | mg/l | | 8000 (Hach) |
| [N—NH$_4$] inlet and outlet | mg/l | | 10031 (Hach) |

The sampling of the water at the biofilters' outlet was done in 500 ml bottles for a period of about an hour, and the analyses were generally conducted the same day as the sampling. Otherwise, the samples were placed in a refrigerator at 4° C. for subsequent analysis. Measuring of the flow rate was conducted after sampling, and adjusted when needed.

As part of the trials, the phosphorus assessments were determined with the help of the following equations:

$$P_{entry} = \Sigma_{i=1}^{n} C_{i,entry} * Q_i * (t_i - t_{i-1}) \quad (4)$$

$$P_{exit} = \Sigma_{i=1}^{n} C_{i,exit} * Q_i * (t_i - t_{i-1}) \quad (5)$$

$$P_{captured} = \Sigma_{i=1}^{n} (C_{i,entry} - C_{i,exit}) * Q_i * (t_i - t_{i-1}) \quad (6)$$

Where:
i=i$^e$ monitoring of the columns;
n=number of monitoring conducted;
C=phosphorus concentration (mg P/l);
Q=supply flow rate of the column (l/d); and
t=elapsed time since the start of the columns (d).

Example 3

A series of trials was conducted in order to have a better knowledge of the influence of various parameters on the efficiency of phosphorus removal from media, and to identify the factors that could lessen or promote the performance of the activated chips in the context of biofiltration. More specifically, the objectives of these trials consisted of:

1. Determining the influence of competitive ions, organic matter, pH and temperature on the phosphorus capture abilities of the activated wood;
2. Determining the influence of granulometry and the cutting types of activated wood on their phosphorus capture performance;
3. Determining the kinetics of phosphorus capture by activated wood and determining whether the hydraulic retention time of the biofiltration columns was sufficient; and
4. Determining the optimal method of operation for passive capture of phosphorus in columns.

In order to determine the impact of the quality of the water on the quantity of phosphorus that could be captured by the activated wood, batch trials were conducted to verify the influence of three parameters: competitive ions and organic matter; pH; and temperature.

In order to determine the impact of competitive ions and organic matter on phosphorus sorption capacity of the activated wood, a batch trial aimed to compare the phosphorus removal performances by activated wood in different solutions. These solutions were demineralized water, water collected at the outlet of a biofiltration column (column T1) and settled wastewater originating from the Beauport plant. The waters were first analysed to measure the initial concentration of phosphorus and were then adjusted to have a concentration of 200 mg/l with phosphoric acid (H$_3$PO$_4$). Since the ion most likely to affect the phosphorus capture is nitrate ($NO_3$), its initial concentration was analysed in all solutions. The COD (chemical oxygen demand) of the different solutions was measured in order to have an indication of the concentration of organic matter.

About 5 g of activated chips were put into contact with 100 ml of each of these solutions for 24 hours in an agitation chamber, set to 150 rpm and to room temperature. In order to limit the impact of the specific surface, the active chips were sieved to obtain an equivalent diameter between 12.5 and 19 mm. The pH of the solution was adjusted to 7 from a solution of NaOH concentrated at 0.5 mol/l. At the end of the contact period, the solution was filtered with filter paper for rapid filtration to retain the precipitated phosphorus. The concentration in phosphorus of the solution was measured before and after the contact to determine the amount of phosphorus captured by the media. Every trial was duplicated and the phosphorus analyses were conducted according to the MA-4054* method (*<<Standard Methods for the Examination of Water and Wastewater>> APHA—AWWA—WEF, $22^{nd}$ edition). The measure of COD concentration and nitrates concentration was conducted with the Hach colorimetric method.

In order to determine the impact that the pH has on the phosphorus sorption capacity of the activated wood, a batch trial aimed to compare the phosphorus removal performances by activated wood in different solutions. These solutions consisted of demineralized water adjusted with phosphoric acid ($H_3PO_4$) in order to have a phosphorus concentration of 200 mg/l. The stock solution was separated into six parts, and the pH of each of those parts was respectively adjusted to 4, 5, 6, 7, 8 and 9 from a solution of NaOH concentrated at 0.5 mol/l. It is important to note that the pH of wastewater is generally around 7. About 4 g of activated wood grindings were put into contact with 100 ml of each of those solutions for 24 hours in an agitation chamber, set to 150 rpm and to room temperature. The characteristics of the activated grindings that were used are presented later on in detail. The pH of each solution was adjusted from a solution of NaOH concentrated at 0.5 mol/l to reach the desired concentration. At the end of the contact period, the solution was filtered with filter paper for rapid filtration to retain the precipitated phosphorus. The concentration in phosphorus of the solution was measured before and after the contact to determine the amount of phosphorus capture by the media. Every trial was duplicated and the phosphorus analyses were conducted according to the MA-4054 method.

To determine the impact that the temperature has on the phosphorus sorption capacity of the activated wood, a batch trial aimed to compare the phosphorus removal performances by activated wood in the same solution for different temperatures. To do so, a first agitation chamber without a lid was placed in a cold room at 3° C., the temperature of a second chamber equipped with a thermostat was adjusted to 24° C. and a third chamber equipped with a thermostat was adjusted to 50° C. About 2 g of activated sawdust was put into contact with 100 ml of the solution for 24 hours in the agitation chambers set to 150 rpm and to room temperature. The characteristics of the activated sawdust that was used are presented later on in detail. The solution consisted of demineralized water adjusted with phosphoric acid ($H_3PO_4$) in order to have a phosphorus concentration of 200 mg/l. The solution's pH was adjusted to 7 from a solution of NaOH concentrated at 0.5 mol/l. At the end of the contact period, the solution was filtered with the help of filter paper for rapid filtration to retain the precipitated phosphorus. The concentration in phosphorus of the solution was measured before and after the contact to determine the amount of phosphorus captured by the media. Ever trial was duplicated and the phosphorus analyses were conducted according to the MA-4054 method.

Concerning the influence that granulometry of the wood had on phosphorus removal, specific surface is one of the most important parameters for phosphorus sorption capacity of a media. The larger this specific surface is, the larger its capacity will be. To determine the influence of this parameter on the phosphorus sorption capacity of the activated wood, activated wood chips of different sizes and cuts were compared by batch trials. To do so, paper quality chips were sieved and divided into five categories and activated according to the same recipe. The chips were also compared to shavings originating from the Litière Pouliot Inc. company (Charny, Quebec, Canada). Table 7 presents the grain size and the different dimensions of lots of wood chips and byproducts used. Other characteristics of shape and granulometry of these wood byproducts are presented later in detail.

TABLE 7

| Lot # | Minimal diameter (mm) | Maximal diameter (mm) |
| --- | --- | --- |
| 1 | « Litière Pouliot» Shavings | |
| 2 | « Litière Pouliot» Grindings | |
| 3 | 25.0 | . . . |
| 4 | 19.0 | 25.0 |
| 5 | 12.5 | 19.0 |
| 6 | 6.3 | 12.5 |
| 7 | 2.0 | 6.3 |

The different lots were all activated according to the same recipe, and certain empirical observations determined that the ratio of impregnation liquid:wood product ideal for smaller cuts was of 1.5 to 1. A predetermined mass of each category of grain size of activated wood was put into contact with 100 ml of a solution for 24 hours in an agitation chamber set to 150 rpm and to room temperature. The solution consisted of demineralized water adjusted with phosphoric acid ($H_3PO_4$) in order to have a phosphorus concentration of 200 mg/l. The solution's pH was adjusted to 7 from a solution of NaOH concentrated at 0.5 mol/l. At the end of the contact period, the solution was filtered with the help of filter paper for rapid filtration to retain the precipitated phosphorus. The concentration in phosphorus of the solution was measured before and after the contact to determine the amount of phosphorus captured by the media. Every trial was duplicated and the phosphorus analyses were conducted according to the MA-4054 method.

To validate whether the hydraulic retention time in the biofiltration columns could have affected the efficiency of phosphorus removal observed during the trials, first the necessary time for the optimal sorption of the activated wood was determined. To do so, a batch trial aimed to measure the amount of phosphorus captured by activated chips according to contact times varying from 0 and 48 hours. More precisely, eleven (11) times were tested: 0.25, 0.5, 1, 2, 3, 4, 5, 6, 12, 24, and 48 hours. About 5 g of activated chips were put into contact, according to the different contact times, with 100 ml of a solution in an agitation chamber set to 150 rpm and to room temperature. The solution consisted of demineralized water adjusted with phosphoric acid ($H_3PO_4$) in order to have a phosphorus concentration of 200 mg/l. The solution's pH was adjusted to 7 from a solution of NaOH concentrated at 0.5 mol/l. To limit the impact of the specific surface, the activated chips were sieved to obtain an equivalent diameter between 12.5 and 19 mm. At the end of the contact period, the solution was filtered with the help of filter paper for rapid filtration to retain the precipitated phosphorus. The concentration in phosphorus of the solution was measured before and after the contact to determine the amount of phosphorus captured by the media. Ever trial was duplicated and the phosphorus analyses were conducted according to the MA-4054 method.

To determine the hydraulic retention time in the biofiltration columns, trials with tracers were conducted on a biofiltration column consisting of activated chips to verify whether the hydraulic retention time could affect performances of efficient phosphorus capture. The T6 column, which was in operation for 15 weeks, was used for the trial with a flow rate of liquid supply adjusted to 350 L/m$^2$*d and a flow rate of air injection adjusted to 5.0 m$^3$/m$^2$*h. The tracing methodology used is similar to the one described by Garzón-Zúñiga et al. in <<Determination of the Hydraulic Residence Time in a Trickling Biofilter Filled with Organic Matter>> Environmental Technology, vol. 24, no. 5, p. 605-614. (2003), by using potassium chloride (KCl) as a tracer instead of ammonia ($NH_4^+$) as described by Garzón-Zúñiga et al. The tracing technique is based on the conductivity of the KCl solutions, and in order to conduct a continuous monitoring of the conductivity, a probe was placed in a graduated cylinder situated at the outlet of the biofiltration column. The column was first powered by a solution of demineralized water concentrated in KCl at 0.02 mol/l for 7 days until the conductivity measured at the inlet of the column was the same as the conductivity measured at the outlet. The purpose of this was to saturate the filter media with the tracer product. At the tracer trial in duplicate, 120 ml of a solution of demineralized water concentrated in KCl at 0.10 mol/l was injected over a period of 60 minutes. Once the tracer solution was injected, the column was powered again by the KCl solution concentrated at 0.02 mol/l. The probe was programmed to measure the conductivity at the exist of the column every 15 minutes for 72 hours, adjusting itself automatically according to the room temperature, using a Horiba brand data collection device, model D-54. To determine the concentration of KCl at the outlet of the column, a curb was calibrated from the conductivity of different concentrations. The equation of this curve allowed the conversion of the conductivity data into KCl concentration at a temperature of 26° C. A certain background noise was determined and subtracted from the data to isolate the effect of the tracer solution.

The hydraulic retention time, defined by the average time spent by the water in the column, was calculated according to a method suggested by Tchobanoglous et al.

Figure 3:
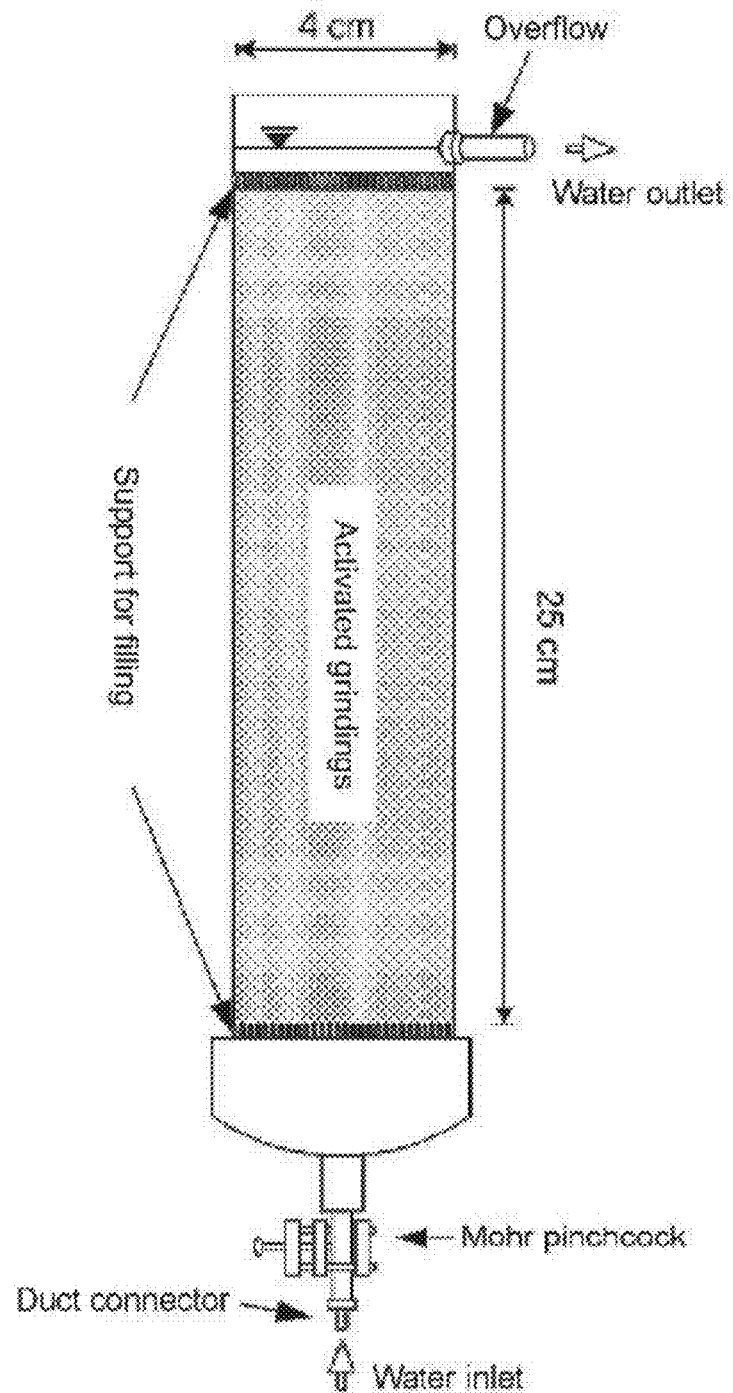
FIG. 3 is a diagram of a phosphorus capture filtration column operating in immersion.

Concerning the influence of the mode of operation of the columns, in order to get closer to the conditions of the batch trials, a passive capture column operated in immersion and fed from the bottom was conducted. The advantage of this configuration is that it allows the whole surface of the filtrating media to be in contact with the liquid and thus avoids dead spots. The objective of this trial was to determine whether it would be more advantageous to use a mode of operation by immersion rather than by trickling. FIG. 3 presents the illustration of an example of a column of filtration by phosphorus capture operated by immersion, fed from the bottom. Trials aiming to compare the performances of this column of filtration by immersion with those of a biofiltration trickling column, therefore fed from the top, were conducted. Apart from the feeding mode, the column operated by immersion was similar in all counts to the column operated by trickling. The columns, made up of clear PVC, had a nominal diameter of 4 cm, used a 25 cm thick packing which was maintained at the top and at the bottom by grid supports. The feeding of the columns was ensured by a series of peristaltic pumps by the brand Masterflex, provided by Cole-Parmer Canada Inc. (Montreal, Canada), using clear PVC conduits and neoprene conduits at the heads of the pumps, with a nominal diameter of 3.18 mm. A 26 liter bucket was used as a supply reservoir and was placed in a refrigerator to maintain the temperature of the solution between 4 and 10° C. The columns were packed with grindings that were activated beforehand according to the activation methodology described in example 1. A total mass of 67.5 g of packing was used for each column, which is equivalent to a volume of about 315 ml. The columns were fed by a drinking water solution with a pH neutralised by NaOH concentrated at 50%, and with a phosphorus concentration adjusted to 15 mg/l by phosphoric acid. This concentration, three times higher than that of a typical wastewater, aimed to determine the potential lifespan of the columns more quickly. The flow rate, initially adjusted to 720 ml/d was later slightly reduced to obtain a HRT of 12 hours, to 575 ml/d or 2 ml/5 min. A trial described later was conducted to adjust the flow rate to obtain the desired HRT for this type of column. To measure the flow rate, a Mohr pinchcock placed on a supple section of the conduits that linked the supply tube to the column was used to keep the liquid in the column. Table 8 presents the parameters of the analytical monitoring that was conducted on the columns for the purpose of comparing the methods of operation.

TABLE 8

| Analysed Parameters | Unit | Frequency of monitoring | Method |
|---|---|---|---|
| [P] inlet and outlet | mg/l | Every week | Hl 93706 (Hannah) |
| Flow rate | ml/min | week | Graduated cylinder and stopwatch |
| [Fe] inlet and outlet | mg/l | | 8008 (Hach) |

The quantity of phosphorus that was captured by the columns used in these trials was determined with the use of the same equations (4), (5) and (6) that were used to determine the quantity of phosphorus that was captured in the biofiltration columns in the aforementioned trials. Finally, the concentration in iron and phosphorus of the filter media was subjected to analysis. More precisely, samples of the packing of the column operated by immersion were taken from the bottom, the center and the top of the column at the end of the monitoring period. The center sample was taken from a portion of packing of about 15 cm in height and blended to ensure its homogeneity. These samples were compared to newly activated grindings. The measuring of the concentration of iron and of phosphorus on the filter media were conducted according to the MA-4054 method.

The results of the trials revealed that an immersed filtration column packed with activated wood byproducts had an excellent phosphorus capture potential. Furthermore, the trials aiming to determine the influence of the grain size of the wood on maximal phosphorus capture revealed that it would be more efficient to use a media finer than the paper quality chip. Trials with other activated wood byproducts were conducted, aiming to characterize and activate the different byproducts that were commercially available, to then determine and compare the maximal phosphorus sorption capacity of these activated wood byproducts with other filter media by modelling adsorption isotherms, to finally compare this phosphorus capture capacity with the results obtained in the column.

Example 4

Three types of wood byproducts were characterized and activated: sawdust grindings and shavings, of which samples, provided by Litière Pouliot Inc. are described in table 9.

TABLE 9

| Product | Sawdust | Grindings | Shavings |
|---------|---------|-----------|----------|
| Essence of the wood | Fir and spruce | unknown | Fir and spruce |
| Description | Little flakes and powder Produced with a saw Often named «sawdust» | Splints of ranging sizes Produced with a hammer mill Contaminated with melamine | Little and big flakes Produced with a disc mill Often named «shavings» |

Firstly, the wood byproducts were air dried for 48 hours. Then, in order to have a better specification of the samples, a characterization of the grain size was determined in duplicate. To do so, a predetermined mass of each wood byproduct was poured into a stack of sieves arranged on a vibrator, in the respective sizes: 0.40 mm; 1.18 mm; 2.00 mm; 4.75 mm; 6.3 mm; 12.5 mm; and 25 mm. After a period of about five minutes, the mass retained on the different sieves was weighed to establish the grain size profile of the samples. Next, about a liter of each product was activated, according to the procedure described later on in detail, using an appropriate quantity of the impregnation solution, considering that the quantity of ferric chloride deemed optimal for the activation of the chips turned out to be insufficient to activate the other wood byproducts. Empirical trials based on the colouring of the products during impregnation, brought to light that the ratio ferric chloride:wood products seemed ideal at 1:5.

Phosphorus sorption isotherms from different materials were modeled with the help of batch trials. The different products tested were grindings, sawdust, activated shavings, peat moss, crude sawdust and an activated alumina available on the market. The isotherms made it possible to have a precise enough idea of the phosphorus capture capacity of these products and to compare them. The maximal adsorption capacity of a media generally being expressed on a dry base, is it required to know its humidity level. To do so, we first have to weigh the mass of the aluminum container (or other recipient going into the oven) to which we add a known mass of the tested media. We then place the sample in a 105° C. oven for about eight hours. After that period, the water present in the sample has evaporated, and we simply weigh the sample in the container and calculate the difference with its initial mass to determine its percentage of humidity.

In order to prepare the phosphorus solutions for the batch trials, simply different dilutions from phosphoric acid and demineralized water must be conducted. The tested concentrations during these trials were 10, 25, 50, 100, 200, 300 and 400 mg P/l. To limit the number of manipulations, an efficient method is to take a certain quantity of the highest concentration (400 mg/l), the stock solution, and dilute it with demineralized water to create the other solutions using a millimeter pipette.

Since these solutions are strongly acidic, it was necessary to neutralize them with a NaOH solution concentrated at 0.5 mol/l. Once the phosphorus solutions were produced, exactly 100 ml of the different solutions were measured using a graduated cylinder and poured into well-identified Erlenmeyer flasks. Next, seven samples of the tested media were precisely weighed and each sample was put into an Erlenmeyer flask numbered for this purpose. Around 5 g of peat and of crude sawdust were used, and about 2 grams of activated wood and alumina were used. The containers were sealed with aluminum foil to avoid any evaporation and were then placed in the agitation chamber, adjusted between 100 and 150 rpm and to the desired temperature. For these trials, an agitation speed of 150 at a temperature of 22° C. was used, for a period of contact of 24 hours in order to be sure to use the full capacity of the adsorbent. Once the period of contact was over, the containers were taken out of the agitation chamber and the solutions were filtered with rapid filtration papers, to finally be analyzed according to the MA-4054 method to determine the total residual phosphorus concentration of the solutions.

From the results obtained in the batch trials, it was possible to model adsorption isotherms and thus determine the maximal phosphorus sorption capacity of the media. To compile the batch trial results, the mass of the media used was converted in dry mass using the determined humidity level. Then the concentration that was adsorbed by the filter media was calculated by subtracting the final concentration from the initial concentration and by dividing the dry mass of the substrate. It was possible to establish the different adsorption isotherm models by creating curves describing the variations of the quantity of capture phosphorus versus the residual concentration of phosphorus in the solution. These curves allowed the establishment of the necessary parameters to model the Freundlich and Langmuir isotherms. It was finally possible to identify the most appropriate model from the linear regression coefficients of the curves.

To obtain the parameters of Freundlich's isotherm, a curve of the quantity of phosphorus captured as a function of the residual concentration of phosphorus in the solution was created by computer with the help of the Microsoft EXCEL™ program. Next, a power trend curve was applied to the data, and its equation as well as its correlation coefficient ($R^2$) was generated, the equation of the trend curve being under the following form:

$$C_s = x/m = K_F C_e^{1/n} \qquad (7)$$

Where:
$C_s$: Concentration of the adsorbed contaminant (mg/g);
x: mass of the adsorbed contaminant (mg);
m: mass of the adsorbent (g);
$K_F$: Freundlich coefficient;
n: empiric coefficient; and
$C_e$: Concentration of the contaminant in a solution and in balance (mg/l).

To obtain the parameters of the Langmuir isotherm, a curve of the residual concentration of phosphorus divided by the quantity of captured phosphorus as a function of the residual phosphorus concentration in the solution (Ce/Cs as a function of Ce) was produced by computer with the help of the EXCEL™ program. Next, a linear trend curve was applied to the data, and its equation as well as its correlation coefficient ($R^2$) was generated, the equation of the trend curve being under the following form:

$$Cs = x/m = ab\ Ce/(1+b\ Ce)\ \text{or}\ Ce/Cs = 1/a\ Ce + 1/ab \qquad (8)$$

Where:
- $C_s$: Concentration of the adsorbed contaminant (mg/g);
- $C_e$: Concentration of the contaminant in a solution and in balance (mg/l);
  - a: Maximal adsorption capacity; et
  - b: Adsorption coefficient Example 5

In light of the interesting results obtained by the column operated by immersion, a new series of trials in immersed filtration columns packed with three types of active wood byproducts were conducted. More precisely, these trials aimed to:
1. Determine the required flow rate to obtain a hydraulic retention time of 12 hours in the columns;
2. Determine whether columns packed with activated wood byproducts are able to reduce the phosphorus concentration of typical wastewater to under 0.5 mg/l, and compare the wood byproducts' performances amongst each other;
3. Monitor the iron, the pH and the ammoniacal nitrogen;
4. Characterize the sludge found at the outlet of the column;
5. Analyse the composition of new and used packing.

Three filtration columns operated by immersion as mentioned earlier in FIG. 3 were packed with sawdust, grindings and activated shavings. For a packing volume of about 315 ml, the mass of the sawdust and grindings and shavings were respectively 75.2, 64.3 and 24.7 g.

Feeding of the columns was ensured by a double-headed peristaltic pump, using clear PVC conduits and Tygon™ conduits at the heads of the pumps, with a nominal diameter of 3.18 mm. A 26 liter bucket was used as a supply reservoir and was placed in a refrigerator to maintain the temperature of the solution between 4 and 10° C. The columns were powered by a drinking water solution with a pH neutralised by NaOH concentrated at 50%, and with a phosphorus concentration adjusted to 5 mg/l by phosphoric acid, which is equivalent to typical wastewater.

The results that were relative to the kinetics of the phosphorus capture by the activated wood allowed to determine that the capture was optimal at around 12 hours of contact time. To ensure that the phosphorus capture in columns was optimal, it was necessary to adjust their hydraulic retention time (HRT). The HRT is determined from the volume occupied by the water (V) and the flow rate (Q), as presented in the following equation:

$$HRT = V/Q \qquad (9)$$

The flow rate (Q) is a parameter that is easily controllable. However, the volume occupied by the water (V) is unknown and varies according to the packing of the column. Garzon et al. (2003) cited above suggests two useful methods to determine the hydraulic retention time in an organic biofilter. The first method consists in using a tracer, as presented above. A second simpler method consists in determining the volume of the water contained in a column's packing. Once this volume is known, the flow rate to apply to obtain the desired hydraulic retention time can be determined. To determine the volume occupied by the water in a column operated by immersion, the following methodology is suggested:
1. Feed the column from its base with a peristaltic pump until complete submersion of the packing. Slowly fill to avoid expansion or floating problems. To determine the amount of water injected into the column, put the pump's supply tube in a graduated cylinder filled with water. Ensure that the inlet conduct is full of water before starting to bring the water from the graduated cylinder not to skew the result;
2. Once it is filled, empty the column by its base and retain the liquid in a graduated cylinder. Let the water drain for about 24 hours;
3. At the end of the test, take three samples of the humid filter media: on top, in the middle and on the bottom of the column. Determine the percentage of humidity by drying at 105° C. for about eight hours. The overall percentage of humidity is the average of the three samples;
4. The total volume occupied by the water represents the total volume of water drained at the outlet of the column in 24 hours added to the water retained in the humid filter media determined at the third step.

Table 10 presents the analytical monitoring conducted on the immersion filtration columns packed with wood byproducts.

TABLE 10

| Analyzed parameters | Unit | Monitoring frequency | Method |
|---|---|---|---|
| [P] inlet | mg/l | Every week | Hl 93706 (Hannah) |
| [P] outlet | mg/l | | 8190 (Hach) |
| Supply flow rate | ml/min | | Graduated cylinder and stopwatch |
| [Fe] inlet and outlet | mg/l | | 8008 (Hach) |
| pH inlet and outlet | pH | | XL20 (Fisher Scientific) |
| [N—NH$_4$] inlet and outlet | mg/l | | 10031 (Hach) |

It is important to note that the methods of monitoring the phosphorus at the inlet and outlet of the columns were different, because Hach's 8190 method is more precise at low concentration (range: 0.06-3.5 mg P/l). The sampled water at the outlet of the columns was retrieved in 100 ml bottles over the course of four hours, and the analyses were generally conducted the same day as the sampling. Otherwise, the samples were placed in a 4° C. refrigerator for later analysis. Considering that the colorimeters used for the analysis of the phosphorus and iron are sensitive to suspended particles, the samples were not agitated before analysis. The sampling of the water at the inlet of the columns was conducted at the supply tube of the columns to keep track of the reactions that could happen in the conducts. The measure of the flow rate was conducted after the sampling, and the flow rate could be adjusted if needed. The quantity of phosphorus captured by the columns used in these trials was determined with the same equations (4), (5) and (6) that determined the quantity of phosphorus captured by the biofiltration columns of the aforementioned trials.

During the monitoring of the columns, there was formation of a sludge deposit in the evacuation conducts. Furthermore, a certain amount of sludge was generally found in the sampling liquid at the outlet of the column. For characterizing the sludge, the concentration in TSS and in volatile suspended solids (VSS) of a 100 ml sample was determined from the SM-2540 method by duplicated trials. Iron concentration was also measured. To determine if the sludge contained phosphorus, two samples of 100 ml were taken at the outlet of one of the columns, one of which was filtered to remove all the sludge. The samples were then analyzed according to the MA-4054 method to determine the total phosphorus concentration.

To determine the composition of the filter media, its iron concentration and its phosphorus concentration were subject to analysis. More precisely, samples of the packing of the column holding the sawdust were taken from the bottom, middle and top at the end of the monitoring period of the column. The sample taken from the middle of the column was stirred to be homogeneous. These samples were compared to newly activated sawdust. The concentration in iron and phosphorus on the filter media was conducted by the MA-4054 method.

For the purpose of the analysis of the trial results according to the experimental plan used, aiming for the optimisation of the activation process, a linear regression followed by a STEP-WISE regression were conducted to differentiate the significant parameters from those that were not. A confidence level of 95% was used to obtain a reliable model. It was determined that the concentration in ferric chloride, the impregnation time as well as the interaction between these two parameters had a significant impact on the quantity of phosphorus that could be captured by the activated chips. The quantity of impregnation solution did not show any significant impact. The model obtained from the experimental plan for phosphorus capture by the activated chips is the following:

$$P\text{capture}\left(\frac{mg}{g}\right) = -2.71 + 3.38(\text{conc. FeCl})\left(\frac{mol}{l}\right) + \\ 5.09(\text{Impregnation time})(h) - 2.76 \\ (\text{conc. FeCl})\left(\frac{mol}{l}\right) * (\text{Impregnation time})(h) \quad (10)$$

This model shows good correlation with the experimental data and indicates that the model sticks well to the data. This model allowed production of a modeled surface for the prediction of removal of phosphorus by the chips depending on the two significant parameters, which are: the impregnation time and the concentration in ferric chloride, as presented in the graph of FIG. 4. A variance analysis (ANOVA) was then conducted to validate the model. The P-value indicates that the model is significant at a confidence level of 99%, which is superior to the confidence level generally suggested by literature, which is 95%, underscoring the reliability of the model.

According to the trials, the optimal activation process of the wood chips would be:

Use ferric chloride solution at 1.5 mol/l (240 g FeCl$_3$/l)
Use an impregnation time of 1 hour; and
Use a mass ratio of impregnation liquid/chips of 0.6 to 1.

However, some reservations must be expressed for these results. First, this activation process is optimal for the device used, but could be different with other equipment. For example, the optimal time for impregnation could be shorter if the equipment that mixed the chips were more efficient. If another equipment was used for the activation, the same kind of tests must be conducted to determine the optimal parameters for the process. Furthermore, the parameters of the process were optimal for the chips of paper quality, but would not be the parameters for optimal activation for another kind of wood byproduct, like sawdust. In fact, it will be observed later that the mass ratio impregnation liquid/ chips of 0.6 to 1 is not enough for finer sizes. In short, if another kind of wood cut is considered, these results are no longer optimal.

Example 6

The first objective of the trial in a biofiltration context was to verify the capacities of an organic filter media composed of chips that were activated for phosphorus capture and to compare them with a same type of media composed of crude chips. The graph in FIG. 5 presents the phosphorus assessment carried on the eight (8) columns in 66 days of monitoring, and table 11 presents a comparison of the average efficiency of the columns according to the type of chips used for the phosphorus capture.

TABLE 11

| Type of chips | Average removal efficiency (%) | Total average quantity of captured P (mg P) |
| --- | --- | --- |
| Activated | 29.9 | 834.4 |
| Crude | 9.7 | 269.4 |

It is possible to observe that the biofiltration columns composed of activated chips have a higher removal efficiency than those composed of crude chips. However, their efficiency is considerably lower than the removal target objective of 90%.

The graph in FIG. 6 shows the evolution of the concentration in phosphorus at the inlet and the outlet of columns T1 and T2 during a monitoring period of 178 days. It is important to note that the high variability of the concentration in phosphorus at the inlet is due to the sampling micropipette that was uncalibrated before day 125. It is possible to observe that the columns containing activated chips performs a phosphorus capture during the whole monitoring whereas the columns containing crude chips practically do not perform any phosphorus capture from the 100$^{th}$ day of the monitoring. A hypothesis that would explain that the biomass does not consume any phosphorus from that moment may be that the equilibrium of bacterial growth is reached. Subsequently, the phosphorus resulting from cell lysis would be recuperated by the new cells, which would imply that the global phosphorus capture would be null. As per this assessment, the column composed of the crude chips was able to capture about 200 mg of phosphorus. By using a rule of thumb, it is possible to determine that the quantity of phosphorus captured by a certain volume of a mixture of conventional chips is about 80 g P/m$^3$. As will be demonstrated further, the phosphorus capture is presumably achieved exclusively by the bacterial biomass that contains a phosphorus concentration of about 0.023 g/g$_{dry}$ as reported by Tchobanoglous et al. (2003) supra. If we use the rule of thumb, we determine that there would be about 9 g of biomass in column 1, which represents a density of 3700 g$_{dry}$ of biomass per m$^3$ of biofilter.

The second objective of this trial was to compare the performances of the biofiltration columns with activated chips with those of the biofiltration columns with crude chips for the removal of COD, of ammoniacal nitrogen and of iron concentration at the outlet. Table 12 presents the average concentrations of the different monitoring parameters according to the type of chips used in the biofilter.

TABLE 12

| | Average concentrations obtained | | |
| --- | --- | --- | --- |
| | Inlet | Outlet crude chips | Outlet active chips |
| [Fe] (mg/l) | 0.33 | 0.04 | 0.06 |
| [COD] (mg/l) | 81.5 | 42.9 | 36.45 |
| [N—NH$_4$] (mg/l) | 15.00 | 6.13 | 15.19 |

It is possible to observe that only the ammoniacal nitrogen seems to be significantly affected by the type of chips used.

The graph of FIG. 7 presents the impact of chip activation on the average concentrations of ammoniacal nitrogen at the inlet and outlet of the biofilters. It is possible to observe that the biofilters containing activated chips seem to release ammoniacal nitrogen in the first days of operation. This would hypothetically come from the byproduct that is formed during the activation process: $NH_4Cl$. This effect progressively disappears until day 16, when all the columns performed complete nitrification.

Finally, the last objective of this trial was to verify the effect of phosphorus concentration in the supply water and in the hydraulic load on the phosphorus removal capacity of the columns. Tables 13 and 14 present the effects of the two tested parameters on the removal of phosphorus.

TABLE 13

| [P] at inlet (mg P/l) | Average removal efficiency (%) | Total average quantity of captured P (mg P) |
|---|---|---|
| 5 | 22.3 | 318.7 |
| 15 | 17.3 | 785.2 |

TABLE 14

| Hydraulic load (l/(m²*j)) | Average removal efficiency (%) | Total average quantity of captured P (mg P) |
|---|---|---|
| 350 | 21.0 | 468.1 |
| 500 | 18.6 | 635.7 |

As shown in table 13, the quantity of captured phosphorus in the columns supplied with water having higher phosphorus concentration is higher than those supplied with a lower concentration. The global removal efficiency is nevertheless lower. However, since the potential lifespan of the columns was not reached, it is plausible to believe that the capacities would have been the same at the end of the useful lifespan of the biofiltration columns. With regard to the supply flow rate, the removal efficiency of the biofiltration columns supplied with 350 l/(m²*d) is slightly higher than the ones supplied with 500 l/(m²*d). This could be explained by the fact that the hydraulic retention time of the supplied columns with a higher flow rate is higher than the ones that are supplied with a lower flow rate. Since the potential lifespan of the columns was not reached, it is nevertheless plausible to believe that the maximal capture capacities would have been the same.

The efficiency of phosphorus removal of the columns containing active chips is higher than the ones containing crude chips (30% vs 10%), but remains much lower than the target concentration of 0.5 mg P/l at the outlet of the column, which represents a removal of at least 90%. Based on these results and on certain observations, certain hypotheses were formed to explain the relatively low performances that were observed with the phosphorus capture biofiltration columns containing active chips.

1. Wastewater contains competitive ions and organic matter that impair efficient removal of phosphate;
2. The specific surface of the chips is too poor to efficiently capture the phosphate;
3. The hydraulic retention times of the filter are too low to ensure a good capture of the phosphate;
4. The aerobic conditions are not ideal for phosphate removal by the chips compared to the immersed conditions of the batch trials;
5. The water migrates mainly into the peat, flows a little onto the surface of the chips and follows preferential paths; hence the chip surface is not well used.

Furthermore, the use of activated chips in the context of biofiltration has an impact on the ammoniacal nitrogen in the first days of operation. The weakening performances of the iron and the COD do not seem to be affected by the nature of the chips used. Finally, the quantity of phosphorus captured in the columns supplied by a higher phosphorus concentration is higher than the ones supplied by a lower concentration and the total quantity of phosphorus capture in the columns supplied with a higher flow rate is higher than the ones supplied with a lower flow rate.

To optimize the use of the activated wood, we investigated the influence of the quality of the water on phosphorus removal, and more precisely the influence of the competitive ions and the organic matter. Table 15 represents the concentration of different components ($N-NO_3$, COD and P) measured for the types of water tested.

TABLE 15

| Type of water | $N-NO_3$ (mg $N-NO_3$/l) | DCO (mg DCO/l) | Initial P (mg P/l) |
|---|---|---|---|
| Synthetic | 0 | 0 | 200 ± 20 |
| Outlet biofilter | 13.4 | 25 | 187 ± 19 |
| Settled wastewater | 0.4 | 354 | 183 ± 18 |

In view of FIG. 8 presenting the quantity of phosphorus captured per gram of active chips according to the different types of water used, it can be observed that the composition of the water used has an impact on the phosphorus capture capacity of the activated chips. The chips immersed in demineralized water took about 30% more phosphorus than the ones in the settled wastewater. The biggest gap is between demineralized water and the water at the outlet of the biofilter, which contains the highest concentration of nitrate. However, the initial concentrations of phosphorus of the different types of water were slightly different, which could have had a certain impact on the quantity of phosphorus adsorbed on the chips. Generally, this indicated that the use of water with fewer constituents allows a more efficient phosphorus capture. Furthermore, the creation of biofilms was observed in the biofilters containing activated chips. Besides the direct effect of competitive ions and organic matter, charged water will surely lead to the growth of a larger bacterial biofilm on the surface of the chips. These biofilms are essential to any treatment system with fixed media, but affect the passive capture of phosphorus, which is a surface phenomenon.

Concerning the pH, FIG. 9 presents the results of the trial aiming to verify the influence of this parameter on the phosphorus capture capacities of the activated wood. Taking into account uncertainty, these results indicate that the pH does not seem to have a significant effect on the phosphorus capture capacities of activated wood.

Concerning the temperature, FIG. 10 presents the results of the trial aiming to verify the influence of this parameter on the phosphorus capture capacities of the activated wood. It is possible to observe that the phosphorus capture is more efficient at higher temperatures. The effect is nevertheless not that considerable, since activated wood immersed at 50° C. captures about 22% more phosphorus than at 3° C. Furthermore, the range of temperatures tested is much larger than that of municipal wastewater, which generally varies between 7 and 24° C. in Quebec. In practice, this parameter will have little effect on the sorption capacity of activated wood.

Concerning grain size, FIG. 11 presents the results of the trial aiming to verify the influence of this parameter on the phosphorus capture capacities of the activated wood. It is shown that grain size has a very big impact on the capacity of phosphorus capture of activated wood. In fact, the chips of 2-6.5 mm in diameter capture about 230% more than the chips with a diameter of 25 mm and more. Shavings is the cut of wood that had the highest capture capacity. The wood granulometry being an indicator of the specific surface, this confirms that this parameter has a very significant impact on the capacity of phosphorus capture by a media.

Furthermore, a trial was conducted to determine the kinetics of phosphorus capture by activated wood, whose results are shown in FIG. 12. These results indicate that the quantity of phosphorus capture by the chips is optimal after about twelve hours of contact time. It was possible to model a logarithmic trend curve from this data, by the following equation:

$$P \text{ captured} = 0.435 \ln(\text{contact time } (h)) + 1.725 \quad (11)$$

According to these results, a passive capture filter should be dimensioned in order to have a hydraulic retention time of at least 12 hours. Table 16 represents the results obtained in two tracer trials that aimed to determine the hydraulic retention time in the biofiltration columns, and FIG. 13 presents the KCl concentration curve at the outlet as a function of the measured time for the second trial. According to these results, the biofilter's hydraulic retention time is around 7.8 h. The similarity obtained in both trials indicated high reproducibility. According to equation (11), a hydraulic retention time of 7.8 h would ensure that the chips would capture 93% of the phosphorus they would capture in 12 hours. The effect of a hydraulic retention time inferior to the optimal time is thus of little significance.

Concerning the influence of the columns' mode of operation, FIG. 14 presents the phosphorus concentrations at inlet and outlet of the columns by trickling and by immersion monitored for 141 days, and table 16 presents an assessment of phosphorus captured by each column as well as the quantity of water circulating in the packing.

TABLE 16

| Parameter | trickling | Immersion |
|---|---|---|
| Total captured phosphorus (mg P/g) | 4.2 | 16.8 |
| Quantity of water circulating in the column (I) | 88 | 89 |

As shown in FIG. 14, the phosphorus removal performances of the column operated by immersion are much more interesting than the column operated by trickling. According to the balance, the column operated by immersion captures almost four times more phosphorus than the other. Starting from day 18, the concentrations in phosphorus at the outlet of both columns are considerably different. After only 32 days, the column operated by trickling almost does not perform any phosphorus capture at all, while the other has relatively good efficiency until around day 130. It is possible to observe that the adjustment of the flow rate at day 67 had a considerable impact on the phosphorus removal performance of the column operated by immersion. The target flow rate went from 720 ml/d to 575 ml/d. The trial that determined the flow rate to adjust the HRT to about 12 hours is described later in detail.

FIG. 15 presents the dissolved iron concentration at the inlet and outlet of the columns by trickling and by immersion. It is possible to observe that the column operated by immersion releases a much larger quantity of iron than the column by trickling. Considering that the iron is under ionic form in a low pH environment and a low redox potential, the mode of operation by immersion would therefore be more favourable to iron solubilisation because of the anoxic conditions that favour a low redox potential.

The results of an analysis of new and used packing are presented in table 17 in terms of concentration in phosphorus and in iron of the new and used packing samples (grindings) taken at different points of the column operated by immersion after 141 days of operation.

TABLE 17

| Activated grindings | Iron (mg/g) | Phosphorus (mg/g) |
|---|---|---|
| New | 73.5 ± 7.4 | 0.2 ± 0.03 |
| Used- bottom | 58.1 ± 5.8 | 13.3 ± 1.3 |
| Used- mixed medium | 64.2 ± 6.4 | 13.6 ± 1.4 |
| Used- top | 64.4 ± 6.4 | 9.1 ± 0.9 |

It is important to note that the uncertainty of the method used is of 10% for concentrations higher than 1 mg/g and of 15% for concentrations lower than 1 mg/g. It is possible to observe that the iron concentration in the new filter media is superior to the one in the used media, which is logical considering the return in iron solution. Furthermore, it seems that the lower part is slightly less concentrated in iron than the higher parts. Since it is the furthest part from the top of the column which is in contact with air, it is presumed that it is the section with the lowest redox potential, so it is more inclined to return the iron into solution. It will be later shown that activated sawdust has almost twice this concentration in iron.

Next, it is possible to see that the phosphorus concentration in the filter media reaches about 13.5 mg/g at the bottom and at the center of the column. The higher part of the column has a lower phosphorus concentration, which indicated that this section is not saturated. It is noticeable that the maximal concentration reached is lower than what was calculated in the assessment. Firstly, this could be explained by the imprecision on the phosphorus concentrations or the flow rates measured during the monitoring. Next, this could be explained by the fact that a certain quantity of sludge, released outside the column, could contain phosphorus. More details related to this observation are presented later.

The first objective of these trials was to determine the influence of competitive ions and organic matter, pH and temperature on the phosphorus capture capacities of activated wood. Firstly, it was determined that the use of water charged with fewer constituents allowed a larger phosphorus capture by the activated wood. Secondly, it was determined that the pH does not seem to have a significant effect on the capacity of phosphorus capture of activated wood. Thirdly, it was possible to observe that the phosphorus capture is more efficient at higher temperatures. The effect of the temperature is however not that significant, especially considering the typical temperature range of wastewater.

The second objective of these trials was to determine the influence of grain size (granulometry) and the type of activated wood byproduct on its performance for phosphorus capture. It was noted that grain size of activated wood byproducts had a very big impact on their capacities. The wood's grain size being an indicator of specific surface, this confirms that this parameter has a very significant impact on the phosphorus capture capacity of a media.

The third objective of these trials was to determine the kinetics of phosphorus capture by activated wood and to determine whether the hydraulic retention time of the biofiltration columns was sufficient. The results indicate that the quantity of phosphorus captured by the chips is optimal after about 12 hours of contact time. Afterwards, the trials with tracer indicated that the hydraulic retention time of the trial biofilters was about 7.8 hours. According to the kinetic curve of modelled phosphorus capture, a hydraulic retention time of 7.8 hours would make the activated chips capture 93% of the phosphorus they would capture in 12 hours. The effect of an HRT lower than optimal is thus of little significance.

Furthermore, the results clearly show that the column operated by immersion is much more efficient for phosphorus capture than the one operated by trickling. In fact, the column operated by immersion captured almost four times more phosphorus than the column operated by trickling. This trial showed that the wood by-products used by immersion would have a phosphorus capture capacity of about 15 mg/g. These results can be explained by the fact that the water that circulates in the columns by trickling uses preferential flow channels that are quickly saturated in phosphorus and are more subject to short-circuiting, which reduces the water residence time in the column. In addition, the concentration of dissolved iron in the column operated by immersion indicates that there is potentially a double mechanism of phosphorus capture: anion exchange and precipitation. The dissolution of iron in the column operated by immersion would be due to the fact that its redox potential is lower because of the low quantity of dissolved oxygen.

However, the low diameter of the column ensures that the wall effect should be significant in the column, which would be unfavourable to the determination of the maximal capture capacity. Furthermore, the fact that the supply solution was three times more concentrated that typical municipal wastewater could have possibly biased the media's capacity for the positive. Finally, since the solution used was much more pure than settled wastewater or than a biofilter outlet, we cannot expect that the filter media's capacity in real conditions be inferior. Finally, following the obtained results, the relatively low efficiency of phosphorus removal of the activated chips used in context of biofiltration could be explained by a combination of a non-optimal supply mode, strong grain size in the chips, the used supply solution containing competitive ions, and organic matter as well as a short hydraulic retention time in the column.

Example 7

For comparison purposes, the activated wood by-products that were the object of the trials were characterized. FIG. 16 presents the granulometric profile of the different wood byproducts tested. It is possible to note that sawdust presents the finest grain size whereas shavings present the coarsest grain size. Nevertheless, this result is not necessarily reflective of the specific surface of the products, since their aspects are different and the byproducts produced by a disc chipper are superior to those produced by a hammer mill. It would be possible to achieve specific surface measurements to be able to determine a more precise mode of classification.

Adsorption isotherms according to the Freundlich and Languir models were realised for the peat moss, the sawdust, the activated shavings, the activated sawdust, and the activated alumina. The activated wood by-products showed a very good correlation with the models. The model that had the best correlation coefficients ($R^2$) with the experimental data was Langmuir's model, whose coefficients indicate the maximal capacity of phosphorus capture, as shown in Table 18.

TABLE 18

| Product | Maximal capacity (mg P/g) |
|---|---|
| Peat | 0 |
| Crude sawdust | 0 |
| Active grindings | 6.9 |
| Active sawdust | 7.2 |
| Activated shavings | 6.8 |
| Activated alumina | 12.9 |

It is possible to notice that the maximal capacities of phosphorus capture by the three wood byproducts are quite comparable. However, activated sawdust slightly stands out from the lot. This result could be explained by the fact that sawdust held the biggest specific surface. We can notice that the maximal capacities of batch capture are inferior to the ones determined in an immersed column. This could be explained by the fact that the iron release into the solution is a slow process that continues for months. To evaluate the impact of iron release on the phosphorus capture by active wood byproducts, a batch trial spread over many months could be conducted.

The first objective of these trials was to characterize and activate different commercially available wood byproducts. It was shown that sawdust was the product with the smallest grain size and shavings were the product with the coarsest grain size. Next, it was shown that more ferric chloride was needed for an efficient activation, that is an impregnation liquid:wood mass ratio of 1.5 to 1.

The second objective was to determine and compare the maximal phosphorus sorption capacity of the activated wood by-products as well as other packing products by adsorption isotherm modelling. First, it was shown that the type of peat moss used and the crude sawdust didn't have any phosphorus capture capacity. Next, the wood by-products received good correlation with the models, especially the Langmuir model. The maximal capacities of phosphorus capture of the three wood by-products are pretty comparable, but activated sawdust stands out slightly from the lot with a capacity of 7.22 mg/g.

It is possible to notice that the maximal capacities for batch phosphorus capture are considerably inferior to those determined by the immersed column. This could be explained by the fact that the iron release into the solution is a slow process that acts on the long term, which confirms the hypothesis of the double mechanism of phosphorus capture by the activated wood operated by immersion.

Concerning the determination of the flow rate to apply to the immersed columns using the activated wood by-products for phosphorus removal, table 19 presents the results that helped determine the volume of water present in the immersed columns using approximately 315 ml of packing.

TABLE 19

|  | Vol. injected water (ml) | Vol. drained water (ml) | Vol. residual humidity (ml) | Total vol. (ml) |
|---|---|---|---|---|
| Activated grindings | 250 | 177 | 77 | 254 |
| Activated sawdust | 280 | 161 | 138 | 299 |
| Activated shavings | 290 | 249 | 36 | 285 |

It is possible to see that the total quantity of water retained is close enough to the quantity injected. Thanks to this information, it is possible to determine the void percentage of the packing and to evaluate the flow rate to apply to the columns to have a hydraulic retention time of 12 hours, as shown in table 20.

TABLE 20

| | Void percentage (%) | Q (ml/d) | Q (ml/5 min) |
|---|---|---|---|
| Activated grindings | 81% | 509 | 1.8 |
| Activated sawdust | 95% | 598 | 2.1 |
| Activated shavings | 90% | 569 | 2.0 |

Table 20 indicates that activated sawdust would have the strongest void percentage, and could therefore receive the highest flow rate for a 12 hour HRT, whereas activated grindings would be the one that would receive the lowest flow rate. To have the same base of comparison for all the products and to take into account the uncertainty on the measuring of void percentage of the activated sawdust column, the flow rate applied to all the columns for the monitoring of the installation was of 2 ml/5 min. This would represent a daily flow rate of 1.8 m$^3$ of water per m$^3$ of packing. However, it is more or less realistic that the void percentage is of about 95%. This could be explained by the presence of certain voids in the column, especially in its lower part. Furthermore, the fact that the diameter of the columns was very small could have influenced the trial, since the compaction of the packing was very limited. The use of the column with a bigger diameter could indicate more precisely the real void percentage of the columns. Next, the global residual humidity was determined by calculating the average humidity on top, in the middle and at the bottom of the column, which could have influenced the results of the trials, since the bottom part contains much more water. This effect was particularly substantial in the column containing the sawdust, since it retains much more water than the other linings. The quantity of residual humidity of the sawdust presented in table 18 shows this affirmation well. In order to address this problem, the draining period could be longer, around 48 hours, where the residual humidity could be determined by completely stirring the humid filter media.

Concerning the monitoring of the immersed columns using the different activated wood byproducts, FIG. 17 presents the concentration of phosphorus at the inlet and outlet of the immersed columns during a monitoring period of 80 days, and FIG. 18 presents the efficiency of phosphorus removal of the columns for this same monitoring period.

It is possible to notice that the columns were all capable of reducing the phosphorus concentration of the water at the inlet to under 0.2 m/l for 80 days. The performance average of phosphorus removal was of about 98% for the columns containing sawdust and the first kind of activated shavings, whereas it was of 97% for the columns containing the second kind of shavings. FIGS. 19 and 20 present respectively the monitoring results of the pH and the iron concentration at the inlet and outlet of the immersed columns. It is possible to observe that the pH at the outlet of the columns is relatively acidic during the first days of the monitoring and returns to the value of the supply solution around day 20. This could be due to the leaching of the non-neutralized FeCl$_3$ residue. This phenomenon lessens quickly enough nonetheless. With regard to the iron, the concentration at the outlet of the columns seems to vary in a relatively random manner. It would be possible to follow the redox potential of the supply solution to confirm the hypothesis that the redox potential could vary according to the age of the supply solution (fresh or old), which could make the level of dissolved oxygen vary. Furthermore, samples that were not stirred before their dissolved iron analysis, to avoid the influence of suspended particles coming from the aforementioned deposited sludge, it is possible that this sludge was strongly concentrated in iron. Depending on the settling rate of the sample, the measured concentration may have varied.

FIG. 21 presents the concentration of ammoniacal nitrogen at the inlet and outlet of the column containing the first kind of activated shavings. It is possible to observe that the column releases N—NH$_4$ in the first days. This hypothetically stems from the by-product that is formed during the activation process, NH$_4$Cl. Once the product is leached, this parameter returns to normal.

Concerning the results of the sludge analysis that was conducted, table 21 presents the concentration in TSS, VSS and in iron of one same sample taken at the outlet of the activated sawdust column.

TABLE 21

| Parameter | Concentration (mg/l) |
|---|---|
| TSS | 51.1 |
| VSS | 13.3 |
| Fe | 2.6 |

Table 22 presents the total concentration in phosphorus of a filtered sample compared to a non-filtered sample taken at the outlet of the activated sawdust column.

TABLE 22

| | Non-Filtered | Filtered |
|---|---|---|
| Phosphorus concentration (mg/l) | 0.10 | 0.07 |

Considering table 21, it is possible to see that the sample contains a high concentration in TSS, of which 25% are volatile suspended solids. This means that the majority of this sludge is of mineral composition. At first sight, the concentration in iron does not seem to explain all these mineral solids. However, the measured value is in terms of Fe$^{3+}$ and the iron could be present as heavier particular components, such as Fe(OH)$_3$, which would considerably increase the mass of the ferrous portion. Also, it is surprising to notice that there are so many volatile suspended solids, since the solution used is composed of drinking water, so there is almost no substrate for bacteria. A hypothesis is that a part of this biomass could come from the degradation of the wood of the packing of the column. It is also possible to notice that the sludge does not seem to contain a considerable quantity of phosphorus, which is an important result. The small difference between the two samples could be explained by the phosphorus contained in the bacteria, which would be around 2% according to Tchobanoglous et al. cited earlier.

The results of the analysis of the composition of the new and old packings are presented in table 23 in terms of phosphorus and iron concentrations of the newly activated sawdust samples taken at different points of the column after 80 days of operation.

TABLE 23

| Activated sawdust | Iron (mg/g) | Phosphorus (mg/g) |
|---|---|---|
| New | 96.1 ± 9.6 | 0.2 ± 0.03 |
| Used - bottom | 107.3 ± 10.7 | 13.2 ± 13.1 |
| Used - mixed medium | 126.0 ± 12.6 | 1.3 ± 0.1 |
| Used - top | 131.3 ± 13.1 | 0.3 ± 0.04 |

Firstly, it seems unrealistic that the iron concentration in the new filter media is inferior to the concentration in the used filter media. According to the concentrations obtained in the used filter media, it is more realistic to believe that the iron concentration in the new filter media to be about 130 to 140 mg/g. This indicates that at least 10% of the mass of the media is composed of iron. If we consider that the mass density of the crude sawdust is 400 kg/m³, the activated sawdust would have a mass density of about 440 kg/m³. This concentration is almost twice higher than that of the packing of the column operated by immersion used to determine the optimal mode of operation. Next, it is possible that we observe migration of the iron to the top of the column. This would be coherent, since the iron that would be put in solution at the base of the column would precipitate when it would reach the top of the column which is exposed to the open air, thus with a stronger redox potential. It is interesting to see that the concentration in phosphorus is very high at the base of the packing whereas it is relatively low in the rest of the column. We can see that there is a saturation profile of phosphorus. Since the column was far from the saturation point, the saturation concentration of the phosphorus could be superior to 13.2 mg/g as measured. Furthermore, since the concentration in iron is almost two times higher than the concentration in the packing of the column operated by immersion used to determine the optimal mode of operation, we could expect that the maximal capacity of phosphorus capture by the filter media would be superior to 15 mg/g.

The first objective was to determine the required flow rate to obtain a hydraulic retention time of 12 h in the columns. It was fixed to 2 ml/5 min for the tested columns, which represents 1.8 m³ of water per m³ of packing per day. However, it was made clear that this result was approximate because of the void area in the column, the small diameter of the columns and the method used to determine the residual humidity.

The second objective was to determine whether immersed columns packed with activated wood by-products were able to reduce the concentration in phosphorus of typical wastewater to under 0.5 mg/l. The results indicate that they were able to reduce the initial concentration of 5 mg/l to a concentration of 0.2 mg/l of phosphorus throughout the duration of the monitoring, which was 80 days. Even though the used solution was synthetic, these results could reasonably be transposed to treat municipal wastewater or water coming from the outlet of a biofiltration system. Considering the comparison between the performances of the different activated wood byproducts, the use of sawdust seems slightly more advantageous.

The third objective was to monitoring the iron, pH and ammoniacal nitrogen at the inlet and outlet of the columns. It was shown that the pH at the outlet of the columns was acidic in the first days of operation and that there was a release of N—NH$_4$ during this period. These observations could be attributed to the byproduct of the activation that was leached in the two first weeks. The iron monitoring did not give any significant trends.

The fourth objective was to characterise the sludge found at the outlet of the column. The results indicate that the sludge was 75% mineral. However, the concentration in iron alone does not seem to explain the totality of this fraction. The organic fraction totalising 25% of the mass of the sludge is surprising enough, since there is very little substrate in the supply solution of the columns, which is composed of drinking water and phosphoric acid. The results indicated that the sludge found at the outlet of the column of activated wood contains very little phosphorus, which is an important result. Finally, the measured value of TSS of about 50 mg/l being superior to the discharge standard established at 25 mg/l in Quebec, a device to limit the release of TSS could be proposed, such as a filter composed of an appropriate media to retain the generated sludge.

The last objective of this trial was to analyse the composition of the new and used activated wood. It was possible to observe the iron migrate from the bottom to the top of the column. Furthermore, the new media is composed of about 10% iron on a mass basis. The phosphorus is essentially concentrated at the bottom of the column, whereas it is of very low quantity in the rest of the column, indicating that there is a saturation profile in the column.

From the conducted trials, it was observed that the quantity and concentration of the optimal ferric chloride solution to impregnate the wood by-products was 1.5 liters of solution concentrated at 1.5 mol/l per kg of wood. Thereafter, gaseous ammonia was injected into the matrix of impregnated chips to obtain iron hydroxide. Here is the expected reaction during the activation of the wood products:

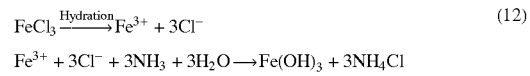

$$FeCl_3 \xrightarrow{Hydration} Fe^{3+} + 3Cl^- \quad (12)$$
$$Fe^{3+} + 3Cl^- + 3NH_3 + 3H_2O \longrightarrow Fe(OH)_3 + 3NH_4Cl$$

From this equation, it is possible to determine the quantity of chemical products required to activate the wood. For each mole of hydrated iron, three moles of ammonia will be required. The molar mass of the ammonia being 17.03 g, we know that 51.09 g of ammonia will be required to initiate the reaction with one mole of iron. If we want to determine the quantity of chemical products required to activate a kilogram of wood, the quantities are as follows:

Mass of wood: 1 kg
Volume FeCl$_3$ at 1.5 mole/l required: 1.5 l
Number of moles of FeCl$_3$: 2.25 mole (also corresponding to the number of moles of iron required)
Molar mass of FeCl$_3$: 162.21 g/mole
Mass of pure FeCl$_3$ required: 364.97 g
Number of moles of NH$_3$ required: 6.75 moles
Mass of NH$_3$ required: 114.95 g We therefore know that to activate a kilogram of wood, we would need about 365 grams of ferric chloride and 115 grams of ammonia.

Example 8

FIG. 22 schematically represents a system that could be used for the production of activated wood. With this system, the complete process of wood activation, including the impregnation of the ferric chloride on the wood followed by a gaseous ammonia injection can be conducted in one same reactor. This reactor would be a <<Bach>> industrial mixer, composed of stainless steel because of the corrosive nature of ferric chloride and ammonia. The system would include a reservoir and a FeCl$_3$ injection device, a reservoir of NH$_3$ and a device for air circulation. The reactor could be filled up to 40% for operation purposes, and the activation cycle could last approximately 45 minutes, so 15 minutes for the impregnation by FeCl$_3$, 15 minutes for the contact with the ammonia and 15 minutes for the ventilation in the reactor. The partially dried wood would then be stored. An <<in situ<< type of activation process could be considered, especially since it would be advantageous to be able to activate wood byproducts that are already in a filter simply by adding chemical products. The spraying of FeCl$_3$ followed by the spraying of NaOH on sawdust already placed in a filter's frame could be considered for the purpose of activation. Moreover, considering that the phosphorus capture by the iron or aluminum oxyhydroxides is reversible, it is possible to regenerate the saturated filter media with an alkaline solution, as described by Genz et al. in <<Advanced phosphorus removal from membrane filtrates by adsorption on activated aluminium oxide and granulated ferric hydroxide. Water Research 38(16): 3523-3530 (2004). This would allow to considerably reduce the quantity of media required. The phosphorus that is recuperated during the regeneration could eventually be transformed into struvite, usable as an agricultural fertiliser.

According to one of the possible embodiments, the immersed filter for passive phosphorus capture can be placed downstream from an organic bed trickling biofilter, as represented in FIG. 23. This configuration allows one to preserve the purifying performances of the biofiltration system while still performing the phosphorus removal of the wastewater being treated. Furthermore, such a configuration would allow one to perform a denitrification of the water being treated to complete the wastewater purification. It is known that the biofiltration systems present excellent nitrification performances, as in the transformation of ammoniacal nitrogen into nitrite and nitrate. The denitrification, or removal of nitrites and nitrates, is a phenomenon that produces itself by denitrifying biomass in anoxic conditions, so in the absence of oxygen. However, the immersed filters packed with activated wood byproducts are in anoxic conditions, favourable to the establishment of the denitrifying biomass. Nevertheless, the low concentration in easily biodegradable organic matter found at the outlet of the biofiltration system could represent a limiting factor for an efficient denitrification process. This difficulty can be solved by supplying the passive capture filter with a fraction of the pretreated water flow, which is rich in easily biodegradable organic matter. This configuration could therefore perform a more complete sanitation of the municipal wastewater by capturing the organic matter, the phosphorus and the nitrogen.

It was made clear that the use of a passive capture filter for immersed activated wood phosphorus causes a release of iron and TSS. Even though the use of decanters or downstream filters can be considered, another approach would consist in pairing the packing of the activated wood with an additional packing capable of capturing the released iron and the suspended particles (TSS), as illustrated in FIG. 24. In order to do so, a layer of additional packing composed of an appropriate media, such as sand, can be installed in the superior part of the filter, to be easily accessible and easily maintained. Furthermore, an alkaline product such as calcite or mollusk shells can be added to this layer to promote precipitation of the dissolved iron into iron hydroxide, allowing the capture of iron before it leaves the system, said hydroxide would be available thereafter for phosphorus capture.

According to another embodiment, the system and the method of wastewater treatment with an immersed filter could involve an aeration device whose flow rate is controlled in such a manner that the release of metal and/or phosphorus is limited.

The passive capture immersed filters packed with activated wood described earlier seem to have the potential to be useful for other applications than the purification of municipal effluents. They could also be applied to the treatment of watercourses that are strongly charged in phosphates and nitrates of agricultural origin, and can perform phosphorus removal since the anoxic conditions are favourable to the denitrifying biomass, they can also perform the denitrification of the watercourse.

Finally, the passive capture immersed filters packed with activated wood can be annexed to other purification technologies to enhance their phosphorus removal efficiency. They could be annexed to aerated pond-type systems, which represent 70% of the purification systems used in Quebec, since this type of system does not significantly reduce the concentration of phosphorus. It could be considered to position the immersed filter between the penultimate and the last aerated ponds, considering that the water isn't too charged in organic matter and that the TSS released by the filter could settle in the last pond.

Example 9

The formation of orangey aggregates at the top of the columns was observed. It turns out that this sludge is not desirable during actual implantation since it generates problems of particle emissions and is connected to the release of iron, component which permits phosphorus capture. These trials aimed to study the phenomenon of the iron release and to evaluate methods to avoid this release.

Two trial columns were therefore installed according to the parameters of example 5 (grindings) in order to reproduce the formation of sludge. These columns also allowed us to validate the efficiency of the process in terms of reduction of phosphorus throughout the duration of the trial. Furthermore, it was possible to compare the performances of a product composed of 50-60% iron hydroxide (unknown complementary fraction) No. CAS 7732-18-5 commercialized under the name GFH™ by the Siemens Industry Inc—Water technologies (Alpharetta, Ga.) company, with the filter media being optimized. Four additional trial columns were installed. The columns presented the characteristics found in table 24:

TABLE 24

| Supply characteristics of the phosphorus removal columns | | | | | | |
|---|---|---|---|---|---|---|
| | C1 | C2 | C3 | C4 | C5 | C6 |
| Packing | Activated grindings | Commercial iron hydroxide | Activated grindings | Activated grindings | Activated grindings | Activated grindings |

TABLE 24-continued

| Supply characteristics of the phosphorus removal columns | | | | | | |
|---|---|---|---|---|---|---|
| | C1 | C2 | C3 | C4 | C5 | C6 |
| Supply mode | Immersion | Immersion | trickling | Immersion | Immersion | Immersion |
| Supply water | Synthetic | Synthetic | Synthetic | Outlet of BIOSOR$^{MD}$ | Synthetic | Synthetic |
| Aeration | None | None | None | None | 0.5 ml/min | 5 ml/min |
| Role | Sludge characterization | Control | Comparative with immersion | Phosphorus removal + denitrification | Effect of aeration on release | Effect of aeration on release |

For purposes of being concise, the abbreviated name «C1» represents the simple activated shavings column, «C2» represents the column packed exclusively with commercial iron hydroxide, «C3» represents the trickling column, «C4» represents the column that is supplied with water exiting a biofilter that uses an organic filter media of the BIOSOR$^{MD}$ type (see annex B), «C5» represents a column aerated at 0.5 ml/min and the «C6» column is aerated at 5 ml/min.

The columns are installed and operated according to the optimal parameters that were determined during the trials pertaining to the aforementioned examples. So, the filter media is prepared following the same protocol and the installation of the columns is done with the same materials.

The supply waters are maintained at temperatures varying between 2 and 4° C. to slow down the bacterial growth within them. The whole installation (including the supply reservoir) is covered to avoid the growth of micro-algae and cyanobacteria, since they can capture phosphorus, resulting in distorted results.

Column C1 was installed to try to reproduce the conditions that lead to the formation of orangey sludge. It was then possible to characterize it more in-depth to better understand the phenomenon.

Column C2 was a control column which allowed the comparison between the reduction of phosphorus by the iron hydroxide and the validation of the release behaviour of the iron.

Column C3 helped validate the hypothesis according to which the phosphorus removal is more efficient in immersion mode than in trickling mode.

In a BIOSOR$^{MD}$ type biofilter, nitrates are produced by nitrifying bacteria serving as a substrate to the methanotrophic bacteria. However, a part of these nitrates did not transform while exiting the biofilter, which is problematic for certain concentrations. Column C4's purpose was to verify whether the actual process allowed a simultaneous phosphorus removal and denitrification of the wastewaters. To provide the necessary pretreated water (rich in nitrates and phosphates), a BIOSOR$^{MD}$ type column was installed.

Columns C5 and C6 allowed to verify whether the air passage inside the packing had an impact to limit the release of iron and phosphorus. The air passage did indeed allow to reduce or counteract the iron release. Column C5 had an aeration of 0.5 ml/min whereas column C6 was aerated 10 times more, with 5 ml/min.

Finally, the technical parameters (installation, materials, etc. . . . ) were identical for each of the columns so that only the parameters presented in table 24 would influence the results. The monitoring was systematically conducted for all of the columns with the same equipment and the same analysis methods. The technical characteristics of the experimental set-up are presented in table 25:

TABLE 25

| Technical characteristics of the phosphorus removal experimental set-up | |
|---|---|
| | Columns |
| Number of columns | 6 |
| Height of the columns (cm) | 30 |
| Nominal diameter (cm) | 4 |
| Materials of the columns | PVC |
| | Filter media |
| FM height (cm) | 25 |
| Composition of FM | Columns (C1, C3, C4, C5, C6) Wood grindings activated with iron hydroxide Density = 0.757 g/ml (C3 et C4), 0.777 g/ml (C5 et C6) Column C2 Iron hydroxide (50-60% m/m) in granules provided by SIEMENS, #CAS 7732-18-5 |
| | Inlet |
| Supply liquid flow rate (ml/day) | 575 (460 L/m$^2$ · d) *Flow rate controlled by Masterflex peristaltic pumps, EasyloadII heads, models 77800-50 et 77201-60 |
| Composition and origin of supply liquid | Drinking water whose concentration in P_PO$_4$ was adjusted between 5 and 6 mg/L (C1, C2, C3, C5, C6) BIOSOR$^{MD}$ water at outlet (C4) |
| Air flow rate (ml/min) | C6: 5 C5: 0.5 * Flow rate controlled by a Gilmont (Labcor model #03232-21, size #11) flowmeter with floating ball |

TABLE 25-continued

Technical characteristics of the phosphorus removal experimental set-up

| | |
|---|---|
| Origin of the air | Compressor |
| | Piping |
| Liquid inlet | Supply water |
| | ⅛" inch in PVC (Jensen insert) |
| | Polypropylene fittings |
| | Norprene pipes, LS 14 |
| | ⅛" inch in PVC (Jensen insert) |
| | Polypropylene connectors |
| | Columns |
| Liquid outlet | Columns (C1, C2, C4, C5, C6) |
| | Polypropylene elbow (pierced by way of a vacuum breaker) |
| | ⅜" inch in silicone (Masterflex). (to facilitate disconnection) |
| | Polypropylene fittings |
| | ⅜" inch in PVC (Parker Nexen) |
| | Polypropylene fittings |
| | ⅜" inch in silicone (Masterflex). (to facilitate disconnection) |
| | 1 L decanter |
| | Drains |
| | Column C3 |
| | Polypropylene connector |
| | ⅜'" inch in PVC (Parker Nexen) |
| | 1 L decanter |
| | Drains |
| Air inlet | Compressor |
| | Flow rate control gauge |
| | ¼" inch in PVC (Parker Nexen) |
| | flowmeter with floating ball (Gilmont) |
| | ¼" inch in PVC (Parker Nexen) |
| | Polypropylene connector |
| | Aquarium air diffuser (Marina) |
| | Columns C5, C6 |

The set-up (see FIG. 25) consists of 6 columns of PVC packed with 25 cm of wood shavings activated by iron hydroxide (except column 2 which is packed exclusively with commercial iron hydroxide), representing the filter media, and of a nominal diameter of 4 cm. See annex A for information relative to the preparation of the activated shavings.

The columns whose filter media is immersed are equipped with a synthetic water inlet (except C4) at the bottom of the column. The so-called synthetic supply water is in fact drinking water whose phosphate concentration (P_PO$_4$) was adjusted between 5 and 6 mg/L with a solution of H$_3$PO$_4$. The water is pumped from the supply reservoir to the column. The iron hydroxide captures the phosphorus by forming a complex. The treated water then reaches the top of the column, where it flows into a decanter, and then into the drains. The decanters serve to concentrate the solids released by the columns to quantify the losses in iron and in phosphorus under particular forms. Seals cover the top of the columns to limit the contact between the air and the surface of the liquid. Grilles are also installed on either side of the filter media to keep it in place.

For the column by trickling, an opening pierce in the centre of the seal on the top of the column allows the supply tube to drain the water directly at the center of the surface of the filter media.

Column C4 is supplied with outlet water of a BIOSOR$^{MD}$ biofilter which was made functional especially for the trial. The municipal wastewaters treated by the BIOSOR$^{MD}$ come from the treatment plant of Beauport (Quebec).

Columns C5 and C6 are equipped with an inlet of air under the column. Therefore, in addition to liquid immersion, there is also an air flux travelling the filter media upward. The air is injected in an air diffuser to permit even aeration.

Example 10—Column of Simple Activated Grindings (C1)

FIG. 26 presents a simplified illustration of the set-up of columns C1 and C2.

Results

Reduction of the Phosphorus

The target objective for the experience in terms of phosphorus treatment is of 0.3 mg/l.

On average, the phosphorus concentration at the inlet of the columns (synthetic water supply) was of 5.14 mg/l (concentrations between 5 and 6 were targeted). During 98 operating days, column C1 permitted an average phosphorus reduction of 98%. This corresponds with an average at outlet of 0.08 mg/l. The target was thus reached. Moreover, no value at outlet surpassed the target of 0.3 mg/l. The phosphorus capture sites are saturated with time, and the column can release a certain quantity of iron. In fact, a relatively important release was quantified and observed in the form of orangey sludge. The next sections describe the nature of the discharge. FIG. 27 presents the reduction of phosphorus for column C1.

Release of Iron

One of the principal objectives of a process of this kind is that it possesses a long lifespan. In this case, the element responsible for the capture of phosphorus is iron (in the form of iron hydroxide). It is therefore important to follow this parameter to be able to evaluate the lifespan of the process. FIG. 28 presents the monitoring of the release of iron for column C1.

On average, the column released an iron concentration of 3.82 mg/L (maximal value of 14.62 mg/L) whereas the inlet was of about 0.41 mg/L. This indicates a loss at the level of the iron impregnated on the chips of wood. We seem to also observe that the release is done in cycles, probably according to the prevailing conditions inside the column. It is important to note that these cycles go hand in hand with the phosphorus concentrations at the outlet of the process (the highest values of iron match with the highest values of phosphorus).

The iron results which appear on FIG. 28 do not represent the totality of the iron released by the column. There is also a great quantity that is concentrated in the decanters at the outlet of the columns and that agglomerates in the piping in the form of an orangey sludge. Total solids results (TS) may enable the quantification of all the particles released by the columns. Even though little data was collected for this parameter, we may nevertheless notice that the TS values for column C1 are on average 30 mg/kg higher than the supply reservoir. This indicates that there is an expulsion of solids by the column.

An orangey sludge was observed at the outlet of the column a few days after its start-up (about a week and a half). Table 28 shows the results of the analyses of the chemical composition of the sludge at outlet of column C1.

TABLE 28

Analysis of the sludge exiting column C1

| Parameter | Concentration (mg/L) | Proportion (%) |
| --- | --- | --- |
| TSS | 261 | 74.4 |
| VSS | 67 | 25.6 |
| Iron | 814000 | 81.4 |
| Phosphorus | 7500 | 0.75 |

These results reveal that, from the fraction composed of 74.4% of inorganic (or mineral) matter, 81.4% is composed of iron and 0.75% of phosphorus in different forms (e.g. $FeO$, $Fe_2O_3$, $Fe_3(PO_4)_2 \cdot 8H_2O$/Vivianite, $FePO_4 \cdot 2H_2O$/Strengite, $Fe(OH)_2$, $Fe(OH)_3$, etc.). Therefore, this indicates that the iron is released in a significant manner. The phosphorus is released in low concentrations. The phenomenon of the iron release can be explained by the reductive dissolution of the iron in certain conditions (low redox potential and pH between 5 and 9), from which stems that the iron is reduced to its soluble form, which interrupts its impregnation in the filter media. It is also possible that the iron, once it is solubilized, may form a complex with the phosphorus (e.g. vivianite and strengite) to then precipitate. This mechanism could contribute to a better phosphorus capture by the filter, despite the fact that is it also responsible for the release of iron.

A dark black coloration having appeared shortly after the production of the orangey sludge, these two phenomena undoubtedly go hand in hand. In fact, a black coloration of the filter media could indicate anoxic conditions and thus low, or even negative, redox potentials. Periodically, water samples from the filter media were taken, as well as measures of the dissolved oxygen and redox potential. The results are presented in Table 29.

TABLE 29

Results of dissolved oxygen and redox potential for column C1

| Parameter | Inside of column C1 | Top of column C1 | Supply reservoir |
| --- | --- | --- | --- |
| Dissolved oxygen (%) | — | 10.4 | 66.2 |
| Redox potential (Mv) | −118.1 | 198.6 | 207 |

Knowing the prevailing conditions in the column, it is now possible to explain the formation of the orangey sludge. The iron that impregnated in the form of iron hydroxide is in its oxidized form ($Fe^{3+}$). In low redox potentials, it takes its reduced form ($Fe^{2+}$) and becomes soluble. It is then dragged to the top of the column where it oxidises at the contact of the oxygen present in the air. It then takes an oxidised form once again, a particular form, of orangey color.

pH Monitoring

The water of the supply reservoir maintained itself, on average, at a neutral pH (7.0). The pH at the outlet was on average 7.7. What could explain such an augmentation is the fact that $H^+$ ions are captured.

The packing is impregnated with iron hydroxide in the form of $Fe(OH)_3$. By capturing the phosphorus, a hydroxyl group ($OH^-$) is put in the solution. It is also the case when the iron is reduced by the poor redox potential conditions by going from $Fe(OH)_3$ to $Fe(OH)_2$. Since this anion is a strong base, it certainly contributes to the rise in pH. Many other factors can also explain a rise in pH, of biological nature amongst other things (byproducts of the metabolism of certain bacteria and/or wood byproducts). All in all, the pH stayed close to neutral values, which is desired for the purposes of discharges in the environment, where the pH has to be around 5 and 9.5. FIG. 29 presents the pH evolution for column C1.

Example 11—Iron Hydroxide Column (C2)

The mode of operation was identical to that of column C1, except the fact that the filter media was composed solely of commercial iron hydroxide.

Results

As expected, column C2 enabled to reach the target of 0.3 mg/L. In fact, from an average inlet of about 5.14 mg/L, it was possible to obtain an average reduction of about 99.6%, for an average outlet of 0.02 mg/L. The product used as a filter media in column C2 is a commercial product used in the treatment of drinking water. It was therefore expected that the reduction of phosphorus was going to be very efficient. It is for that reason that this column was a control column. FIG. 30 presents the reduction of phosphorus in column C2.

On average, for C2, the supply water came in with 0.41 mg/L of iron whereas the outlet was of about 0.08 mg/L. The release of iron was therefore unimportant for this column. The measures of the redox potentials (sample taken at the filter media level), whose results are of about 37.6 mV, indicate less favourable conditions to the phenomenon of reductive dissolution of iron. We can also notice that there is a rising trend of concentrations in iron at the outlet. Nevertheless, no sludge was observed at the outlet since the beginning of the trial. The filter media was not colored and the exiting water was clear. The first results of total solids indicate that there was on average 40 mg Fe/kg more than in the supply. FIG. 31 presents the monitoring of the iron release for column C2.

Even though the pH of columns C1, C3 and C6 rose at the outlet compared to the inlet, the contrary happened for column C2. In fact, the pH at the inlet was of about 7.04 whereas it was of 4.57 at the outlet. Therefore, one or many compounds composing the packing of commercial iron hydroxide used (of which the exact composition is unknown) reduced the pH with the inlet of $H^+$ ions in the solution. FIG. 32 presents the evolution of the pH in column C2. As previously indicated, this pH is less favourable to the reductive dissolution phenomenon of the iron.

Example 12—Trickling Column (C3)

FIG. 33 presents a simplified illustration of the set-up of the column operated by trickling (C3).

As illustrated, the synthetic supply water is channeled directly on top of the column. The water then percolates within the packing, and then outlets at the bottom of the column where it throws itself into a decanter and the drains. An overflow was installed on top of the column to avoid spilling in the case of clogging.

Results

Reduction of the Phosphorus

After 36 days of operation, the concentrations of phosphorus at the outlet did not stay under 0.3 mg/L. In fact, with an average of 0.16 mg/L at the outlet and 5 mg/L at the inlet, the maximal concentration that was observed was of 0.40 mg/L (last registered result). The column did not enable the efficient treatment of phosphorus despite an average reduction of about 97%. The last measures taken indicate a trend that the exiting concentrations in phosphorus are on the rise. FIG. 34 presents the reduction of phosphorus for the column C3.

This loss in performance, which is not observed in operation by immersion, can be explained by two major differences. First of all, the preferential channels have a much larger impact by trickling than by immersion, and cause the premature saturation of the phosphorus capitation sites along the preferential channels. Furthermore, short-circuits have a larger impact on the hydraulic retention time by trickling than by immersion. In addition, as mentioned before, the reductive dissolution of iron, not very frequent by trickling, could contribute to a better phosphorus capture.

Release of Iron

On average, the inlet was of 0.41 mg/L of iron, whereas the outlet was of 0.15 g/L. We may therefore assume that the release of iron impregnated by the chips is not significant. It is important to note that the first value taken at the outlet was larger than all of the others. The chips were not rinsed before being inserted into the column. It could therefore be a leaching and not a release. Besides this value, the concentrations at the inlet and at the outlet were on average pretty low. Consequently, after more than 45 operating days, the column C3 did not release iron, or at least, it was insignificant, which is attributable to the fact that the redox potential within a column by trickling is at positive values thanks to the diffusion of air into the environment. FIG. 35 presents the evolution of the concentrations in iron for the column C3.

pH Monitoring

Just like columns C1 and C2, the pH of the water rose slightly following its passage through column C3. In fact the pH of the supply water was of 7.0 on average whereas the pH of the water at the outlet was of 7.3. Many factors can explain a rise in pH: byproducts of the metabolisms of certain bacteria, wood byproducts and expulsion of $OH^-$ ions following the reduction of iron in the form of $Fe(OH)_3$ into $Fe(OH)_2$ (probably not significant since the redox potential is at positive values). FIG. 36 presents the pH evolution in column C3.

Example 13—Column Supplied by BIOSOR$^{MD}$ Outlet Water (C4)

FIG. 37 presents a simplified illustration of the set-up of column C4. The water coming from the supply reservoir of 60 L is pumped by a peristaltic pump (Masterflex, pump head Easyload II, N° 77200-62) until the injection nozzle at the top of the BIOSOR$^{MD}$ biofiltration column. The flow rate and the injection sequence are controlled conjointly by the pump and a timer that are attached to it. An ascending air flux also travels the filter media from the bottom of the same column. The air comes from a compressor and the injection flow rate is controlled by a flowmeter with floating ball (Gilmont, Labcor #03232-21 model, size #11). The water at the outlet of the column of biofiltration is channeled at the base of the column. Table 26 presents the characteristics specific to the set-up of column C4.

TABLE 26

Technical characteristics of the set-up of column C4

| | Column |
|---|---|
| Height of the column (cm) | 200 |
| Nominal diameter (cm) | 20 |
| Material of the column | PVC |
| | Filter media |
| Total height of FM (mm) | 1180 |
| Distribution of the packing | 100 mm of wood chips |
| | 200 mm BIOSOR$^{MD}$ type mix |
| | 200 mm wood chips (includes the base of the air capture chimney in its center) |
| | 500 mm BIOSOR$^{MD}$ type mix |
| | 100 mm wood chips (a sealing ring controls this part) |
| | 80 mm Plenum |
| Composition of the organic mixture of BIOSOR$^{MD}$ type | 86% (v/v): Wood chips of paper quality coming from the sawmill Leduc in Sainte-Emilie |
| | 14% (v/v): peat from Chicoutimi |
| | Inlet |
| Flow rate of liquid supply | 11 L/day |
| | Or injections of 229 ml every 30 minutes |
| | *Flow rate controlled by peristaltic pumps Masterflex, Easy Load II heads |
| Composition and origin of liquid supply | Lixiviat coming from the treatment plant of Quebec, Beauport |
| Air flow rate (L/min) | 2.6 |
| | * Flow rate controlled by a flowmeter with floating ball Gilmont (model Labcor #03232-21, size #11) |
| Origin of air | Compressor |
| | Piping |
| Liquid inlet | Supply water |
| | ¼" inch in PVC (Jensen insert) |
| | Polypropylene fittings |
| | Pipe in the norprene pump LS 24 |
| | ¼" inch in PVC (Jensen insert) |
| | Polypropylene connectors |
| | Injection nozzle |
| | Column |
| Liquid outlet | Column |
| | Swan-neck outlet in PVC with stainless steel valves |
| | Drains |

TABLE 26-continued

Technical characteristics of the set-up of column C4

| | |
|---|---|
| Air Jet | Compressor |
| | Flow rate control gauge |
| | ¼" inch in PVC (Jensen Insert) |
| | Flowmeter with floating ball (Cole Parmer) |
| | ¼" inch in PVC (Jensen Insert) |
| | Polypropylene T-connector |
| | ¼" inch in PVC (Jensen Insert) |
| | Column |

Results
Reduction of Phosphorus

Column C4 was efficient in the treatment of phosphorus for more than 35 operating days. In fact, the standard of 0.3 mg/L was not surpassed with an average concentration at the outlet of 0.19 mg/L. The average at the inlet was of 3.14 mg/L, giving an average reduction of about 94%. Since columns C4 and C1 were operated the same way, apart from the supply water, we could expect that they have about the same behaviour in terms of phosphorus treatment. However, the average reduction of phosphorus for C4 was significantly lower than for C1. The only difference being the supply water, it is possible that the organic charge is the cause, causing different redox potential conditions within the filter media by the biological activity. FIG. 38 presents the reduction of phosphorus for column C4. It is important to note that a few points are laboratory data whereas the majority was obtained with a Hach colorimeter.

Reduction of Iron

Even though very little data was taken, it was possible to see a relatively substantial reduction in iron. In fact, the outlet of iron was on average of 3.55 mg/L whereas the concentration in iron at the inlet was of about 0.09 mg/L. It was observed that the release process quickened in column C4 since the quantity of entering organic matter was larger than in column C1. In fact for column C1, even after 35 days of operation, the concentration in iron at the outlet had not surpassed 3 mg/L. FIG. 39 presents the evolution of the reduction in iron for column C4.

With column C1, it was possible to make a parallel between the release of iron and the production of sludge (which is essentially composed of iron). It was also observed that after about a week of operation, there was an apparition of orangey sludge at the outlet of column C4. The tint of the packing was then accentuated, becoming a dark black color.

Monitoring of the Nitrogen Compounds

A denitrification within column C4 was noticed, because of a decrease in nitrites and nitrates at the outlet compared to the inlet. In fact, the concentrations in nitrates were on average 2.1 mg/L at the inlet and 0.7 mg/L at the outlet. Furthermore, as mentioned previously, anoxic conditions are present within column C4, conditions that are necessary for the implantation of denitrifying bacteria. FIG. 40 presents the monitoring of the nitrates for column C4.

pH Monitoring

The pH at the inlet was on average of 7.46 and 7.70 at the outlet. There was thus a slight increase in the pH throughout the process, as was the case for columns C1, C2 and C3. The same explanations as those mentioned previously for those columns apply to an increase in pH observed in column C4. FIG. 41 presents the pH evolution for column C4.

Monitoring of Column C4

To summarize, column C4 was started without the addition of an inoculum of nitrifying bacteria. Because of this, the concentrations of nitrates at the outlet were low.

Example 14—Aerated Columns (C5 Et C6)

FIG. 42 presents a simplified illustration of the columns C5 and C6. These columns function by immersion. Table 27 presents the parameters that were followed, the methods of analysis, the equipment used, as well as the frequency of the analyses.

TABLE 27

Analytical monitoring

| Laboratory vs Hall | Parameters followed | Frequency | Sampling points | Equipment/Method |
|---|---|---|---|---|
| Hall | Temperature - supply water | 1 to 2 times/week | Supply reservoirs | Thermometers: EQ-2849 et EQ-2848 |
| | Liquid flow rate | | Outlet of all the columns | Graduated cylinder and stopwatch |
| | | | Inlet of the BIOSOR$^{MD}$ column | |
| | Air flow rate | | Inlet of the aerated columns | Flowmeter: Gilmont EQ-2495 |
| | Compaction | | Top of the BIOSOR$^{MD}$ column | Measuring tape |
| | loss of charge | | Air inlet of the BIOSOR$^{MD}$ column | Anemometer: TSI, VelociCalc Plus: EQ-2759 |
| | percentage of dissolved $O_2$ | | Top of columns C5, C6 | Orion ™ DO Sensor link: Q521-612, EQ-3155 |
| | pH | | Outlet of all the columns | Hall: pH-meter EQ-2730/3163 |
| | Redox potential | | Interior of the phosphorus removal columns | conductivity meter EQ-2730/3243 |
| Laboratory + Hall | $[PO_4^{3-}]$ [Phosphorus] [P—$PO_4$] | Hall: once a week Lab: once every 2 weeks | Inlet and outlet of all the columns | Hall: portable kit HACH 8190 Kit HANNAH HI 93706 Lab: MA-4054-M* |

TABLE 27-continued

Analytical monitoring

| Laboratory vs Hall | Parameters followed | Frequency | Sampling points | Equipment/Method |
|---|---|---|---|---|
| | [N_NO$_3$]<br>[N_NH$_3$] | | Inlet and outlet of C4 and BIOSOR$^{MD}$ column | Hall: portable kit HACH 8190<br>Lab: MA-4073M* |
| Laboratory | [Fe]<br>Total solids | 1 time/every 2 weeks | Outlet of columns C1 to C6 | Other MA-4059* |

It is important to note that the columns were not all put into operation on the same day. The monitoring periods of certain columns were therefore different.

Results

Reduction of Phosphorus

During more than 40 operating days, the column C5 enabled a reduction of the phosphorus inferior to the target. In fact, the average at the outlet was of 0.05 mg/L. With an average concentration in phosphorus at the inlet of 5.14 mg/L, this gives a reduction of 99% on average. It seems that a weak aeration does not tamper with phosphorus capture, since column C5 is the column that presented the best return after 42 days of operation (excluding the control column C2). FIG. 43 shows the reduction of the phosphorus for the aerated column at 0.5 ml/min (C5).

On average, column C6 enabled a reduction under the standards of 0.3 mg/L with an average outlet concentration of 0.16 mg/L, which represents an average reduction of 97%. However, contrary to column C5, one of the measured values was higher than the targeted objective, the last registered column. FIG. 44 presents the reduction of phosphorus for the column aerated at 5 ml/min (C6).

The aeration allowed to maintain the redox potential positive inside the column C6 (of about 200 Mv) which inhibited considerably the reductive dissolution of iron. As mentioned earlier, this phenomenon contributes to the phosphorus capture through precipitation of iron-phosphorus complexes, which could explain that the performances of column C6 were lower than those of column C5. In column C5, the aeration was so weak that the redox potential stayed at negative values (about −50 Mv). This enabled the reductive dissolution of the iron which favoured the phosphorus capture. Furthermore, too strong an aeration could favour a physical removal of the particles.

Release of Iron

With the weak redox potential in C5, we could have expected that the release of iron would be relatively important. However, the concentration in iron at the inlet, on average about 0.41 mg/L, was much higher than at the outlet (0.15 mg/l). FIG. 45 presents the evolution of the release of iron for column C5.

After about 25 first days of normal operation of C5, an orangey zone appeared in the packing, and then spread to many points in the column, forming orangey spots. These orangey spots manifested themselves only in the packing of column C5 and seemed to install themselves in the zones where air bubbles would circulate. In fact, observing column C5 up close, it was noticed that the bubbles always took the same passages, which took an orangey hue. In the back portion of the column, the bubbles didn't pass and there were no orangey spots. It could therefore be bacterial biofilms produced in aerobic conditions, or it could be iron in its oxidised form sticking to the packing as was observed in the piping at the outlet of columns C1 and C4. The proliferation of bacteria would have then consumed a big part of the dissolved oxygen which would lead to weak redox potential conditions and a black coloration of the media. In fact, a few black zones were noticed, concentrated on the bottom of column C5. The released iron in those zones could oxide and precipitate because of the passage of the air bubbles.

Column C6, also in aeration, did not present such a phenomenon. The more pronounced aeration did not allow to reach redox potentials that would be low enough to reduce the ferric iron. The release of iron turned out to be insignificant for this column because of the aeration maintaining the redox potential values positive. In fact, a concentration in iron at the outlet of 0.16 mg/L on average, which is lower than the 0.41 mg/L at the inlet, was observed. It is important to note that the average at the outlet of column C6 was almost equivalent to the one at the outlet of C5. FIG. 46 presents the evolution of the iron release for column C6.

pH Monitoring

Just like in the previous columns, the pH at the outlet (average of 7.5) was systematically higher than the one at the inlet (average of 7.0) for column C5. This was also the case for column C6, where the exiting pH was on average 7.4. FIG. 47 presents the pH evolution for columns C5 and C6. The summary of the phosphorus removal results is presented in table 30.

TABLE 30

Important results for phosphorus removal

| Columns | Parameters - Averages (Max Values) | | | Period of operation (days) |
|---|---|---|---|---|
| | [P_PO$_4$]$_{sortie}$ (mg/L) | [Fe]$_{sortie}$ (mg/L) | Important Observations | |
| Simple activated grindings (C1) | 0.10 (0.27) | 3.11 (14.62) | Orangey sludge at the outlet and black spots in the filter media | 140 |
| Iron hydroxide (C2) | 0.02 (0.04) | 0.07 (0.16) | — | 140 |
| Trickling (C3) | 1.01 (0.40) | 0.15 (0.46) | — | 84 |

TABLE 30-continued

Important results for phosphorus removal

| Columns | Parameters - Averages (Max Values) | | Important Observations | Period of operation (days) |
|---|---|---|---|---|
| | $[P\_PO_4]_{sortie}$ (mg/L) | $[Fe]_{sortie}$ (mg/L) | | |
| BIOSOR$^{MD}$ outlet water (C4) | 0.43 (1.09) | 3.55 (5.80) | Orangey sludge at the outlet and black spots in the filter media | 74 |
| Aerated at 0.5 ml/min (C5) | 0.32 (1.40) | 0.18 (0.38) | Orangey zones and black spots in the filter media | 80 |
| Aerated at 5 ml/min (C6) | 0.51 (0.32) | 0.16 (0.38) | — | 80 |

Table 31 presents the results of the monitoring of the nitrogen compounds and the reduction of phosphorus for column C4.

TABLE 31

Important results for column C4

| | C4 column Averages (max. values) | |
|---|---|---|
| Parameters | Inlet | Outlet |
| $[N\_NO_2]$ (mg/L) | 5.6 (10) | 1 (3) |
| $[N\_NO_3]$ (mg/L) | 1.9 (6.8) | 0.7 (0.8) |
| $[P\_PO_4]$ (mg/L) | 3.1 (4.3) | 0.2 (0.24) |

In the aforementioned trial example, many phosphorus removal units were operated according to optimal parameters to allow a reduction of the phosphorus superior to the standard of 0.3 mg P/L. Furthermore, these trials allowed one to characterize the exiting sludge, to test the addition of an aeration device under the filter, to verify whether the process permits simultaneous phosphorus removal and denitrification, as well as to compare the trickling supply mode with the immersion supply mode.

The obtained results reveal that all of the columns allowed an average reduction under the standard 0.3 mg P/L. Concerning the release of iron, the columns C1 and C4 were the only ones to have had presented concentrations in iron at the outlet that were superior than at the inlet, and to have produced an orangey sludge. Columns C1 and C4 also showed black spots in the packing, this observation was also made on column C5, which presented orangey zones in the filter media as well.

More specifically, the column of simple activated shavings (C1) served to produce and characterize the exiting sludge whose analysis revealed that the orangey substance produce is essentially of mineral composition (75%). This inorganic part is composed of about 80% iron and almost 1% of phosphorus, the organic 25% being mainly composed of aerobic heterotrophic bacteria, species normally present in this type of water treatment process. The sludge is therefore a clear indication of the loss of iron impregnated in the filter media. Its production starts with the consummation of the dissolved oxygen in the water by the aerobic bacteria, which results in lowering the redox potential of the media. By doing so, the ferric iron ($Fe^{3+}$) impregnated by the chips is reduced into ferrous iron ($Fe^{2+}$) which causes it to be put into the solution. It then reaches the top of the column where it oxidises at the contact of air, iron oxides often being of the color orange. The data of iron at the outlet of column C1 confirmed a loss of iron, with a concentration at the inlet of 0.41 mg Fe/L and 3.82 mg Fe/L at the outlet. Furthermore, it seems that the release varies in a cyclic manner, just like the phosphorus concentrations at the outlet. Finally, column C1 allowed an efficient phosphorus removal, with an average at the outlet of 0.08 mg/L and did so throughout the whole trial (98 days).

The column lines with iron hydroxide (C2) served as a control for the other columns. Its commercial filter media allowed an efficient phosphorus capture (outlet average of 0.02 mg/L) and an insignificant iron release (outlet average of 0.08 mg/L) in 98 days of operation.

Concerning the column operated by trickling (C3), which was used as a comparison to the columns by immersion, it also allowed an average reduction of phosphorus under the standard of 0.3 mg/L after 46 days of operation. However, despite an outlet average of 0.16 mg/L, the most recent data obtained indicated a rising trend, the most recent measure surpassing the target of 0.3 mg/L. The iron discharges were of about 0.15 mg/L, which is insignificant.

The columns supplied with water from a biofilter of the BIOSOR$^{MD}$ type (C4) were operated for the purpose of verifying whether the phosphorus removal was accompanied by a simultaneous denitrification. Concerning the phosphorus, column C4 allowed an outlet concentration of 0.19 mg/L which is under the standard 0.3 mg/L. The nitrates went from an average concentration at the inlet of 5.6 mg/L to 1 mg/L at the outlet. Therefore, according to these results, column C4 allowed the capture of phosphorus with simultaneous denitrification and did so after 36 days of operation. Column C4 was not inoculated, which means that it is possible that the nitrifying bacteria were not completely installed during the trials. The concentrations in nitrates and nitrites could therefore rise with time.

Columns C5 and C6 were used to test the addition of an aeration device under the filter. After 42 days of operation, this objective was reached since the concentrations in iron at the outlet stayed very low. However column C5, whose air supply was of 0.5 ml/min (5 ml/min for C6), saw its filter media take a black color with the presence of orangey zones. Such coloration indicates reductive conditions, which implicates that the release of iron could become more important when increasing time of operation. Concerning phosphorus removal, the columns C5 and C6 allowed average concentrations at the outlet under the standard 0.3 mg/L: 0.05 mg/L for C5 and 0.16 mg/L for C6, even though the last measure of phosphorus taken for column C6 was superior to the standard.

In summary, the reductive dissolution of the iron contributes in obtaining phosphorus concentrations at the outlet that are under the 0.3 mg/L standard. However, it also causes a release in iron that is relatively important. A weak aeration allows to limit the iron release and maintain efficient removal of phosphorus.

For purposes of reducing the effect of adhesion of the sludge to the internal walls of the phosphorus removal unit, its diameter could be increased. Should the aeration hamper denitrification, the inlet of air could be positioned higher in the packing instead of being at the bottom of the phosphorus removal unit, so that the anaerobic conditions could be present at the bottom of the unit. In these reductive conditions, the ferrous iron that is released would reach the aerated zone and would be oxidised again. The $Fe^{2+}$ can form a complex with the phosphorus that precipitates. The reductive conditions are therefore favourable for the phosphorus capture. However, in the zones where the phosphorus is lower in concentration, a part of the iron does not form complexes and ends up on the top of the phosphorus removal unit, where it forms sludge. Therefore, if the reductive conditions were present where the phosphorus is in higher concentration, the bottom of the unit, less $Fe^{2+}$ would make its way to the surface without forming complexes, which would reduce the production of sludge. Furthermore, with the C5 column, it was noticed that the orangey zones, which are mainly oxidised iron deposits, were in the areas of passage of the air bubbles. It thus seems that the aeration allowed the soluble iron to precipitate, which keeps the iron within the column.

Example 15—Alternative Models for Limiting the Release of Iron

The previous results tend to show that the phosphorus removal performances are closely linked to the iron release cycle, and support the observation that the releases of iron follow a cyclic trend of about 30 days.

The conducted tests showed the importance of the reductive dissolution of the iron to maintain the good performances for phosphorus removal for long periods of time. In this way, the phenomenon of reductive dissolution creates release cycles for the iron and the phosphorus that must be controlled.

To recreate the conditions and the release cycles of column C1, modifications to the set-up were made to study the control methods of the release. A second filter was installed at the outlet of column C1 (C1*). FIG. 48 shows the set-up of column C1*.

Since the second filter is operated by trickling, the media is therefore in aerobic conditions. The presence of oxygen in the filter causes the oxidation of the ferrous ions ($Fe^{2+}$) and, on the one hand, the precipitation of ferric phosphorus (less soluble than ferric hydroxide), while on the other hand, the adsorption of the phosphorus on the hydroxides. The filter is therefore able to control the release of iron and phosphorus. The packing is organic, made out of chips and peat to facilitate the distribution of the draining. The equilibrium diagram of the iron presented in FIG. 49 (from Sarrazin et al., 1991) supports the concept of an increase in pH to favour the precipitation of soluble iron and ferric phosphates simultaneously. Moreover, FIGS. 50 and 51 clearly show the cyclic nature of the reduction in phosphorus, directly linked to the same cycle of release of iron at the outlet. An aerobic media placed downstream of the phosphorus capitation column, inspired by the behaviour observed in the columns that possessed a positive redox potential in the previous examples (ex: C3, C5, C6) will be able to precipitate iron again in hydroxide form and thus limit the release of iron in the outlet water, and at the same time, its residual phosphorus.

FIG. 52 presents an alternative to the set-up of column C1* where a hybrid column is presented, and where the aerobic media is installed directly on the top of the media with reductive conditions allowing the capture of phosphorus. This model allows to precipitate the iron in the superior section and to recuperate it for a subsequent phosphorus capture in order to increase the lifespan of such a column by taking advantage of the precipitation/solubilisation cycle of iron observed in the media with reductive conditions.

ANNEX A: Preparation of the Filter Media of the Phosphorus Removal Columns

Pre-Treatment of the Chips:
 Air dry the chips for a couple of hours
 Sieve the dry chips with a sieve of 704 µm and eliminate the chips that are too big Impregnation of the Iron:
 Prepare a solution of ferric chloride ($FeCl_3$) 1.5 mol/L
 Prepare a solution of liquid sodium hydroxide $(NaOH)_l$ 40% (m/m)
 Put 250 g of chips in a 4 L container that goes on the attachment of the <<Big Wheel>>
 Add to the same container 375 ml of the $FeCl_3$ solution 1.5 M
 Start the rotation of the <<Big Wheel>> to the lowest speed for an hour
 After an hour of rotation, add 118 ml of the solution of NaOH 40% to the 4 L container
 Mix with the <<Big Wheel>> for an hour
 Filter the mix to retain the activated chips Measure of the Density of the Chips (Method for 1 L):
 Fill a graduated cylinder of 250 ml with activated chips
 Read the mass
 Fill the graduated cylinder until the 250 ml mark and note the volume used and the volume left
 The volume occupied by the chips is 250 ml minus the used volume
 The density represents the mass of the chips divided by the volume occupied by the chips
 Repeat these steps 3 more times Packing the Phosphorus Removal Columns:
 Put a safety grid at the bottom of the non-aerated columns
 Once the activation of the chips and the density measures are done, put 25 cm of chips in each column
 Put a security grid at the top of the packing ANNEX B: Method of Packing of Column C4

Preparation of Peat:
 Crumble the peat manually over a sieve
 Remove the big particles, branches, roots, etc. . . . .
 Sieve the peat again Preparation of the BIOSOR$^{MD}$ Mix:
 Mix 35 L of previously selected chips with 7 L of peat to create proportions of 80/20 (% v/v) of chips/peat
 Slightly water the preparation to humidify it all
 Mix again and make sure that the peat sticks well to the chips
 Measure the proportions while sieving a part of the mix Packing of the Column
 Put the plenum at the bottom of the column while making sure it does not obstruct the inlet of air
 Add 100 ml of wood chips
 Put the sealing band
 Add 500 ml of the BIOSOR$^{MD}$ mix
 Add about 100 ml of chips Put the chimney of air capture making sure that it is well centered
Add another 100 ml of chips
Add 200 ml of the BIOSOR$^{MD}$ mix
Add 100 ml of chips

The invention claimed is:

1. A wastewater treatment system comprising a passive phosphorus capture filter, wherein said filter is immersed and packed with wood particles activated by impregnation with a metal hydroxide, said system further comprising a device allowing for alternating between reducing conditions favoring a reductive dissolution of metal from said metal hydroxide oxidizing conditions to control release of said metal, rendering said metal available for phosphorus capture.

2. The wastewater treatment system of claim 1, wherein said metal is iron or aluminum.

3. The wastewater treatment system of claim 2, wherein said metal is iron.

4. The wastewater treatment system of claim 1, wherein said activated wood packing is layered with additional packing capable to undertake suspended particles, and containing an alkali agent to promote precipitation in hydroxide form of at least a portion of said released metal, said precipitated metal-hydroxide being available for phosphorus capture.

5. The wastewater treatment system of claim 1, wherein said device produces a cycle comprising a step without aeration to obtain said reducing conditions and a step with aeration to obtain said oxidizing conditions.

6. The wastewater treatment system of claim 5, wherein said device is a controlled-flow aeration means.

7. The wastewater treatment system of claim 1, wherein said activated-wood packing is layered with additional packing fed by a device allowing for oxidizing conditions promoting precipitation in hydroxide form of at least a portion of said released metal, said precipitated metal-hydroxide being available for phosphorus capture.

8. The wastewater treatment system of claim 7, wherein said device allowing for oxidizing conditions is an aeration means.

9. The wastewater treatment system of claim 1, wherein said immersed filter is followed by a trickling filter to promote precipitation in hydroxide form of at least a portion of said released metal, said precipitated metal-hydroxide being available for phosphorus capture.

10. The wastewater treatment system of claim 9, wherein said trickling filter is supplied by an aeration device.

11. A wastewater treatment system, including:
a wastewater nitrification unit;
followed by an immersed filter as defined in claim 1, supporting a denitrifying biomass to carry out simultaneous denitrification for wastewater treatment.

12. The wastewater treatment system of claim 11, wherein said nitrification unit comprises a trickling biofilter on organic media supporting a nitrifying biomass to carry out nitrification.

13. The wastewater treatment system of claim 11, wherein said nitrification unit and said immersed filter are integrated or separated.

14. A method for the treatment of wastewater comprising a filtration step through passive-phosphorus capture filter medium packed with wood particles activated by impregnation of a metal-hydroxide having adsorptive capacity, wherein said filter is immersed, said method comprising alternating between reducing conditions favoring a reductive dissolution of metal from said metal hydroxide and oxidizing conditions to control release of said metal making said metal available for phosphorus capture.

15. The method of claim 14, wherein said metal is iron or aluminum.

16. The method of claim 15, wherein said metal is iron.

17. The method of claim 14, comprising a further step promoting precipitation in the form of hydroxide of at least a portion of said released metal by using an alkaline agent-containing packing, said precipitated metal-hydroxide being available for phosphorus capture.

18. The method of claim 14, comprising a step without aeration to obtain said reducing conditions, and a step with aeration to obtain said oxidizing conditions.

19. The method of claim 18, where said step under aeration includes aeration through a controlled-flow inlet.

20. The wastewater treatment method of claim 14, comprising a further step under oxidizing conditions to promote precipitation in the form of hydroxide of at least a portion of the released metal, wherein said metal-hydroxide precipitate is available for phosphorus capture.

21. The wastewater treatment method of claim 20, where said oxidizing conditions are obtained by aeration.

22. The wastewater treatment method of claim 14, comprising a subsequent trickling filtration step to promote precipitation in the form of hydroxide of at least a portion of the released metal, wherein said metal-hydroxide precipitate is available for phosphorus capture.

23. The wastewater treatment method of claim 22, where said filtration by trickling is aerated.

* * * * *

UNITED STATES PATENT AND TRADEMARK OFFICE
CERTIFICATE OF CORRECTION

PATENT NO. : 9,682,879 B2  
APPLICATION NO. : 14/438370  
DATED : June 20, 2017  
INVENTOR(S) : Rino Dube et al.

Page 1 of 1

It is certified that error appears in the above-identified patent and that said Letters Patent is hereby corrected as shown below:

In the Specification

Column 6, Fig. 49, Line 54, the reference should read:
SARRAZIN J. and VERDAGUER M., « L'Oxydoréduction, Concepts et expériences », Éditions Ellipses, p.95-97, p.250 (1991);

Column 35, Line 8, the brackets should appear as follows: »;

Column 35, Line 20, the symbol » should appear between the words "hydroxide" and "Water";

Column 37, Table 24-continued, Column 38, Lines 17 and 26 and Table 25, Column 39, Lines 62 and 64, Column 44, Lines 8 and 15 and Table 26, Column 46, Table 27, Column 47, Table 27-continued, Column 49, Table 30-continued, Column 50, Line 41, Column 52, Lines 54 and 66, the trademark should read BIOSOR™;

Column 46, Line 32, the information in parenthesis should read:
(C5 and C6);

In the Claims

Column 53, Line 14, the beginning of the line should read:
hydroxide and oxidizing.

Signed and Sealed this  
Fifth Day of September, 2017

Joseph Matal  
*Performing the Functions and Duties of the*  
*Under Secretary of Commerce for Intellectual Property and*  
*Director of the United States Patent and Trademark Office*